United States Patent
Zhao

(10) Patent No.: US 6,310,473 B1
(45) Date of Patent: Oct. 30, 2001

(54) MAGNETIC ROTATIONAL POSITION SENSOR

(75) Inventor: Zong Ping Zhao, Chino Hills, CA (US)

(73) Assignee: Kearney-National, Inc., White Plains, NY (US)

( * ) Notice: Subject to any disclaimer, the term of this patent is extended or adjusted under 35 U.S.C. 154(b) by 0 days.

(21) Appl. No.: 09/211,538

(22) Filed: Dec. 15, 1998

(51) Int. Cl.⁷ .............................. G01B 7/30; G01R 33/07
(52) U.S. Cl. .............................. 324/207.25; 324/207.2; 324/207.22
(58) Field of Search ................. 324/207.13, 207.17, 324/207.18, 207.2, 207.21, 207.22, 207.25; 340/686–3, 870.16

(56) References Cited

U.S. PATENT DOCUMENTS

| | | | |
|---|---|---|---|
| 5,332,965 | 7/1994 | Wolf et al. | 324/207.12 |
| 5,444,369 | 8/1995 | Luetzow | 324/207.2 |
| 5,460,035 | 10/1995 | Pfaffenberger | 73/118.1 |
| 5,497,081 | 3/1996 | Wolf et al. | 324/207.12 |
| 5,504,427 | 4/1996 | Cooper et al. | 324/207.17 |
| 5,506,502 | 4/1996 | Maennle | 324/207.25 |
| 5,512,820 | 4/1996 | Alfors | 324/207.22 |
| 5,521,495 | 5/1996 | Takahashi et al. | 324/207.18 |
| 5,544,000 | 8/1996 | Suzuki et al. | 361/139 |
| 5,572,120 | 11/1996 | Takaishi et al. | 324/207.21 |
| 5,578,962 | 11/1996 | Rastegar | 330/9 |
| 5,600,238 | 2/1997 | Holloway et al. | 324/207.21 |
| 5,602,471 | 2/1997 | Muth et al. | 324/207.21 |
| 5,611,548 | 3/1997 | Dahlhaus | 277/152 |
| 5,621,179 | 4/1997 | Alexander | 73/862.331 |
| 5,625,239 | 4/1997 | Persson et al. | 310/68 B |
| 5,625,289 | 4/1997 | Daetz et al. | 324/207.14 |
| 5,627,465 | 5/1997 | Alfors et al. | 324/207.2 |
| 5,698,778 | 12/1997 | Ban et al. | 73/118.1 |
| 5,712,561 | 1/1998 | McCurley et al. | 324/207.2 |
| 6,137,288 | * 10/2000 | Luetzow | 324/207.2 |

* cited by examiner

Primary Examiner—Hezron Williams
Assistant Examiner—Henry S. Andersen
(74) Attorney, Agent, or Firm—Woodhard, Emhardt, Naughton, Moriarty & McNett

(57) ABSTRACT

A magnetic rotational position sensor comprises a loop pole piece, at least one magnet, and at least one magnetic flux sensitive transducer. The magnet is disposed within an air gap of the loop pole piece to establish a magnetic field through the air gap and to enclose magnetic flux within the loop pole piece. A control shaft is rotatable about a first axis and the loop pole piece and the magnet are adjoined to the control shaft to synchronously rotate the magnetic field about a second axis. A working air gap area is defined within the air gap area of the loop pole piece between a pole surface of the magnet and an inner surface of the loop pole piece. A magnetic flux sensitive transducer is disposed within the air gap to sense a magnitude of magnetic flux density.

32 Claims, 32 Drawing Sheets

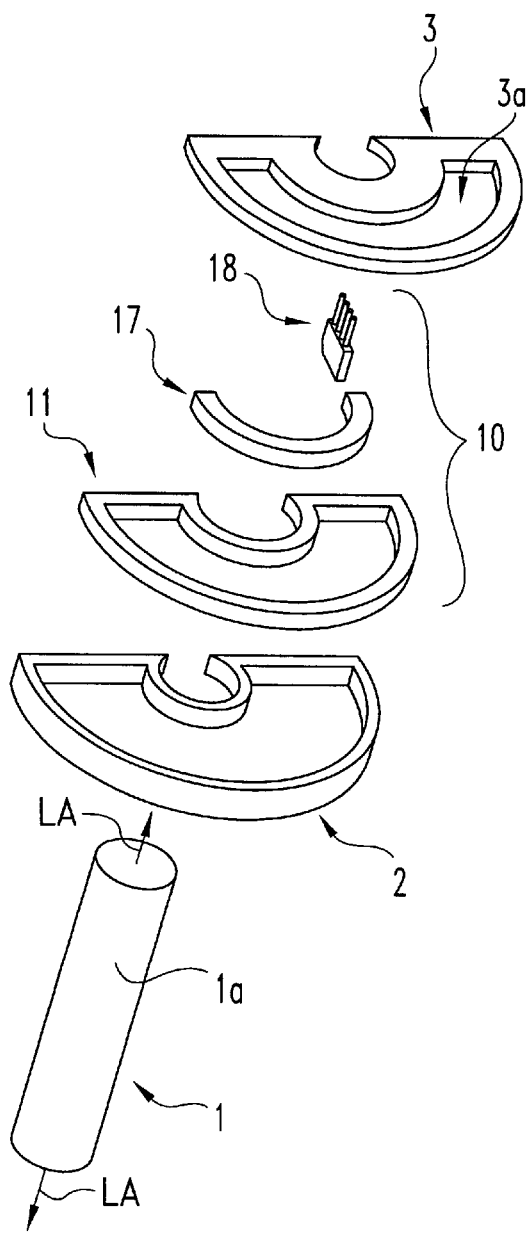
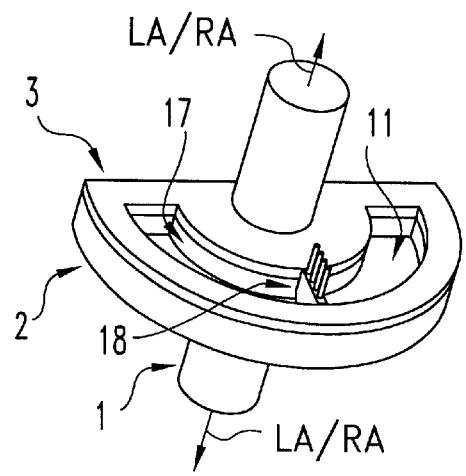
Fig. 2A
Fig. 2B

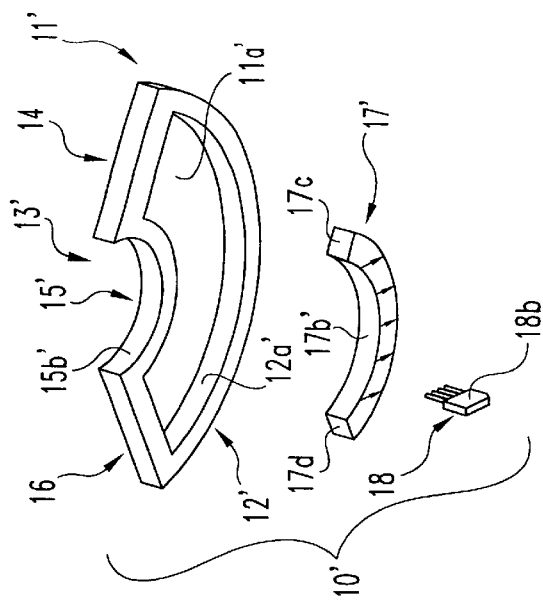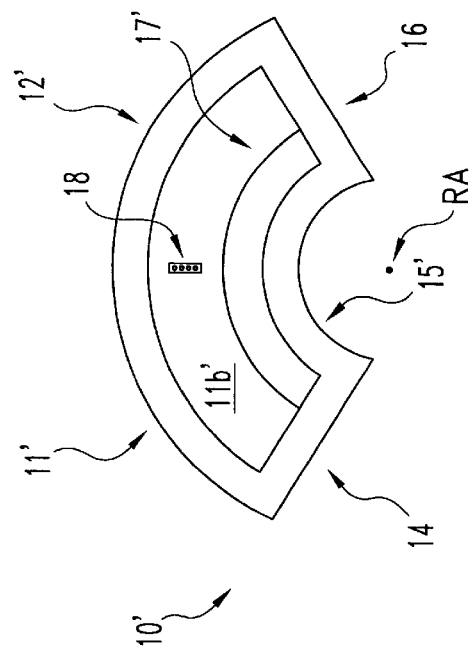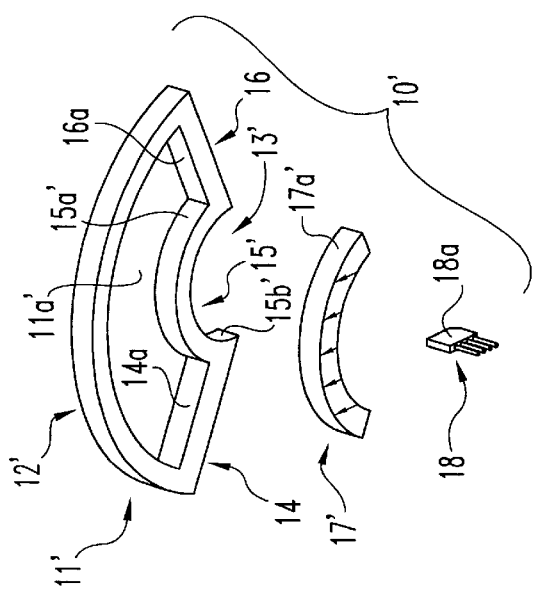

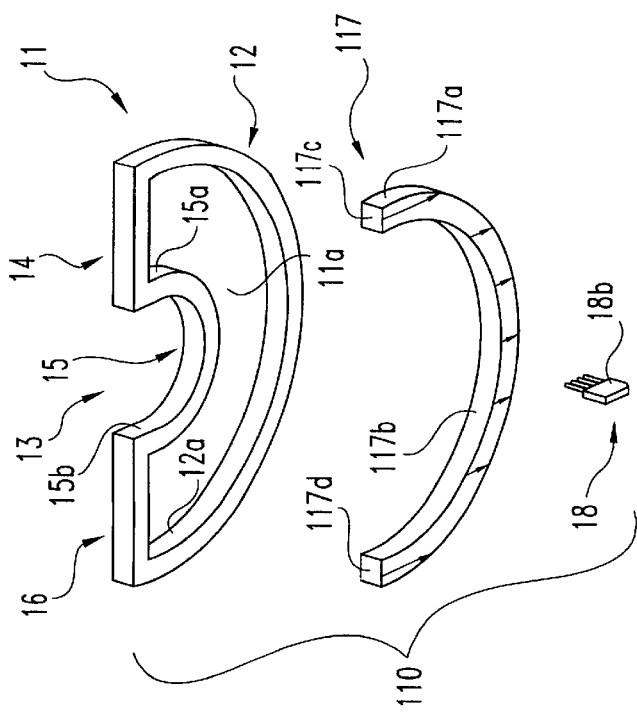
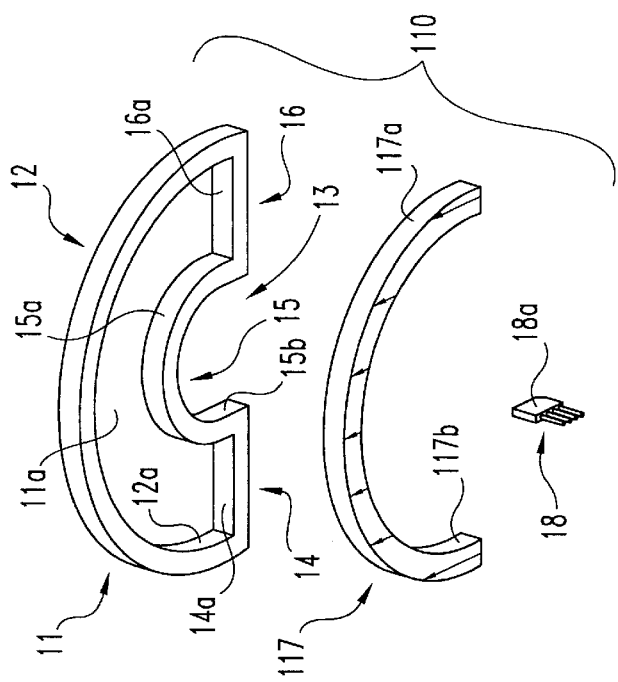
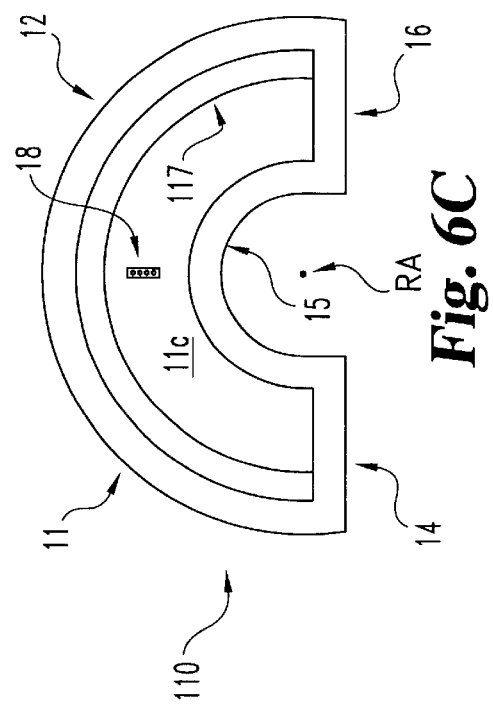
Fig. 6B
Fig. 6C
Fig. 6A

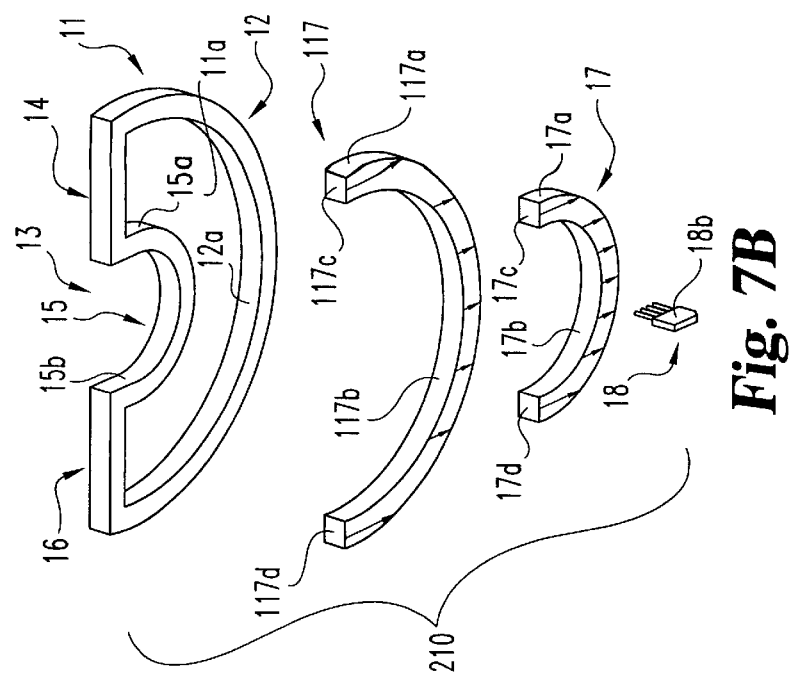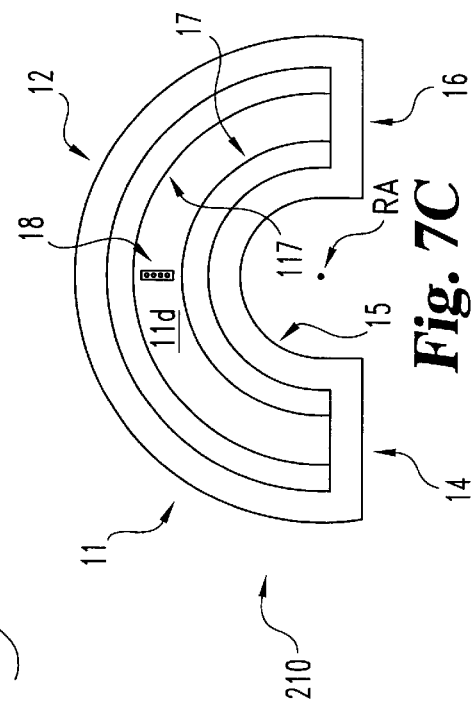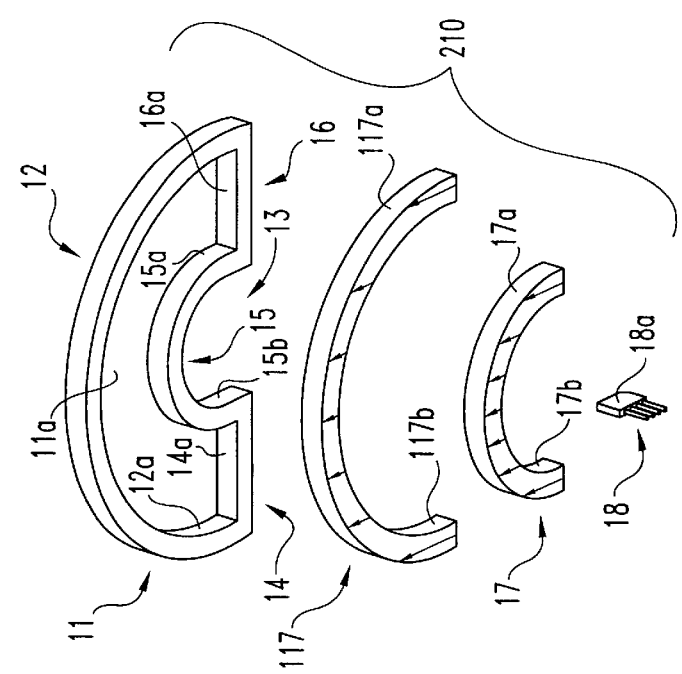

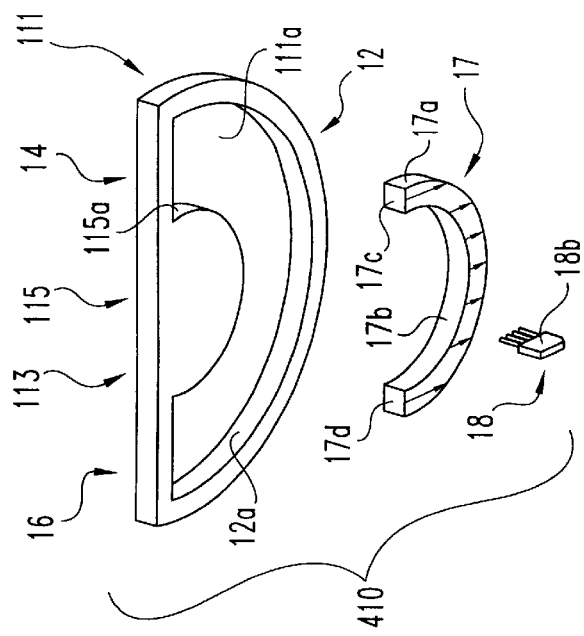
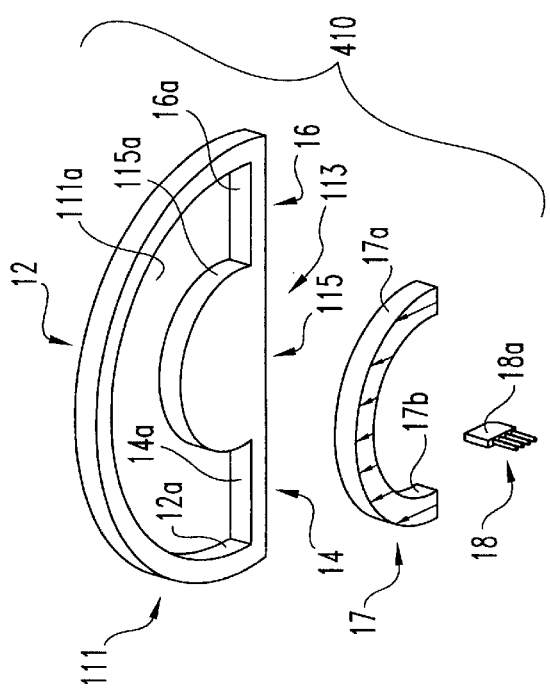
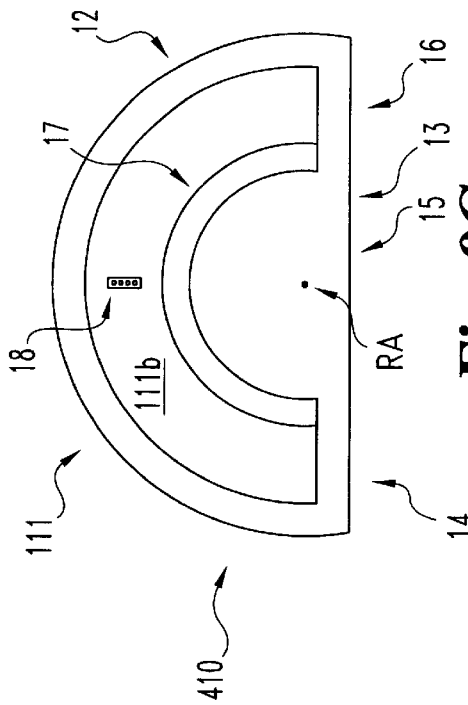
Fig. 9A
Fig. 9B
Fig. 9C

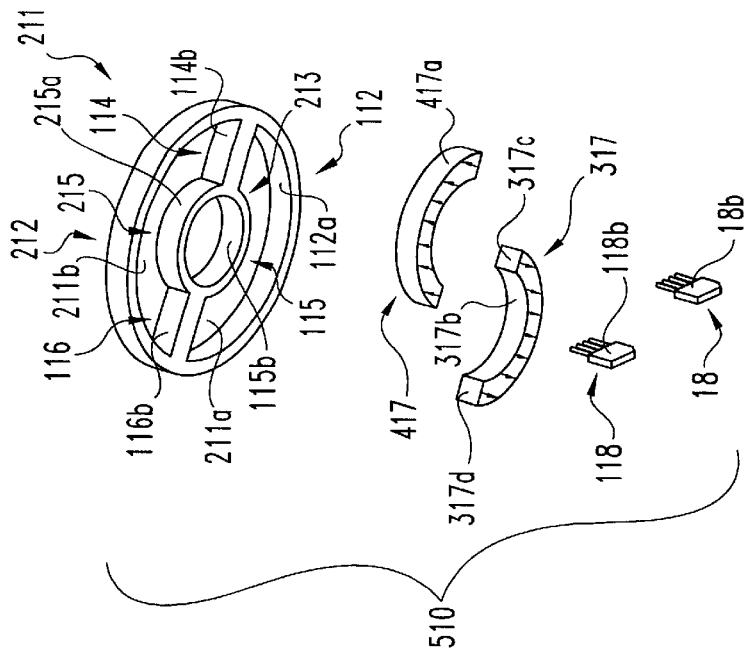
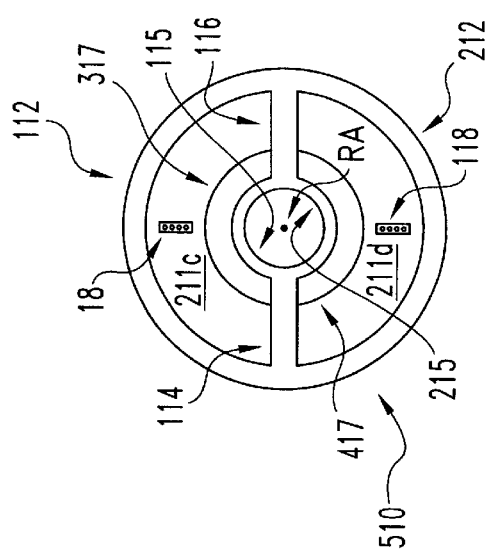
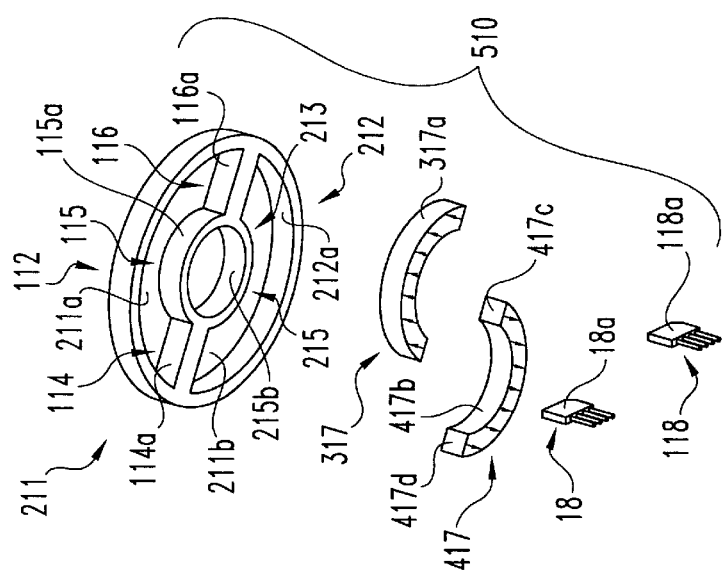
Fig. 10B
Fig. 10C
Fig. 10A

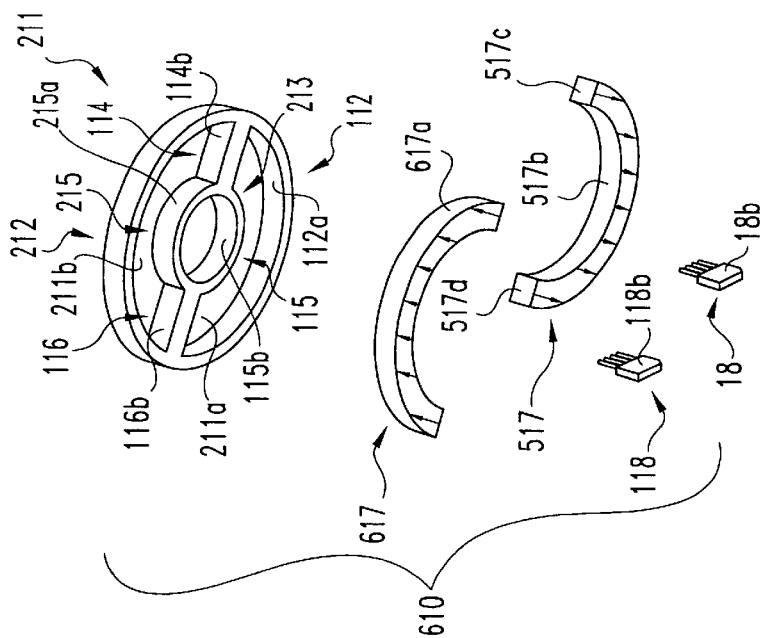
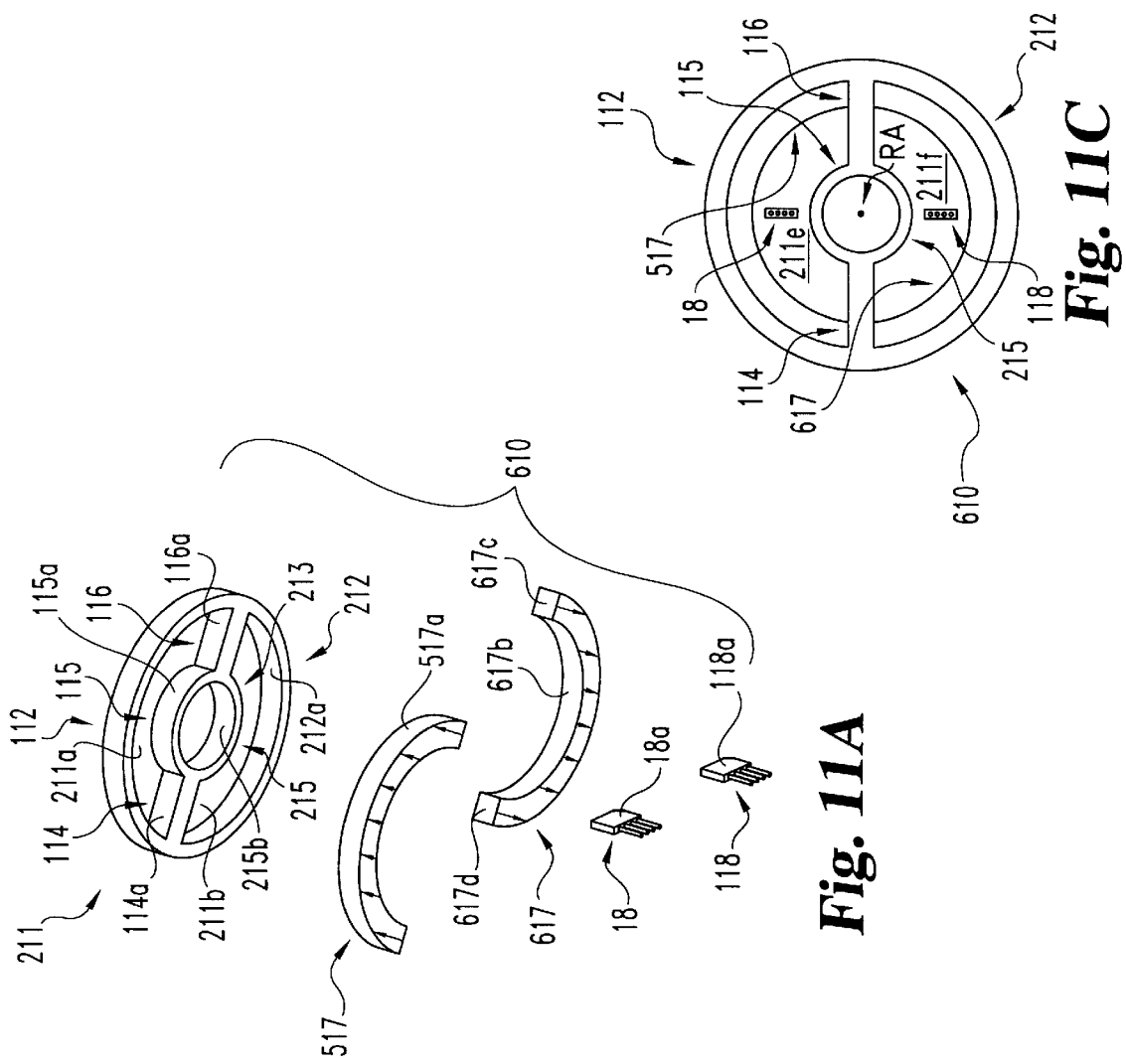
Fig. 11B
Fig. 11C
Fig. 11A

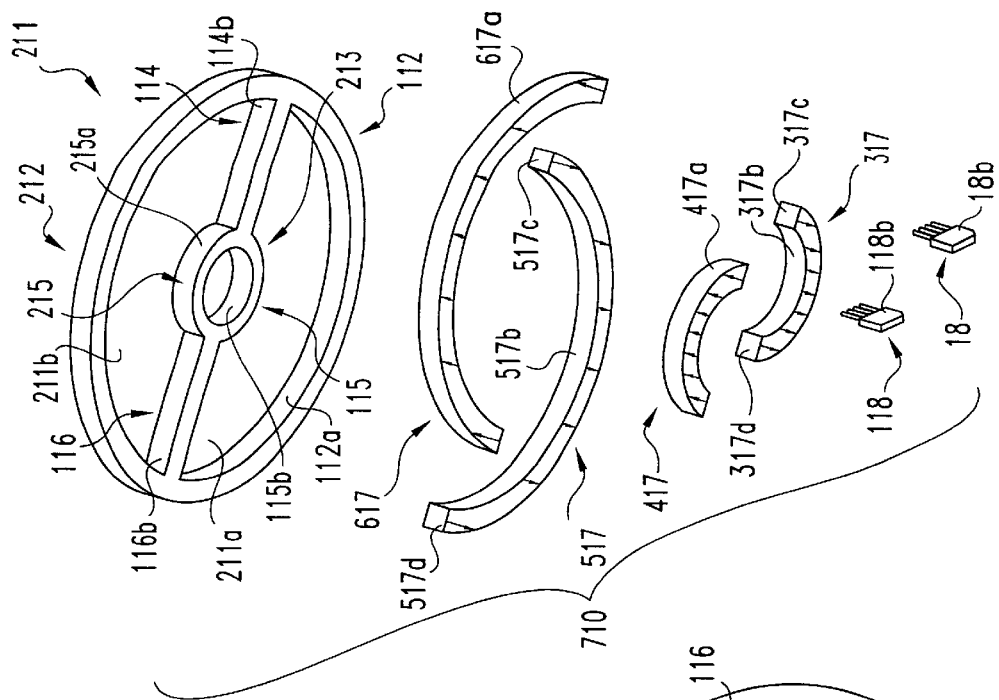
*Fig. 12B*
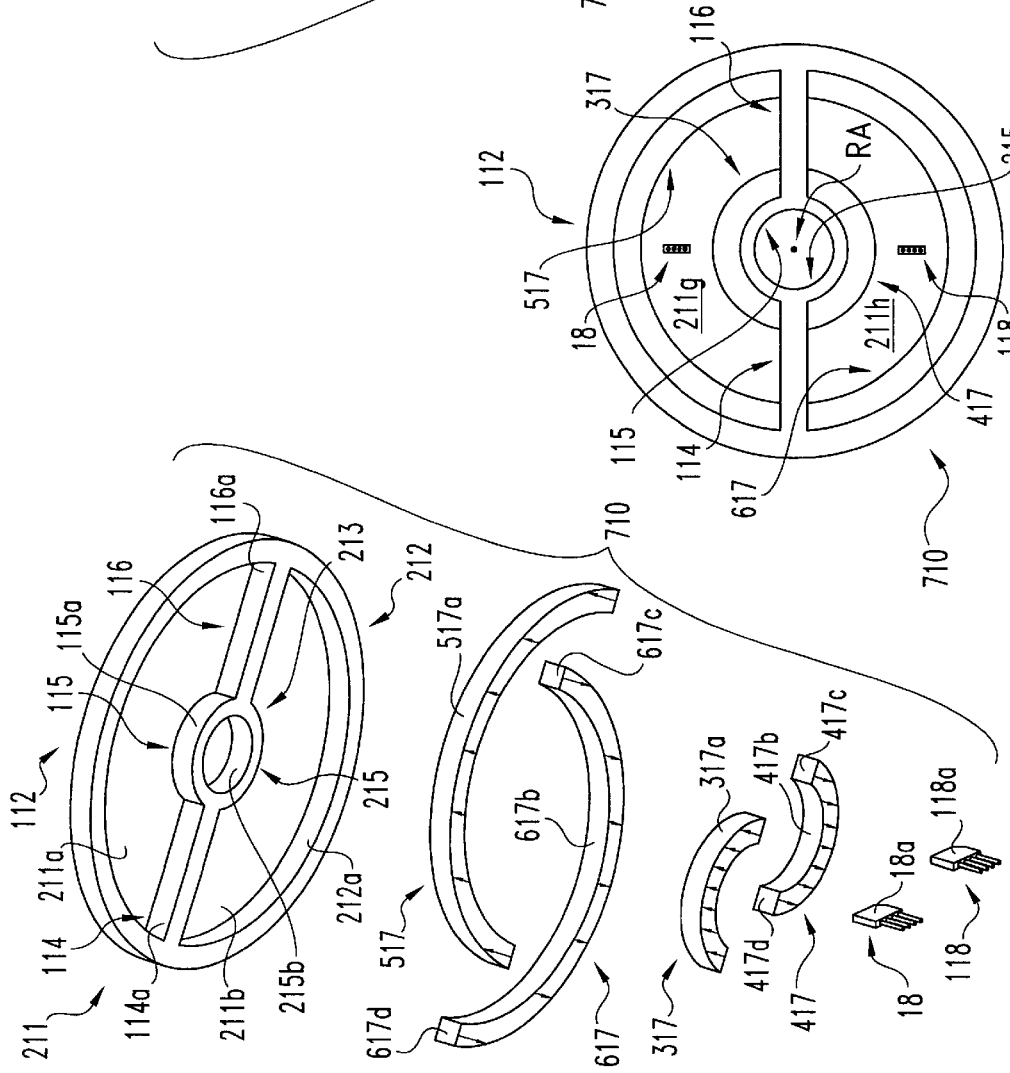
*Fig. 12C*
*Fig. 12A*

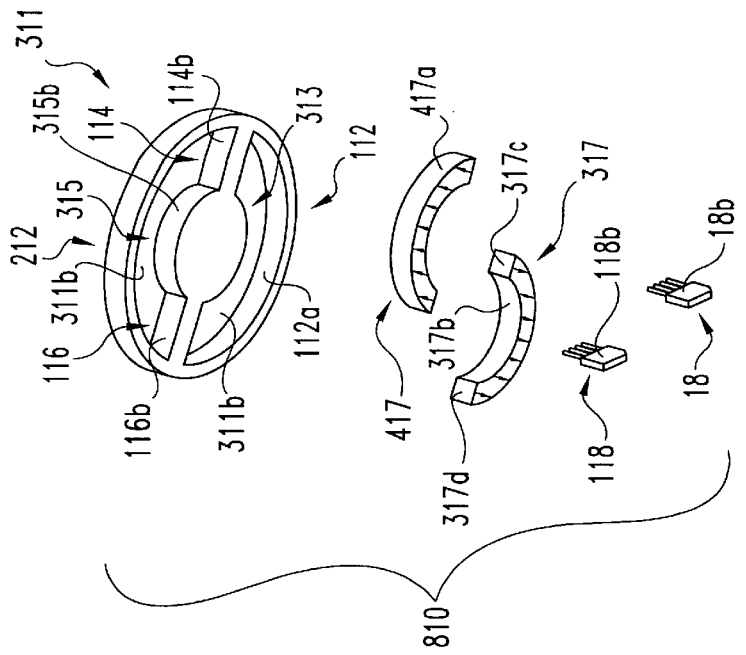
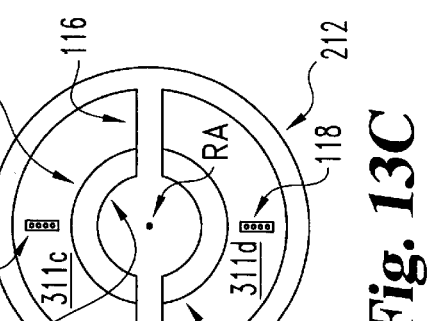
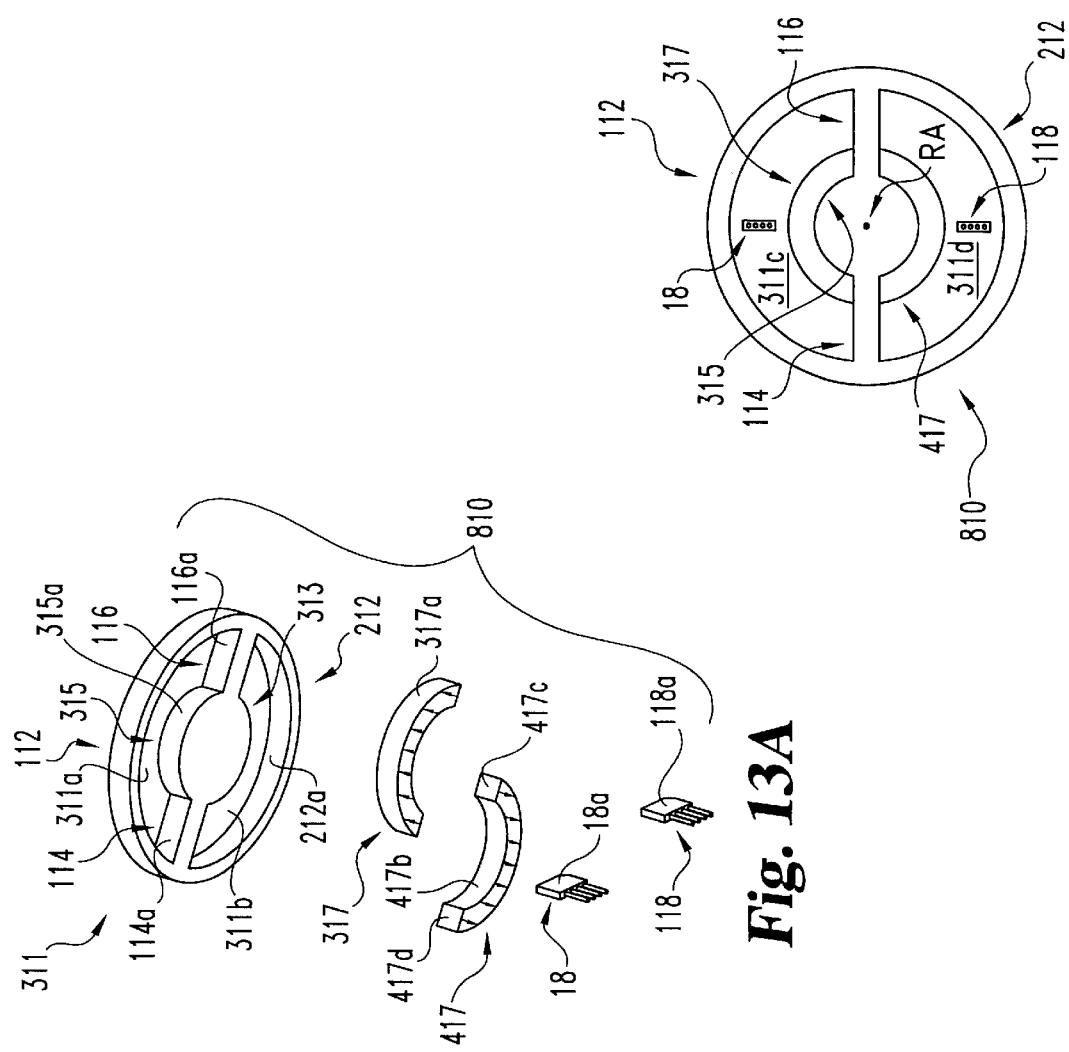
Fig. 13A
Fig. 13B
Fig. 13C

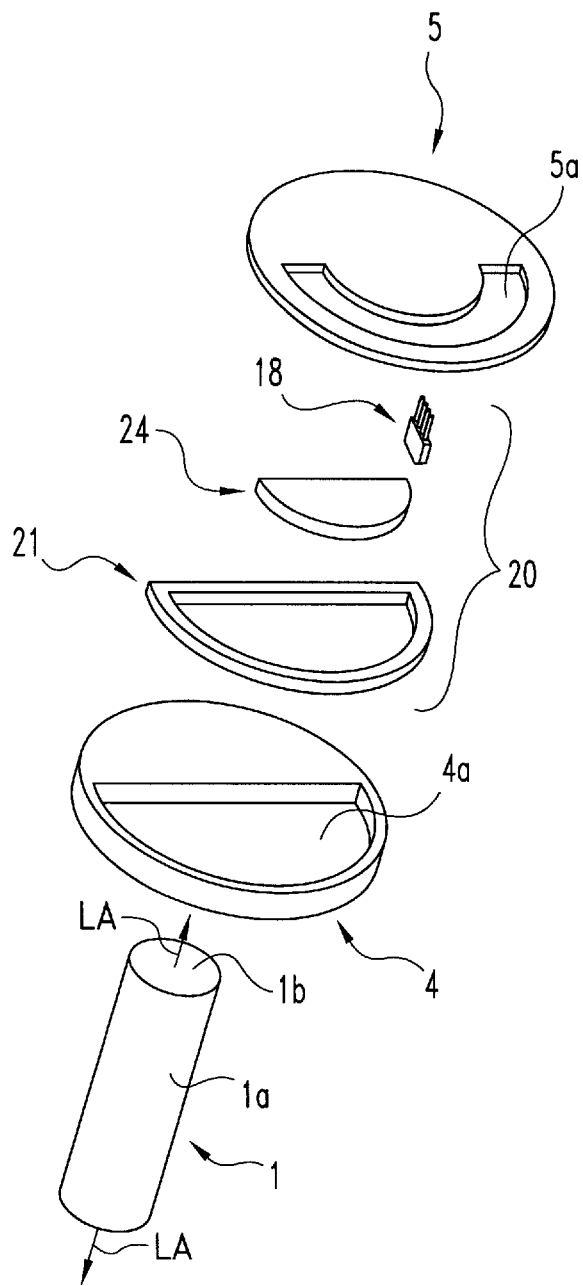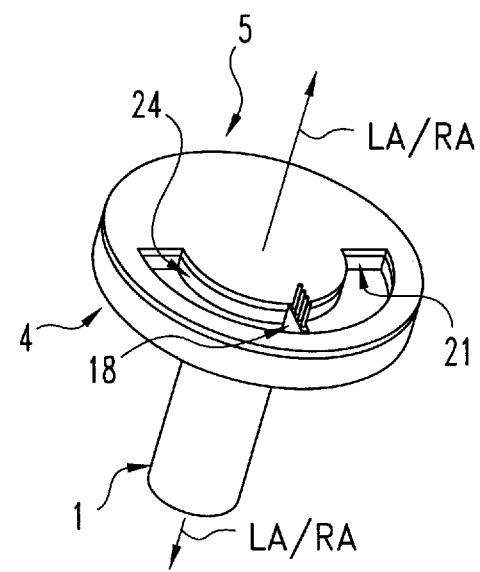
Fig. 15A
Fig. 15B

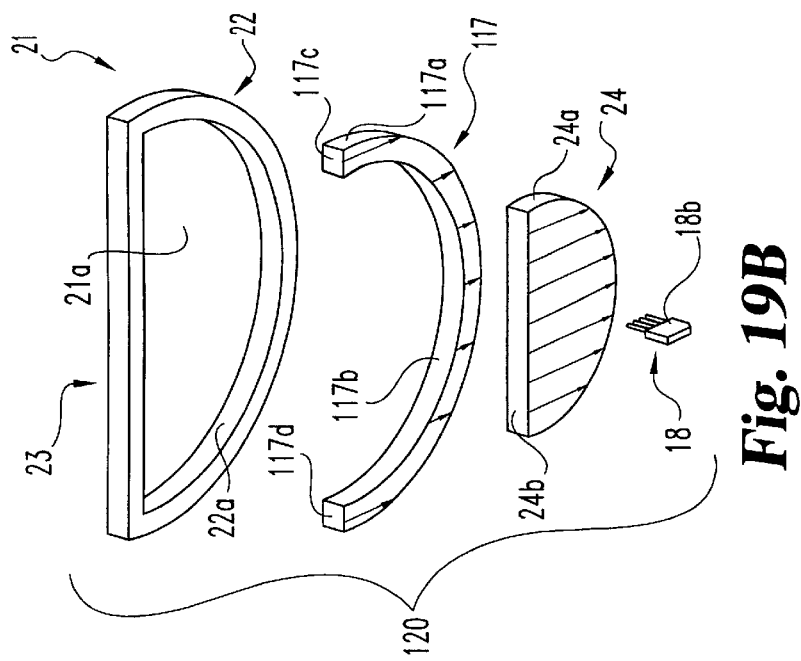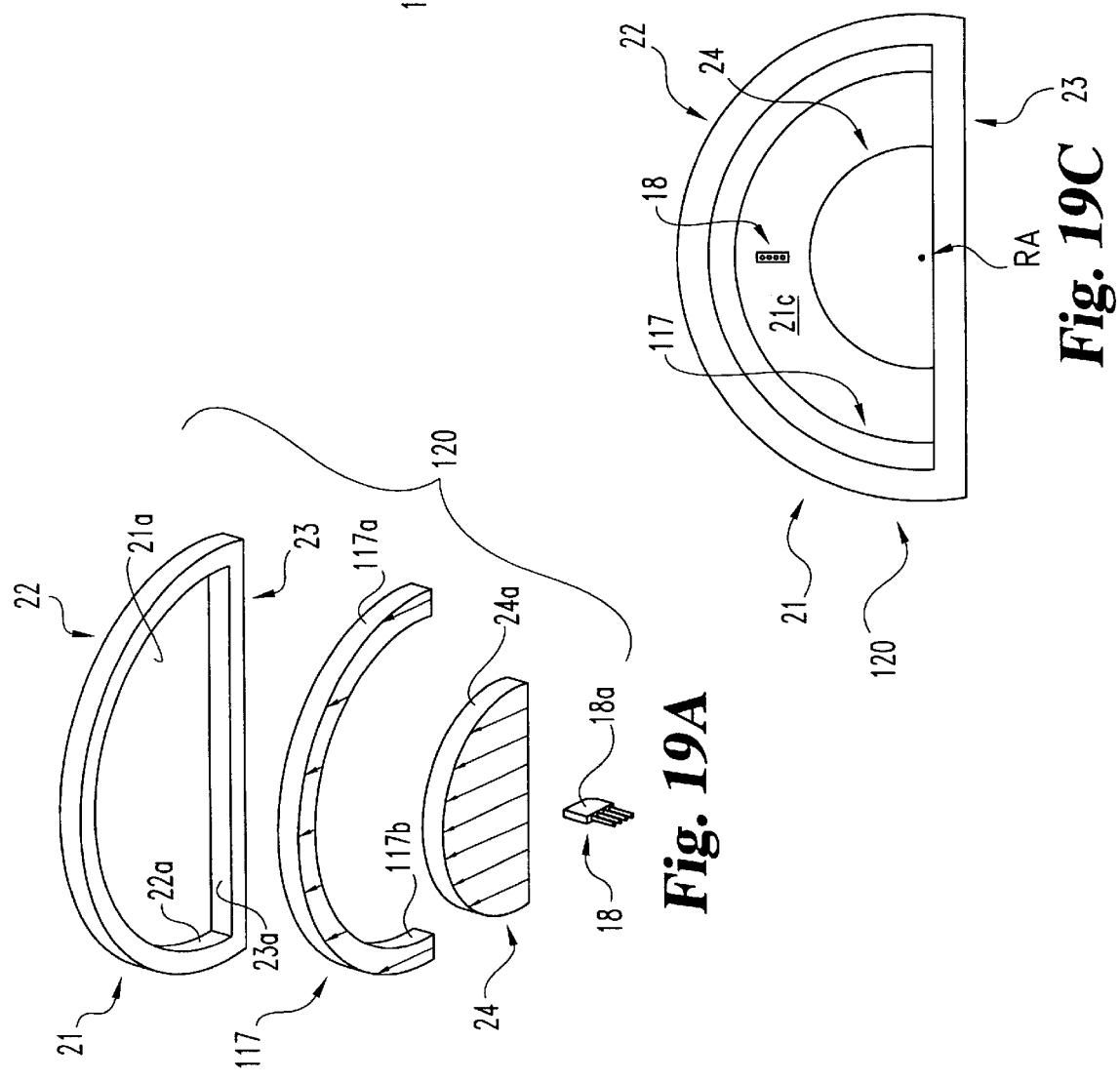
*Fig. 19A*
*Fig. 19B*
*Fig. 19C*

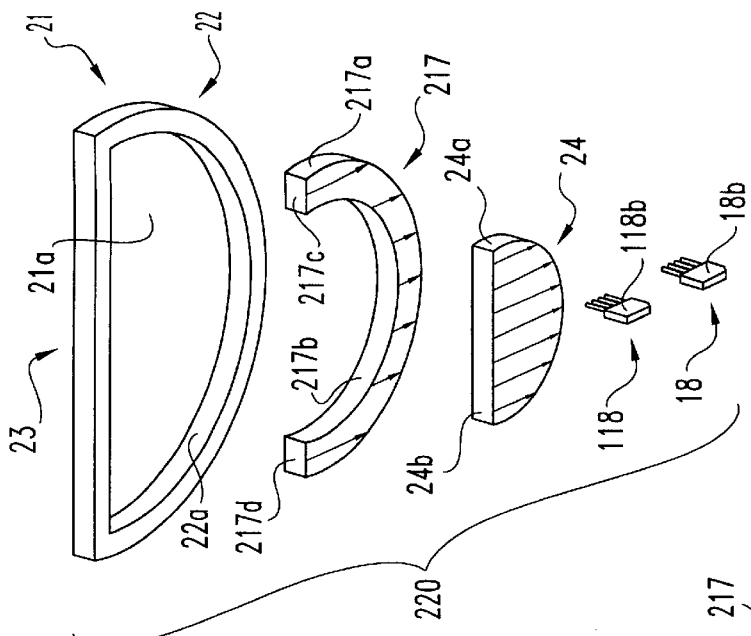
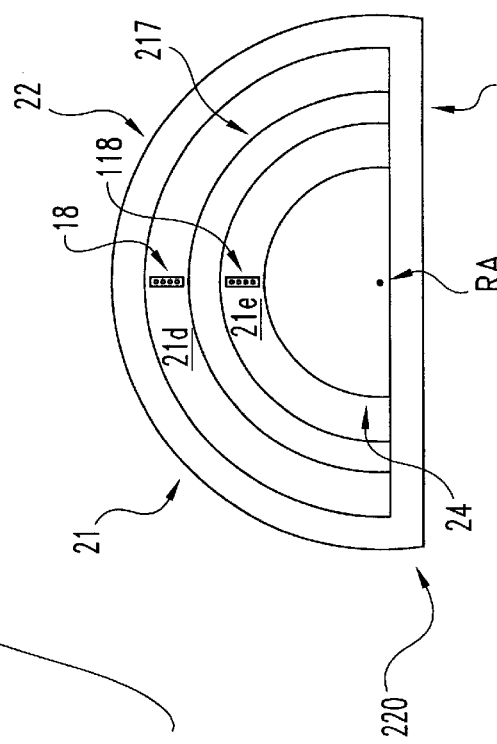
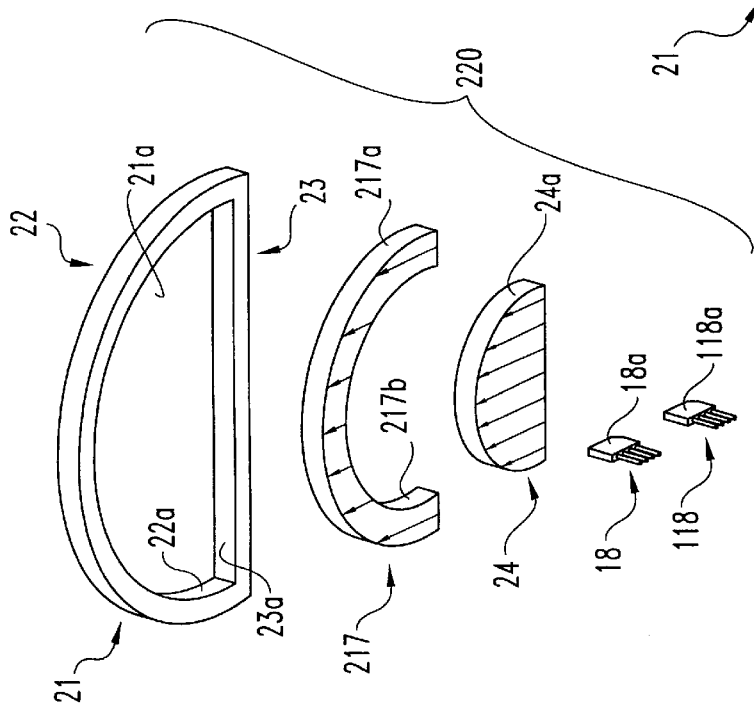
Fig. 20B
Fig. 20C
Fig. 20A

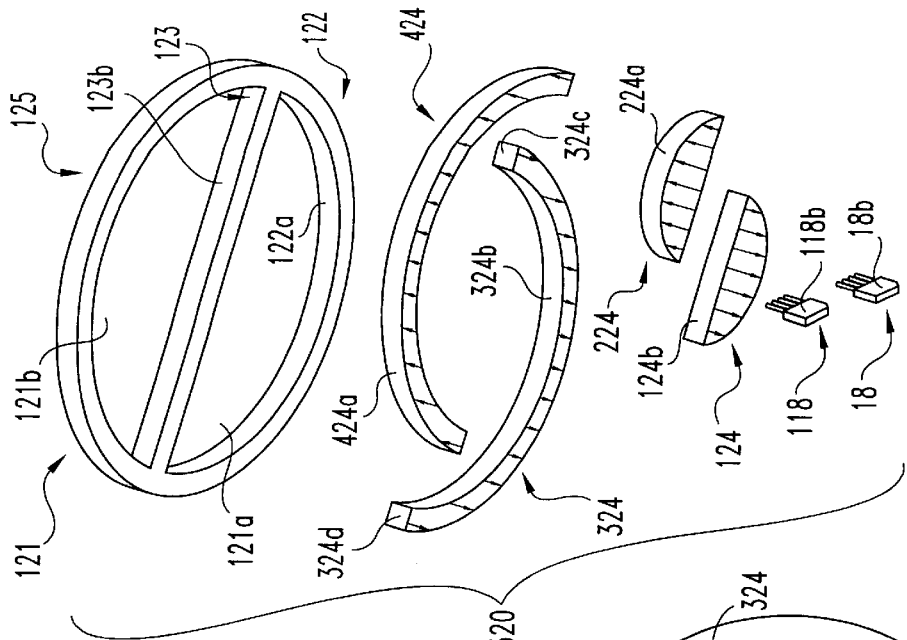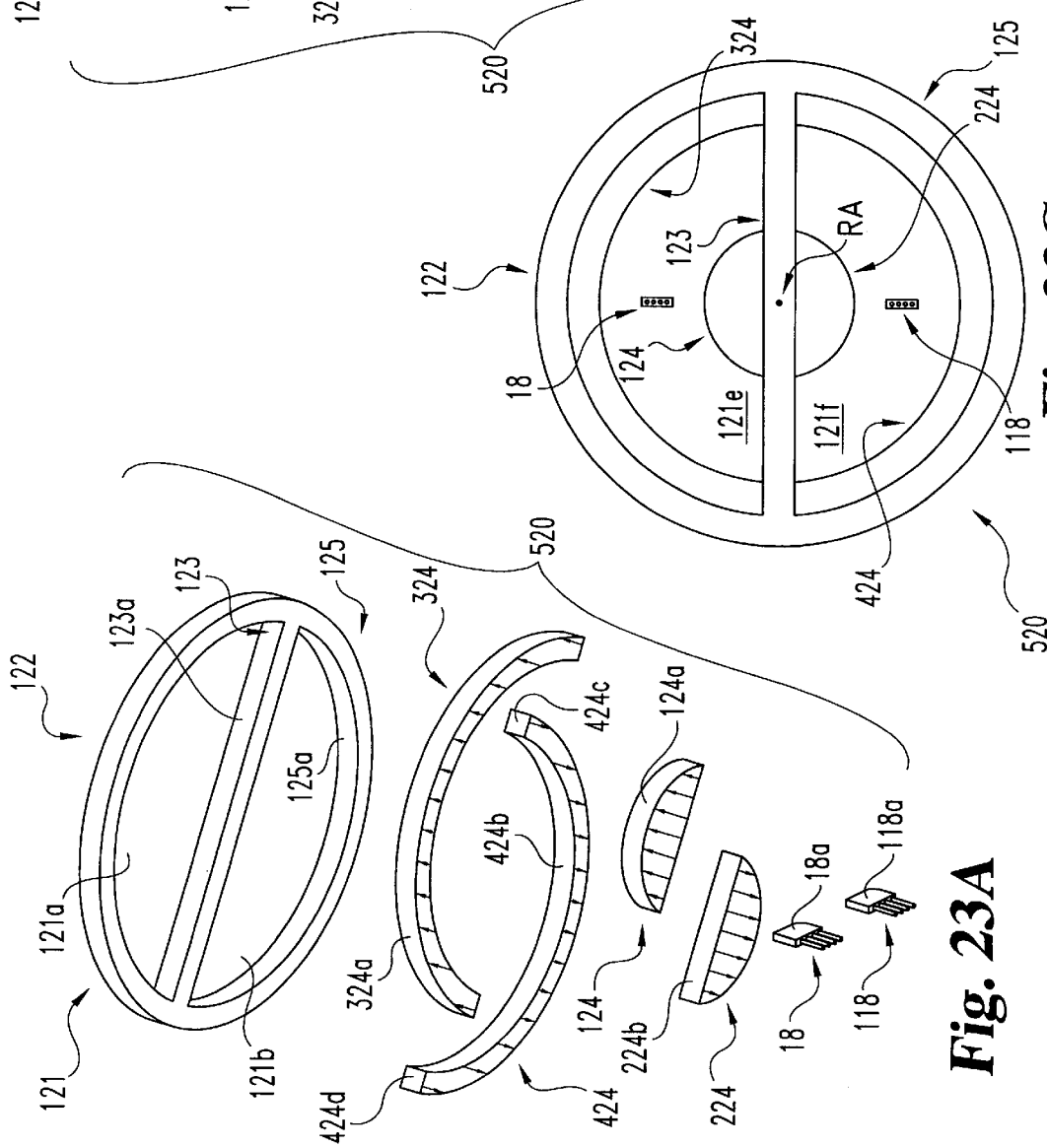
Fig. 23B
Fig. 23C
Fig. 23A

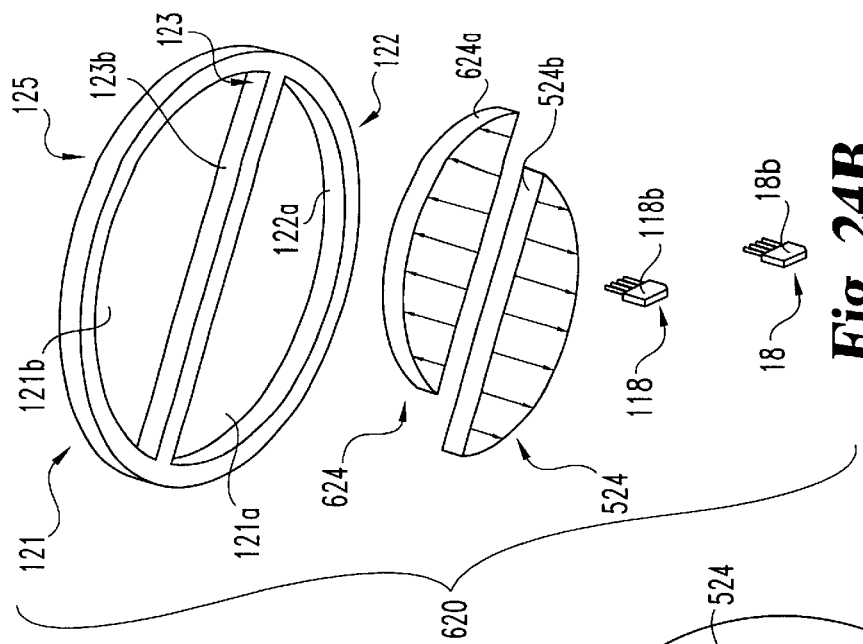
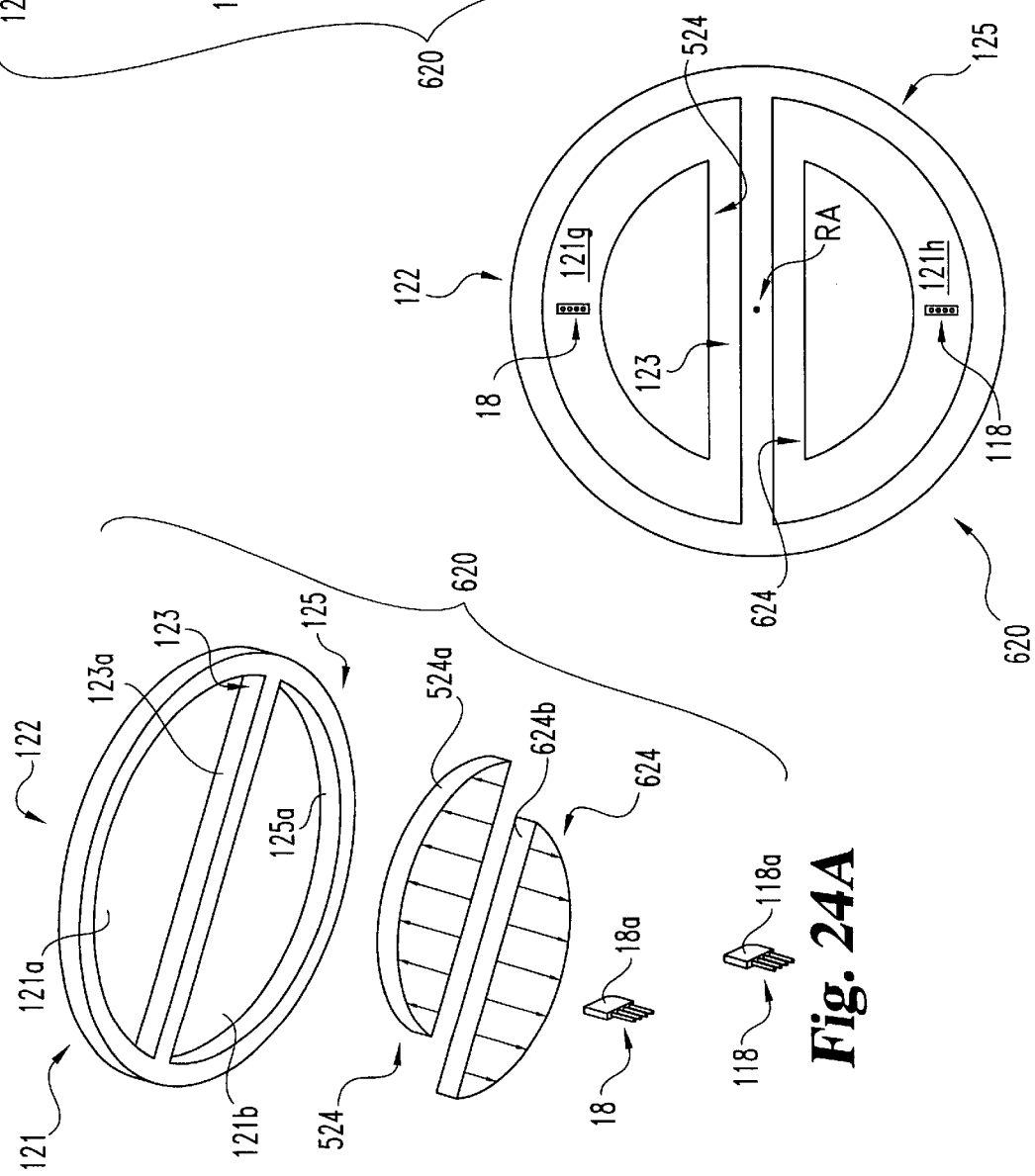

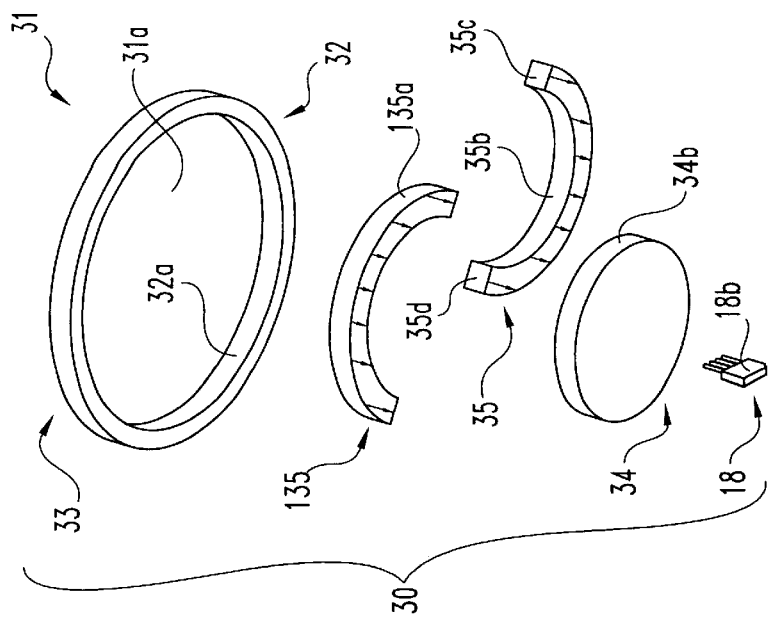
*Fig. 25B*
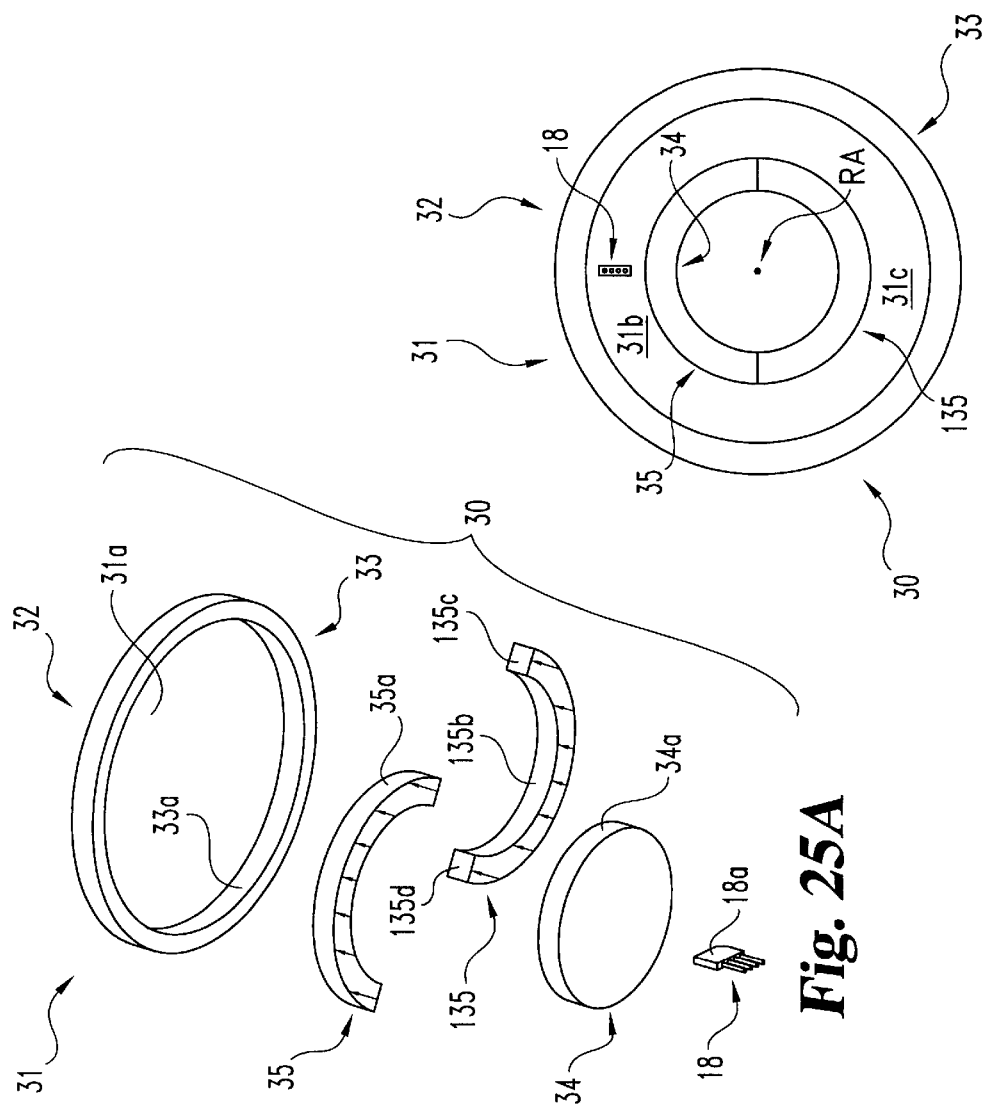
*Fig. 25C*
*Fig. 25A*

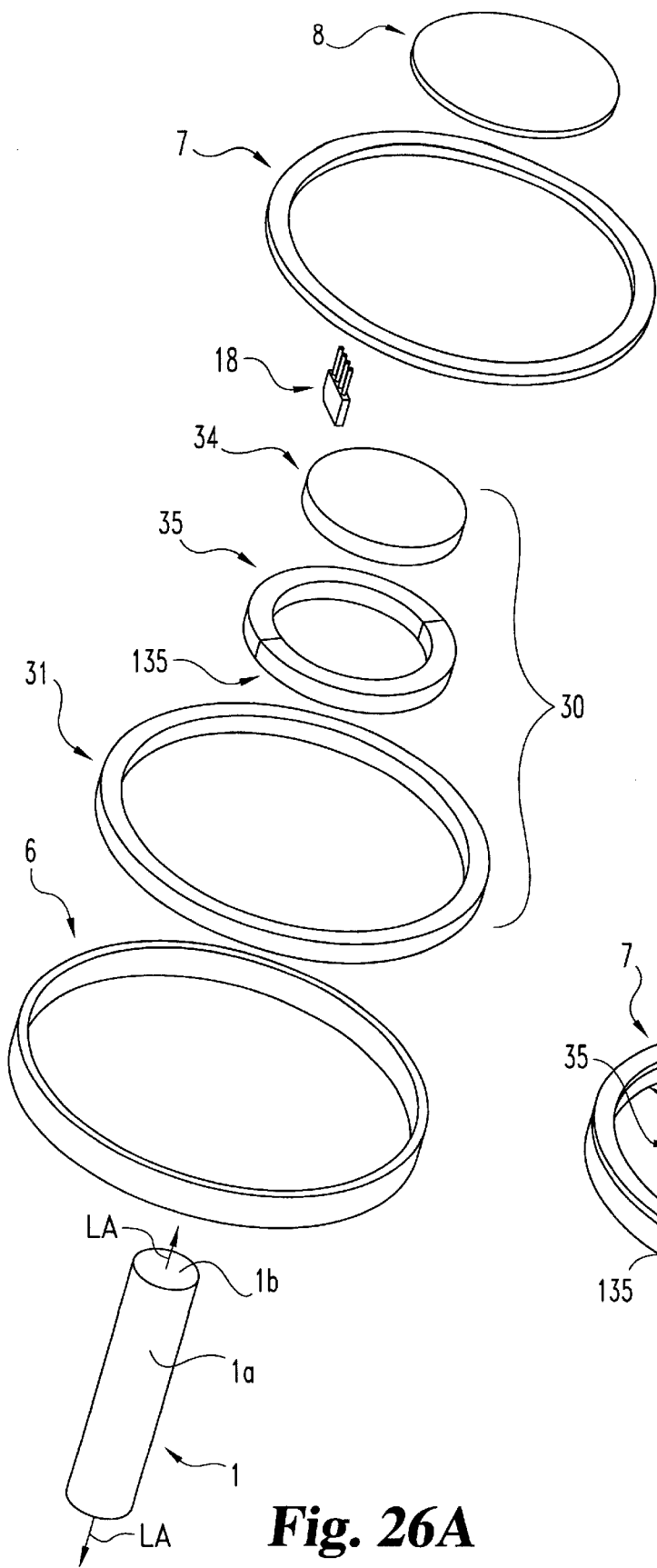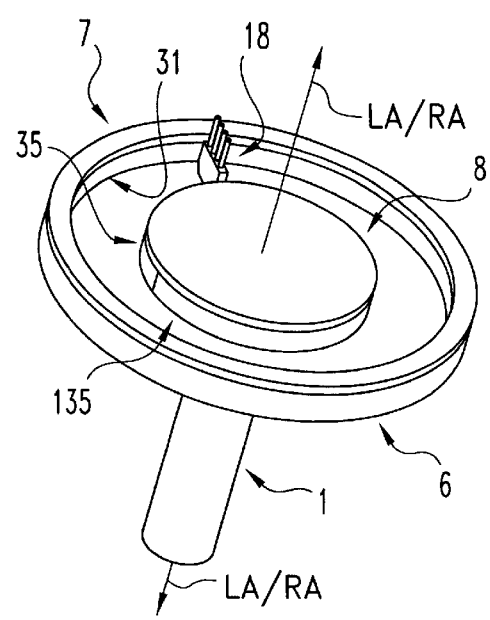
*Fig. 26A*  *Fig. 26B*

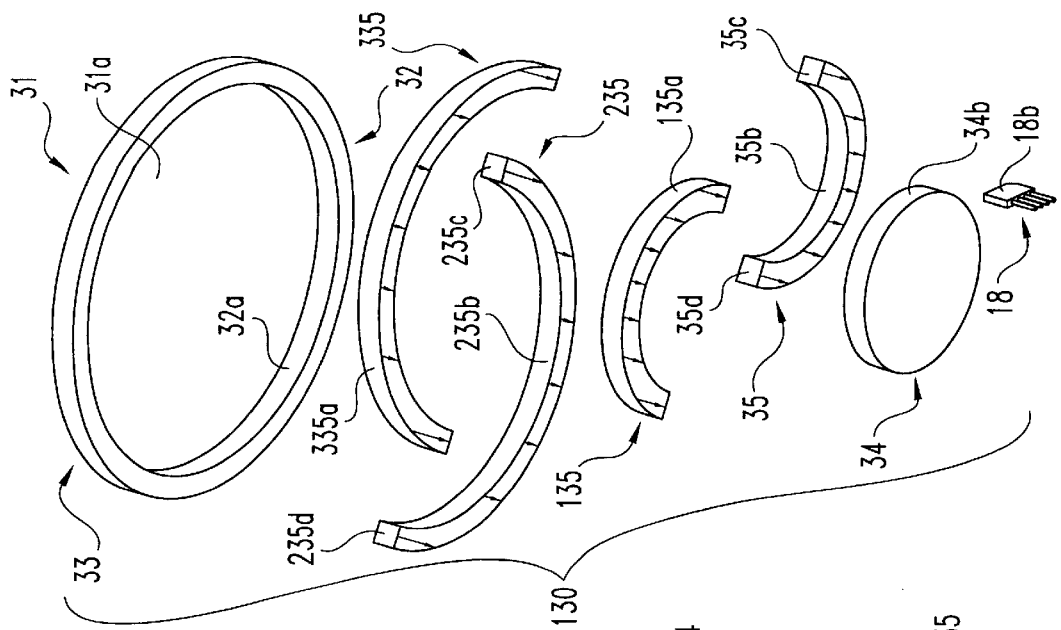
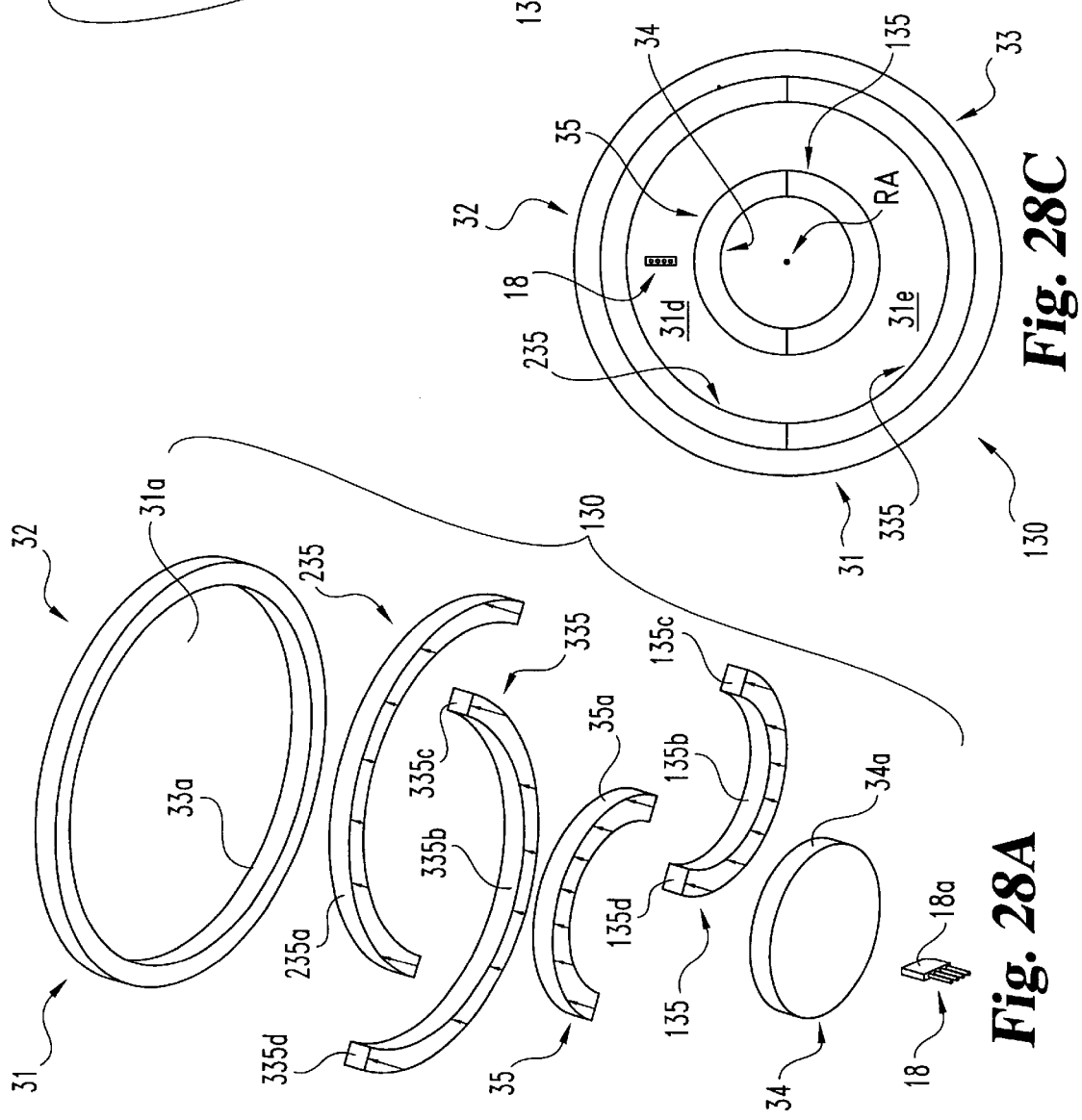
Fig. 28B
Fig. 28C
Fig. 28A

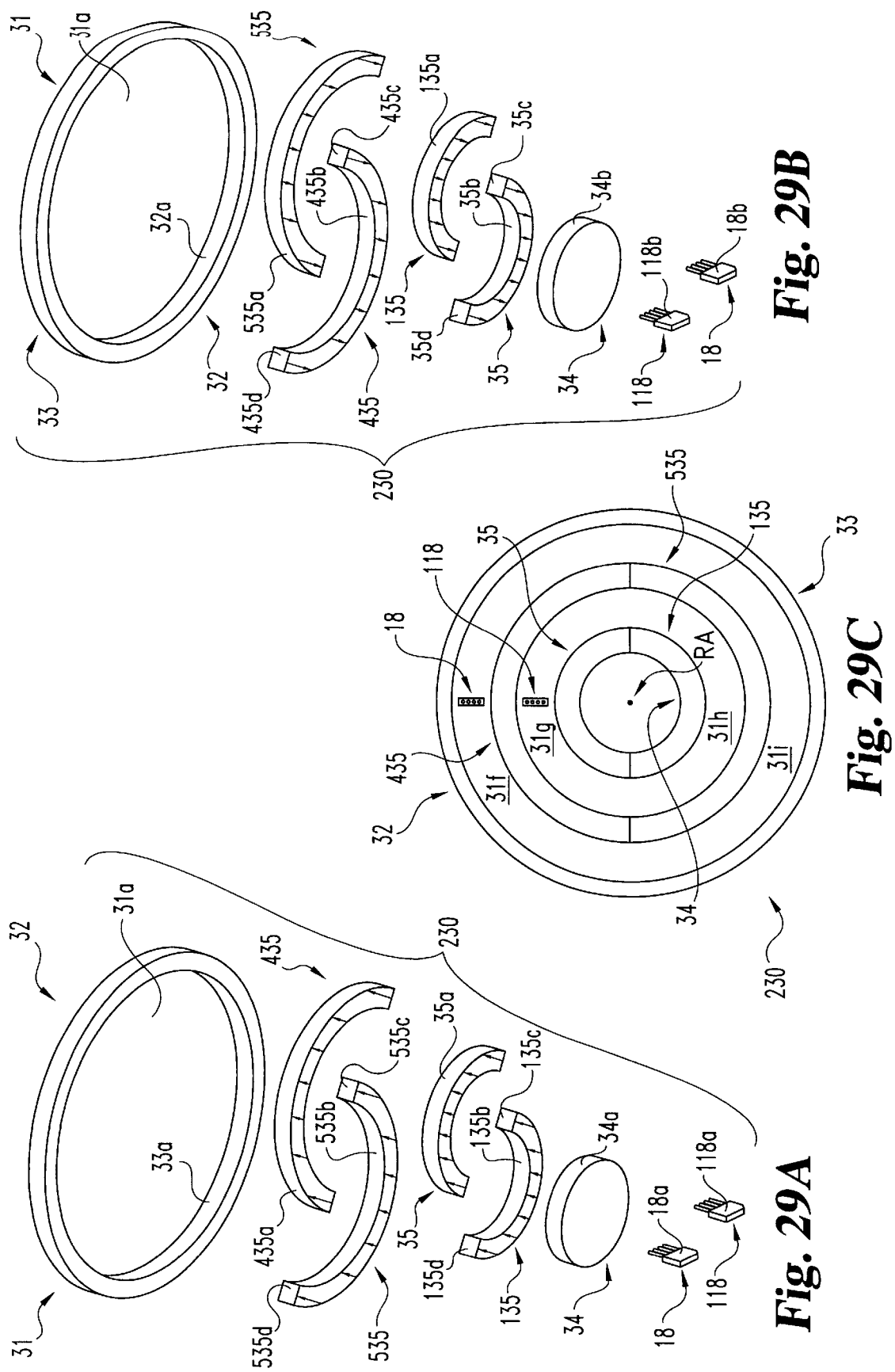

MAGNETIC ROTATIONAL POSITION SENSOR

BACKGROUND OF THE INVENTION

The present invention generally relates to the field of rotational position sensors, and more specifically to a magnetic rotational position sensor for sensing each rotational position of a control shaft about a rotational axis over a definable range of rotation.

Electronic fuel injected engines used in motor vehicles typically embody a microprocessor based control system. Fuel is metered or injector activation time is varied in accordance with various engine parameters including the regulation of air flow into the engine via a rotational position of a throttle diaphragm relative to a closed position of the throttle diaphragm. Typically, a shaft is adjoined to the throttle diaphragm to synchronously rotate the throttle diaphragm as the shaft is rotated between the closed position and a maximal open position of the throttle diaphragm. Rotational position sensors are adjoined to or adjacent the shaft to sense each rotational position of the shaft, i.e. each degree of rotation of the shaft relative to the closed position, thereby the rotational position of the throttle diaphragm relative to the closed position is sensed.

One of the problems associated with prior contact rotational position sensors that incorporate a contact element, e.g. a contact potentiometer, is the wear and tear experienced by the contact element that reduces the useable life of the contact rotational position sensor. One of the problems associated with prior magnetic rotational position sensors is magnetic hysteresis. Magnetic hysteresis causes an offset error signal to be generated whenever a magnet of the sensor is advanced from and returned to a reference position of the magnet, or whenever a magnetizable component of the sensor, e.g. a magnetizable pole piece, is advanced from or toward the magnet of the sensor. Annealing the magnet can minimize, but never eliminate, magnetic hysteresis. What is therefore needed is a novel and unique magnetic rotational position sensor that neither incorporates a contact element nor experiences magnetic hysteresis.

SUMMARY OF THE INVENTION

The present invention is a magnetic rotational position sensor for sensing each degree of rotation of a control shaft about a first rotational axis over a definable range of rotation. The present invention overcomes the aforementioned drawbacks associated with prior contact rotational position sensors and prior magnetic rotational position sensors. Various aspects of the present invention are novel, non-obvious, and provide various advantages. While the actual nature of the present invention described in detail herein can only be determined with reference to the claims appended hereto, certain features which are characteristic of the present invention disclosed herein can be described briefly.

Each embodiment of a magnetic rotational position sensor in accordance with the present invention comprises a loop pole piece, one or more magnets, and one or more magnetic flux sensitive transducers. The loop pole piece includes a plurality of pole pieces serially adjoined in a closed configuration to define an air gap area. One or more pole pieces of the loop pole piece has an inner diameter surface radially extending from a second rotational axis. Each magnet has a north pole surface and a south pole surface to generate magnetic flux.

A magnet is disposed within the air gap area of the loop pole piece with each pole surface of the magnet facing either the inner diameter of a pole piece of the loop pole piece or a pole surface of another magnet disposed within the air gap area to enclose the magnetic flux from the magnet(s) within the loop pole piece to thereby establish a magnetic field throughout the air gap area. The loop pole piece and the magnet(s) are adjoined to the control shaft to synchronously rotate about the second rotational axis over the definable range of rotation as the control shaft is rotated about the first rotational axis over the definable range of rotation. Thus, each degree of rotation of the control shaft about the first rotational axis over the definable range of rotation exclusively corresponds to a distinct degree of synchronized rotation of the magnetic field about the second rotational axis over the definable range of rotation.

In a first aspect of the present invention, a pole surface of a magnet disposed within the air gap area spatially faces an inner diameter surface of a pole piece of the loop pole piece to define a working air gap area therebetween. The pole surface of the magnet, and the inner diameter surface of the pole piece are contoured to arcuately configure the working air gap area. In a second aspect of the present invention, a pole surface of a first magnet disposed within the air gap area spatially faces a pole surface of a second magnet disposed within the air gap area to define a working air gap area therebetween. The pole surface of the first magnet, and the pole surface of the second magnet are contoured to arcuately configure the working air gap area.

Each magnetic flux sensitive transducer is operable to sense a magnetic flux density of any magnetic flux passing through the magnetic flux sensitive transducer. A magnetic flux sensitive transducer is disposed within each working air gap area. The arcuate configuration of the working air gap area enables the magnetic flux sensitive transducer to be operable to sense a different magnitude of magnetic flux density for each degree of synchronously rotation of the control shaft and the magnetic field over a definable range of rotation.

It is a primary object of the present invention to sense each rotational position of the control shaft about the rotational axis over the definable range of rotation without experiencing magnetic hysteresis by synchronously rotating the loop pole piece, and the magnet(s) about the second rotational axis as the control shaft rotates about the first rotational axis.

Further objects, features, and advantages of the present invention shall become apparent from the detailed drawings and descriptions provided herein.

BRIEF DESCRIPTION OF THE DRAWINGS

FIGS. 2A–2B are views of an exemplary adjoining of the magnetic rotational position sensor of FIGS. 1A–1C to a cylindrical control shaft.

FIGS. 4A–4C are views of a first modified embodiment of the magnetic rotational position sensor of FIGS. 1A–1C.

FIGS. 6A–6C are views of a first alternative embodiment of the magnetic rotational position sensor of FIGS. 1A–1C.

FIGS. 7A–7C are views of a second alternative embodiment of the magnetic rotational position sensor of FIGS. 1A–1C.

FIGS. 9A–9C are views of a fourth alternative embodiment of the magnetic rotational position sensor of FIGS. 1A–1C.

FIGS. 10A–10C are views of a fifth alternative embodiment of the magnetic rotational position sensor of FIGS. 1A–1C.

FIGS. 11A–11C are views of a sixth alternative embodiment of the magnetic rotational position sensor of FIGS. 1A–1C.

FIGS. 12A–12C are views of a seventh alternative embodiment of the magnetic rotational position sensor of FIGS. 1A–1C.

FIGS. 13A–13C are views of an eighth alternative embodiment of the magnetic rotational position sensor of FIGS. 1A–1C.

FIGS. 15A–15B are views of an exemplary adjoining of the magnetic rotational position sensor of FIGS. 14A–14C to a cylindrical control shaft.

FIGS. 19A–19C are views of a first alternative embodiment of the magnetic rotational position sensor of FIGS. 14A–14C.

FIGS. 20A–20C are views of a second alternative embodiment of the magnetic rotational position sensor of FIGS. 14A–14C.

FIGS. 23A–23C are views of a fifth alternative embodiment of the magnetic rotational position sensor of FIGS. 14A–14C.

FIGS. 24A–24C are views of a sixth alternative embodiment of the magnetic rotational position sensor of FIGS. 14A–14C.

FIGS. 25A–25C are views of another embodiment of a magnetic rotational position sensor in accordance with the present invention.

FIGS. 26A–26B are views of an exemplary adjoining of the magnetic rotational position sensor of FIGS. 25A–25C to a cylindrical control shaft.

FIGS. 28A–28C are views of a first alternative embodiment of the magnetic rotational position sensor of FIGS. 25A–25C.

FIGS. 29A–29C are views of a second alternative embodiment of the magnetic rotational position sensor of FIGS. 25A–25C.

DESCRIPTION OF THE PREFERRED EMBODIMENTS

Figure 1B:
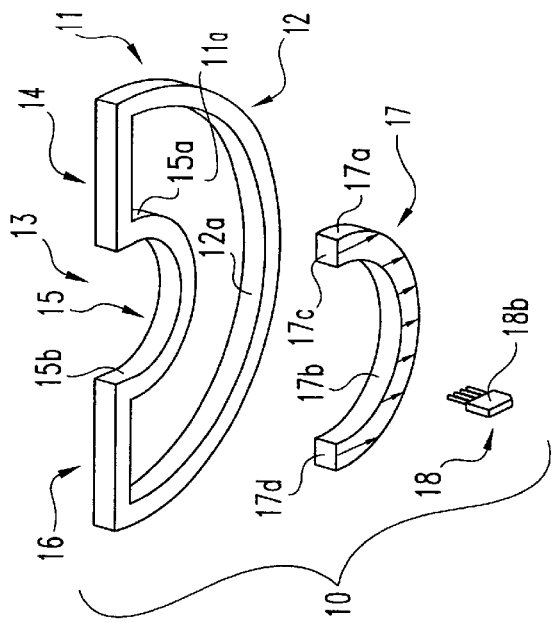
FIGS. 1A–1C are views of one embodiment of a magnetic rotational position sensor in accordance with the present invention.

For the purposes of promoting an understanding of the principles of the present invention, reference will now be made to the preferred embodiments of the present invention as illustrated in the drawings and specific language will be used to describe the same. It will nevertheless be understood that no limitation of the scope of the present invention is thereby intended. Any alterations and further modifications in the illustrated embodiments, and any further applications of the principles of the present invention as illustrated herein are contemplated as would normally occur to one skilled in the art to which the present invention relates.

The present invention is a series of novel and unique magnetic rotational position sensors for sensing each degree of rotation of a control shaft about a rotational axis over a definable range of rotation without experiencing magnetic hysteresis. For purposes of the present invention, a control shaft is broadly defined as an article of manufacture or a combination of manufactured articles for controlling, directly or indirectly, any rotational movement, any linear movement, and/or any angular movement of an object, e.g. a throttle diaphragm, a foot pedal, a piston, etc., as the control shaft is rotated about a rotational axis, e.g. a longitudinal axis of the control shaft. The present invention contemplates that a control shaft may be magnetic or magnetizable. The present invention further contemplates that a control shaft can have any geometric configuration and any physical dimensions.

Each embodiment of a magnetic rotational position sensor in accordance with the present invention comprises a loop pole piece, one or more magnets, and one or more magnetic flux sensitive transducers. An embodiment of a magnetic rotational position sensor in accordance with the present invention can further include one or more auxiliary pole pieces.

For purposes of the present invention, a pole piece is broadly defined as an article of manufacture or a combination of manufactured articles for conducting magnetic flux, and a loop pole piece is defined as a plurality of pole pieces serially adjoined in a closed configuration to define an air gap area. Also for purposes of the present invention, a serial adjoining of the plurality of pole pieces is broadly defined as an unitary fabrication, a permanent affixation, a detachable coupling, an engagement, and/or a contiguous disposal of each pole piece in a serial arrangement by any manufacturing method. Accordingly, the present invention contemplates that a pole piece can be made from any ferromagnetic material or any combination of ferromagnetic materials. The present invention further contemplates that a pole piece can have any geometric configuration and any physical dimensions. Consequently, any preferential reference of a particular type of adjoining of the plurality of pole pieces of an illustrated loop pole piece herein, any preferential reference to a particular ferromagnetic material or combination of ferromagnetic materials for an illustrated pole piece herein, and any reference to a particular geometric configuration and/or physical dimensions of an illustrated pole piece herein are given solely for purposes of describing the best mode of the present invention and is not meant to be limiting in any way.

For purposes of the present invention, a magnet is broadly defined as an article of manufacture or a combination of manufactured articles having a north pole surface and a south pole surface for generating magnetic flux. Accordingly, the present invention contemplates that a magnet can be made from any magnetic material or any combination of magnetic materials. The present invention further contemplates that a magnet can have any geometric configuration and any physical dimensions. Consequently, any preferential reference to a particular magnetic material or combination of magnetic materials for an illustrated magnet herein, and any reference to a particular geometric configuration and/or physical dimensions of an illustrated magnet herein is given solely for purposes of describing the best mode of the present invention and is not meant to be limiting in any way. Each magnet illustrated herein is described as having magnetic flux rectilinearly magnetized within the magnet from one or more south pole surfaces to one or more north pole surfaces prior to a disposal of the magnet within a loop pole piece. Such rectilinearly magnetization of the magnetic flux facilitates a linear sensing of a rotational position of a control shaft, and is illustrated solely for the purposes of describing the best mode of the present invention and is not meant to be limiting in any way. In addition, for each illustrated magnet herein, the present invention contemplates that the north pole surface(s) and the south pole surface(s) of an illustrated magnet can be interchanged.

For purposes of the present invention, a magnetic flux sensitive transducer is broadly defined as an article of manufacture or a combination of articles operable to sense a magnetic flux density of any magnetic flux passing through the magnetic flux sensitive transducer, i.e. a Hall element, a magneto-resistive element, a coil, etc. Consequently, any preferential reference to a particular magnetic flux sensitive transducer as illustrated herein is given solely for purposes of describing the best mode of the present invention and is not meant to be limiting in any way.

For each embodiment of a magnetic rotational position sensor in accordance with the present invention, each magnet is disposed within an air gap area of a loop pole piece to enclose the magnetic flux from the magnet within the loop pole piece to thereby establish a magnetic field throughout the air gap area. Each magnet has a pole surface spatially facing either an inner diameter surface of the loop pole piece, a pole surface of another magnet, or a surface of an auxiliary pole piece disposed within the air gap area of the loop pole piece to define a working air gap area of the air gap area as subsequently described herein. The loop pole piece, and the magnet(s) are adjoined to a control shaft to synchronously rotate about a second rotational axis as the control shaft is rotated about the first rotational axis over the definable range of rotation as subsequently described herein, and as a result, each degree of rotation of the control shaft about the first rotational axis exclusively corresponds to a distinct degree of synchronized rotation of the established magnetic field about the second rotational axis over the definable range of rotation. For purposes of the present invention, an adjoining of the loop pole piece and the magnet(s) to the control shaft is broadly defined as an unitary fabrication, a permanent affixation, a detachable coupling, an engagement, and/or a contiguous disposal of the loop pole piece and the magnet(s) to the control shaft by any manufacturing method. The present invention contemplates that the first rotational axis and the second rotational axis may or may not coincide. Consequently, any preferential reference to a type of adjoining of a loop pole piece and magnet or magnets to a controls shaft as illustrated herein, and any preferential reference herein to an illustrated spatial positioning of the second rotational axis relative to the first rotational axis as illustrated herein are given solely for purposes of the describing the best mode of the present invention and is not meant to be limiting in any way.

Also for each embodiment of a magnetic rotational position sensor in accordance with the present invention, each working air gap area is arcuately configured as subsequently described herein, and as a result, a magnetic flux sensitive transducer disposed within the arcuately configured working air gap area is operable to sense a different magnitude of magnetic flux density for each degree of synchronized rotation of the magnetic field(s) over the definable range of rotation. The present invention contemplates that a working air gap area may or may not have a circular arcuate configuration, and may or may not have a symmetrical arcuate configuration. The present invention further contemplates that a working air gap area having a circular arcuate configuration may or may not concentrically align with either the first rotational axis and/or the second rotational axis. Consequently, any reference to a particular arcuate configuration of an illustrated working air gap area herein, and any reference to a particular alignment of a working air gap area relative to the first rotational axis and to the second rotational axis as illustrated herein are given solely for purposes of the describing the best mode of the present invention and is not meant to be limiting in any way.

Preferred embodiments of the present invention as well as modified and alternative embodiments of the present invention will now be described herein.

Figure 1C:
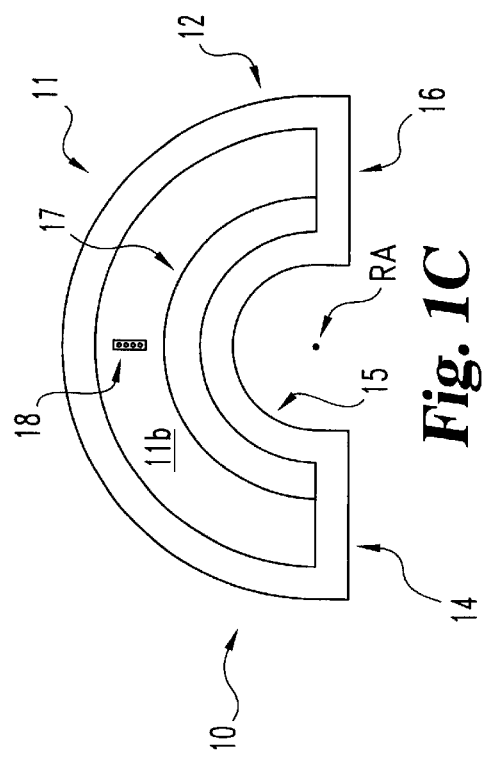
Figure 1A:
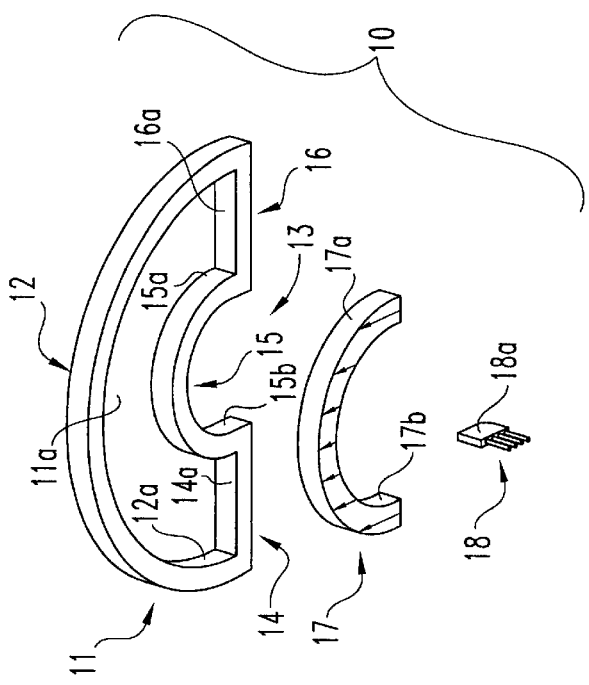

Referring to FIGS. 1A–1C, a magnetic rotational position sensor 10 is shown. Magnetic rotational position sensor 10 comprises a loop pole piece 11, a magnet 17, and a magnetic flux sensitive transducer in the preferable form of a Hall effect device 18. Loop pole piece 11 includes a circular arcuate pole piece 12, and a pole piece 13 having a rectangular prismatical pole segment 14, a circular arcuate pole segment 15, and a rectangular prismatical pole segment 16. Circular arcuate pole piece 12 and pole piece 13 are serially adjoined in a closed configuration to define an air gap area 11a. Preferably, circular arcuate pole piece 12 and pole piece 13 are unitarily fabricated from a ferromagnetic steel, e.g. a low carbon steel. Circular arcuate pole piece 12 and circular arcuate pole segment 15 concentrically align with a rotational axis RA as best shown in FIG. 1C, and concave inner diameter surface 12a of pole piece 12 and a convex inner diameter surface 15a of circular arcuate pole segment 15 radially extend from rotational axis RA over approximately 190 degrees to facilitate a rotation of loop pole piece 11 about rotational axis RA over a definable range of rotation upward to 180 degrees. A concave outer diameter surface 15b of circular arcuate pole segment 15 facilitates an adjoining of loop pole piece 11 to an outer diameter surface of a cylindrical control shaft as exemplary shown in FIGS. 2A and 2B.

Still referring to FIGS. 1A–1C, magnet 17 is a permanent magnet having a convex north pole surface 17a, a concave south pole surface 17b, a planar south pole surface 17c, and a planar south pole surface 17d to generate magnetic flux (not shown). Prior to an assembly of magnetic rotational position sensor 10, the magnetic flux within magnet 17 is rectilinearly magnetized from south pole surfaces 17b–17d to convex north pole surface 17a as exemplary shown by the arrows in FIGS. 1A and 1B. Magnet 17 is disposed within air gap area 11a of loop pole piece 11 with convex north pole surface 17a facing concave inner diameter surface 12a of pole piece 12, concave south pole surface 17b adjacently facing convex inner diameter surface 15a of circular arcutate segment 15, planar south pole surface 17c adjacently facing rectangular prismatical pole segment 14, and planar south pole surface 17d adjacently facing rectangular prismatical pole segment 16 to enclose the magnetic flux from magnet 17 within loop pole piece 11, and as a result, a magnetic field is established throughout air gap area 11a as exemplary shown in FIGS. 3A–3C. Convex north pole surface 17a of magnet 17 spatially faces concave inner diameter surface 12a of pole piece 12 to define a working air gap area 11b having a circular arcuate configuration therebetween. Alternatively, the present invention contemplates that concave south pole surface 17b can spatially face convex inner diameter surface 15 of circular arcuate pole segment 15, planar south pole surface 17c can spatial face rectangular prismatical pole segment 14, and/or planar south pole surface 17d can spatial face rectangular prismatical pole segment 16.

Still referring to FIGS. 1A–1C, Hall effect device 18 is disposed within working air gap area 11b. It is to be appreciated that Hall effect device 18 is operable to sense a magnetic flux density of any magnetic flux passing through Hall effect device 18 via a planar side surface 18a and a planar side surface 18b of Hall effect device 18. Hall effect device 18 is further operable to either generate either a voltage sensing signal as a function of the magnetic flux density of any magnetic flux passing through planar side surface 18a and/or a voltage sensing signal as a function of the magnetic flux density of any magnetic flux passing through planar side surface 18b.

Referring to FIGS. 2A and 2B, an exemplary adjoining of magnetic rotational position sensor 10 to a cylindrical control shaft 1 is shown. Magnetic rotational position sensor 10 is assembled as previously described in connection with FIGS. 1A–1C and accompanying text within a container 2, and a lid 3 is adjoined to container 2 to house pole piece 11 and magnet 17 within container 2. Lid 3 has a slot 3a to enable the leads of Hall effect device 18 to extend out of lid 3. Container 2, and lid 3 are adjoined to an outer diameter surface 1a of cylindrical control shaft 1 to adjoin loop pole piece 11 and magnet 17 to cylindrical control shaft 1 and to coincide rotational axis RA (FIG. 1C) with a longitudinal axis LA of cylindrical control shaft 1. It is to be appreciated that loop pole 11 and magnet 17 will synchronously rotate about coinciding rotational axes LA/RA as cylindrical control shaft 1 is rotated about coinciding rotational axes LA/RA, and as a result, each degree of rotation of cylindrical control shaft 1 about coinciding rotational axes LA/RA exclusively corresponds to a distinct degree of synchronized rotation of the magnetic field (not shown) established throughout air gap area 11a (FIGS. 1A and 1C) about coinciding rotational axes LA/RA over a definable range of rotation upward to 180 degrees.

Figure 3A:
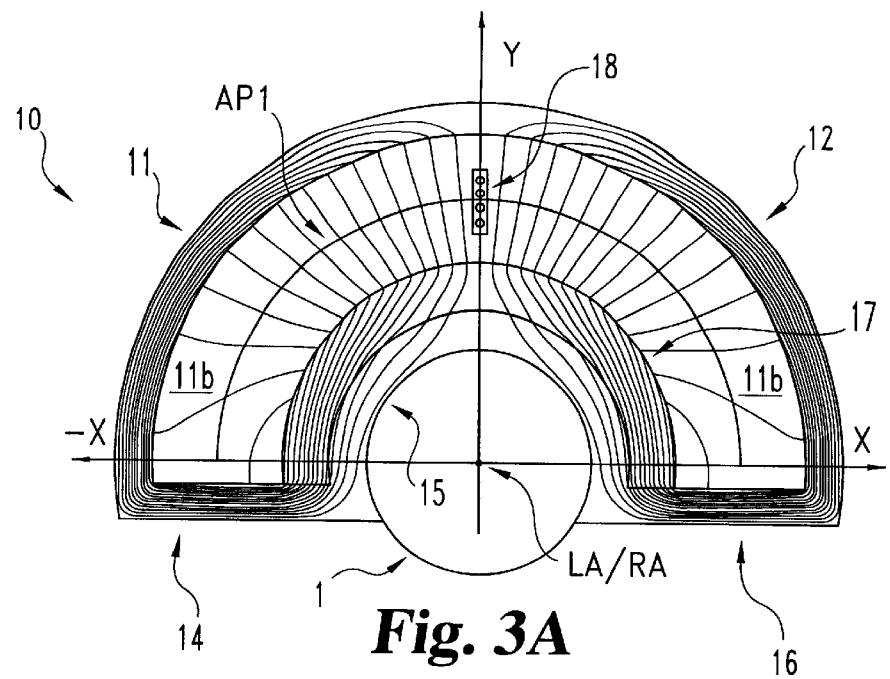
FIGS. 3A–3C are diagrammatic illustrations of a magnet and a loop pole piece of the magnetic rotational position sensor of FIGS. 1A–1C as well as the cylindrical control shaft of FIGS. 2A–2B synchronously rotating about a pair of coinciding rotational axes.
Figure 3B:
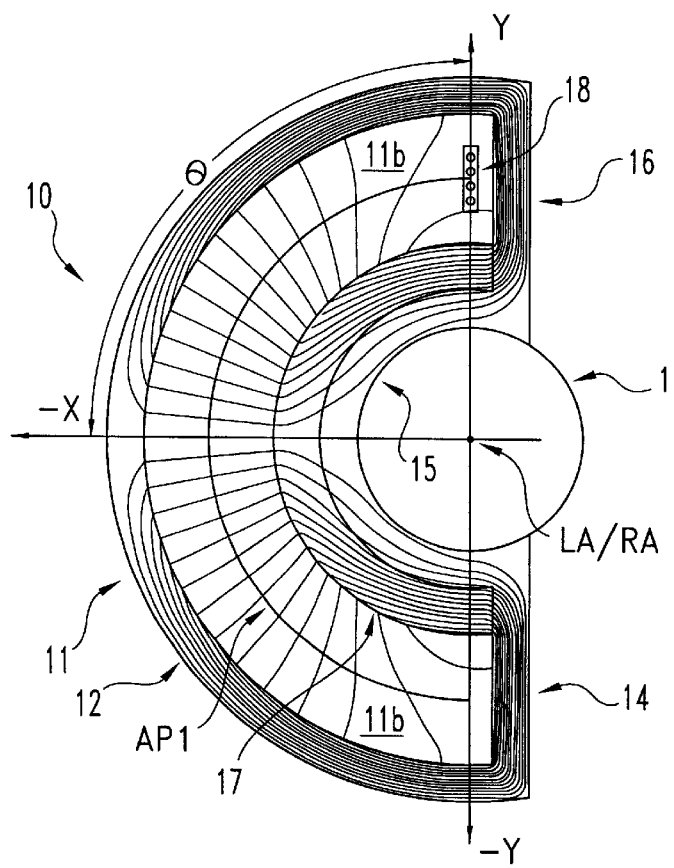
Figure 3C:
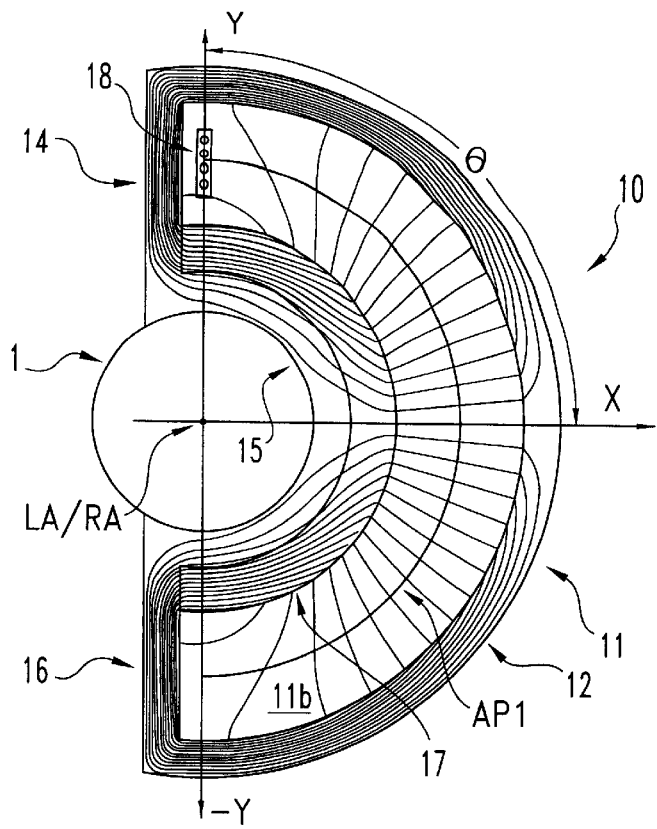
Figure 3D:
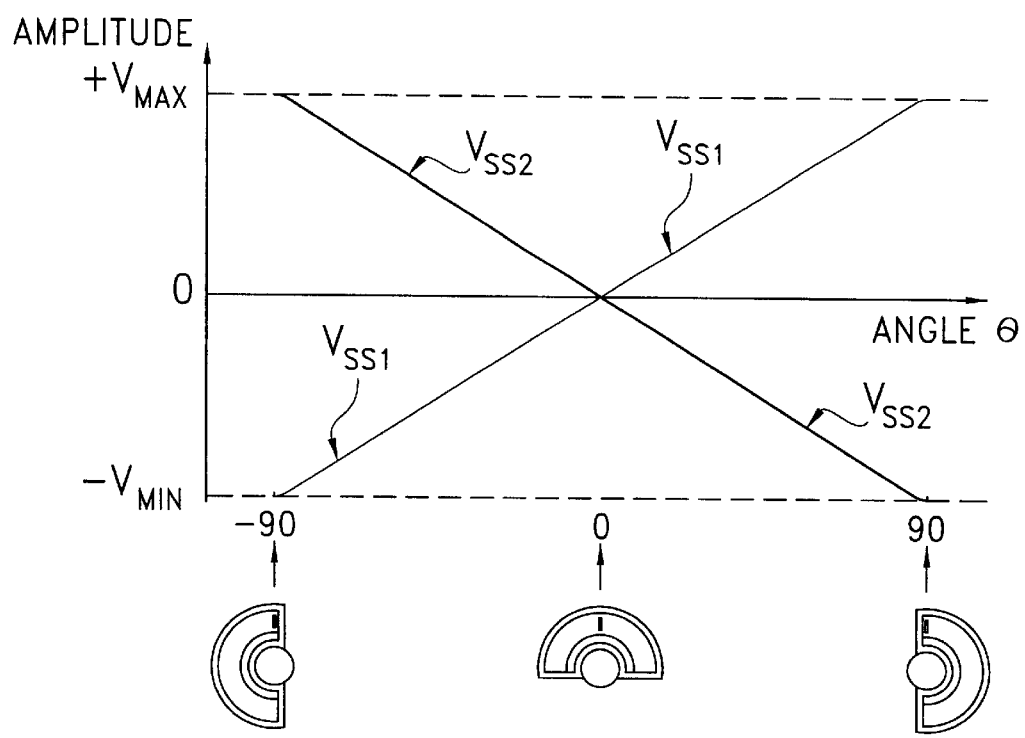
FIG. 3D is a graph depicting exemplary waveforms of a first voltage sensing signal and of a second voltage sensing signal of a Hall effect device of the magnetic rotational position sensor of FIGS. 1A–1C.

Referring to FIGS. 3A–3C, diagrammatic illustrations of loop pole piece 11, magnet 17, and a magnetic field synchronously rotating with cylindrical control shaft 1 (being non-magnetic and non-magnetizable) about coinciding rotational axes LA/RA over a definable range of rotation upward to 180 degrees is shown. To sense each degree of rotation of cylindrical control shaft 1 about coinciding rotational axes LA/RA over a definable range of rotation upward to 180 degrees, it is to be appreciated that the magnetic flux density of any magnetic flux passing through Hall effect device 18 via planar side surface 18a (FIG. 1A) and planar side surface 18b (FIG. 1B) must be different for each degree of synchronized rotation of the magnetic field about coinciding rotational axes LA/RA. As previously described herein, the magnetic flux within magnet 17 is rectilinearly magnetized from south pole surfaces 17b–17d (FIG. 1B) to convex north pole surface 17a (FIG. 1A) prior to the assembly of magnetic rotational position sensor 10. Upon the disposal of magnet 17 within loop pole piece 11, the arcuate configuration of working air gap area 11b realigns the magnetization of the magnetic flux within magnet 17 as exemplary in FIGS. 3A–3C to facilitate a sensing of a different magnitude of magnetic flux density by Hall effect device 18 for each degree of synchronized rotation of the magnetic field about coinciding rotational axes LA/RA as evidenced by the positioning of Hall effect device 18 throughout working air gap area 11b along an arc path AP1 radially extending from coinciding rotational axes LA/RA. The arcuate configuration of working air gap area 11b is circular to facilitate a symmetrical balancing of the magnetic flux of the magnetic field throughout working air gap area 11b as shown in FIGS. 3A–3C. Planar side surface 18a and planar side surface 18b of Hall effect device 18 are perpendicular to concave inner diameter surface 12a (FIGS. 1A and 1B) of pole piece 12 and to convex north pole surface 17a (FIG. 1A) of magnet 17 as loop pole piece 11 and magnet 17 are synchronously rotated about coinciding rotational axes LA/RA to facilitate a uniform differential of the magnetic flux passing through Hall effect device 18 for each degree of synchronized rotation of control shaft 1 and the magnetic field about coinciding rotational axes LA/RA over a definable range of rotation upward to 180 degrees. Thus, it is to be appreciated that Hall effect device 18 is operable to sense a different magnitude of magnetic flux density for each degree of synchronized rotation of control shaft 1 and the magnetic field about coinciding rotational axes LA/RA over a definable range of rotation upward to 180 degrees. It is to be further appreciated that, for each degree of synchronized rotation of control shaft 1 and the magnetic field about coinciding rotational axes LA/RA over a definable range of rotation upward to 180 degrees, Hall effect device 18 is operable to either generate a voltage sensing signal $V_{SS1}$ as a function of the magnetic flux density of the magnetic flux passing through planar side surface 18a as shown in FIG. 3D and/or a voltage sensing signal $V_{SS2}$ as a function of the magnetic flux density of the magnetic flux passing through planar side surface 18b as shown in FIG. 3D.

Referring to FIGS. 4A–4C, a magnetic rotational position sensor 10' is shown. Magnetic rotational position sensor 10' comprises a loop pole piece 11', and a magnet 17'. Loop pole piece 11' includes a circular arcuate pole piece 12', and a pole piece 13' having rectangular prismatical pole segment 14, a circular arcuate pole segment 15', and rectangular prismatical pole segment 16. Circular arcuate pole piece 12' and pole piece 13' are serially adjoined in a closed configuration to define an air gap area 11a'. Preferably, circular arcuate pole piece 12' and pole piece 13' are unitarily fabricated from a ferromagnetic steel, e.g. a low carbon steel. Circular arcuate pole piece 12' and circular arcuate pole segment 15' concentrically align with rotational axis RA, and concave inner diameter surface 12a' of pole piece 12' and a convex inner diameter surface 15a' of circular arcuate pole segment 15' radially extend from rotational axis RA over approximately 100 degrees to facilitate a rotation of loop pole piece 11' about rotational axis RA over a definable range of rotation upward to ninety (90) degrees. A concave outer diameter surface 15b' of circular arcuate pole segment 15' facilitates an adjoining of loop pole piece 11' to an outer diameter surface of a cylindrical control.

Still referring to FIGS. 4A–4C, magnet 17' is a permanent magnet having a convex north pole surface 17a', a concave south pole surface 17b', planar south pole surface 17c, and planar south pole surface 17d to generate magnetic flux (not shown). Prior to an assembly of magnetic rotational position sensor 10', the magnetic flux within magnet 17' is rectilinearly magnetized from south pole surfaces 17b'–17d to convex north pole surface 17a' as exemplary shown by the arrows in FIGS. 4A and 4B. Magnet 17' is disposed within air gap area 11a' with convex north pole surface 17a' facing concave inner diameter surface 12a' of pole piece 12', concave south pole surface 17b' adjacently facing convex inner diameter surface 15a' of circular arcutate segment 15', planar south pole surface 17c adjacently facing rectangular prismatical pole segment 14, and planar south pole surface 17d adjacently facing rectangular prismatical pole segment 16 to enclose the magnetic flux from magnet 17' within loop pole piece 11', and as a result, a magnetic field is established throughout air gap area 11a'. Convex north pole surface 17a' of magnet 17' spatially faces concave inner diameter surface 12a' of pole piece 12' to define a working air gap area 11b' having a circular arcuate configuration therebetween. Alternatively, the present invention contemplates that concave south pole surface 17b' can spatially face convex inner diameter surface 15' of circular arcuate pole segment 15', planar south pole surface 17c can spatial face rectangular prismatical pole segment 14, and/or planar south pole surface 17d can spatial face rectangular prismatical pole segment 16.

Still referring to FIGS. 4A–4C, magnetic rotational position sensor 10' further comprises Hall effect device 18 as previously described in connection with FIGS. 1A–1C and accompanying text. Hall effect device 18 is disposed within working air gap area 11b'. It is to be appreciated that Hall effect device 18 is operable to sense a different magnitude of magnetic flux density for each degree of synchronized rotation of the magnetic field about rotational axes RA over a definable range of rotation upward to ninety (90) degrees. It is to be further appreciated that, for each degree of synchronized rotation of the magnetic field about rotational axes RA of a definable range of rotation upward to ninety (90) degrees, Hall effect device 18 is operable to either generate a voltage sensing signal as a function of the magnetic flux density of the magnetic flux passing through planar side surface 18a, and/or a voltage sensing signal as a function of the magnetic flux density of the magnetic flux passing through planar side surface 18b.

Figure 5A:
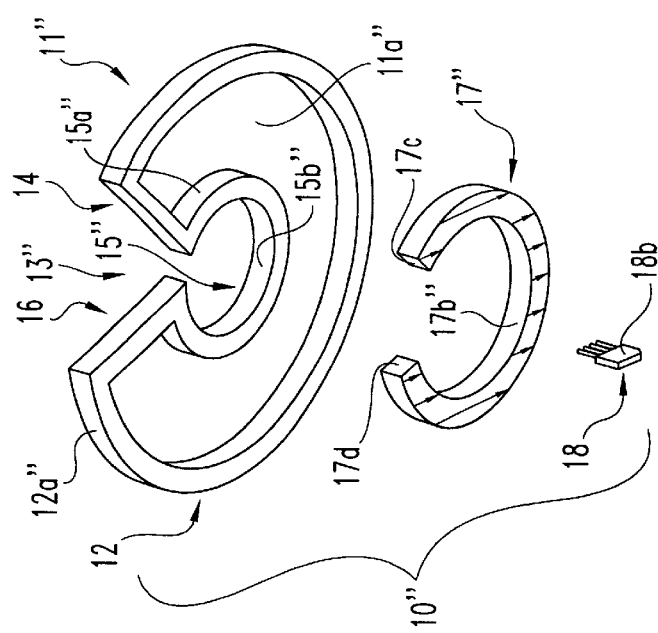
FIGS. 5A–5C are views of a second modified embodiment of the magnetic rotational position sensor of FIGS. 1A–1C.
Figure 5C:
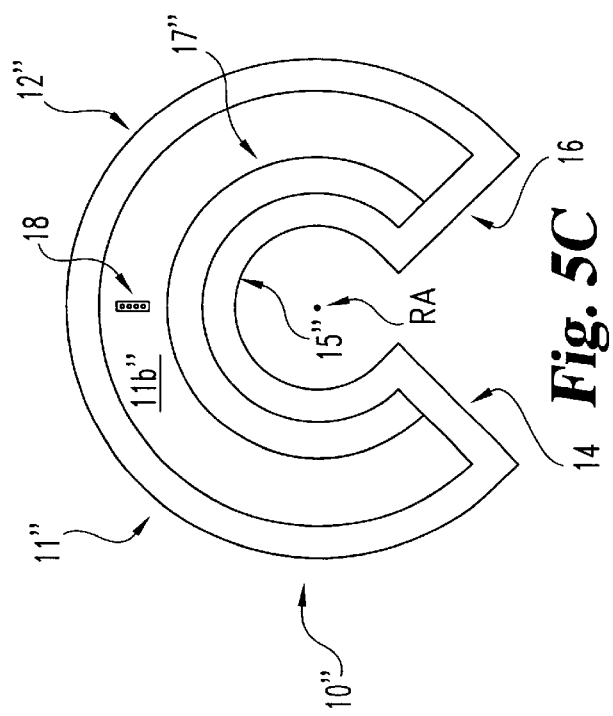
Figure 5B:
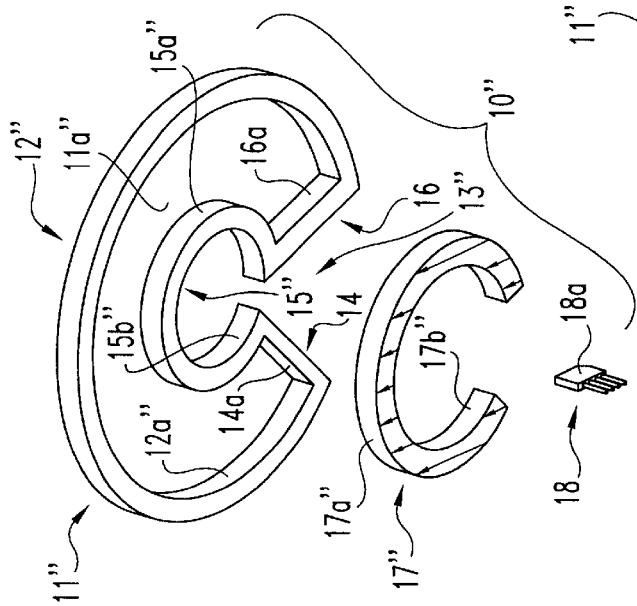

Referring to FIGS. 5A–5C, a magnetic rotational position sensor 10" is shown. Magnetic rotational position sensor 10" comprises a loop pole piece 11", and a magnet 17". Loop pole piece 11" includes a circular arcuate pole piece 12", and a pole piece 13" having rectangular prismatical pole segment 14, a circular arcuate pole segment 15", and rectangular prismatical pole segment 16. Circular arcuate pole piece 12" and pole piece 13" are serially adjoined in a closed configuration to define an air gap area 11a". Preferably, circular arcuate pole piece 12" and pole piece 13" are unitarily fabricated from a ferromagnetic steel, e.g. a low carbon steel. Circular arcuate pole piece 12" and circular arcuate pole segment 15" concentrically align with rotational axis RA, and concave inner diameter surface 12a" of pole piece 12" and a convex inner diameter surface 15a" of circular arcuate pole segment 15" radially extend from rotational axis RA over approximately 280 degrees to facilitate a rotation of loop pole piece 11" about rotational axis RA over a definable range of rotation upward to 270 degrees. A concave outer diameter surface 15b" of circular arcuate pole segment 15" facilitates an adjoining of loop pole piece 11" to an outer diameter surface of a cylindrical control.

Still referring to FIGS. 5A–5C, magnet 17" is a permanent magnet having a convex north pole surface 17a", a concave south pole surface 17b", planar south pole surface 17c, and planar south pole surface 17d to generate magnetic flux (not shown). Prior to an assembly of magnetic rotational position sensor 10", the magnetic flux within magnet 17" is rectilinearly magnetized from south pole surfaces 17b"–17d to convex north pole surface 17a" as exemplary shown by the arrows in FIGS. 5A and 5B. Magnet 17" is disposed within air gap area 11a" with convex north pole surface 17a" facing concave inner diameter surface 12a" of pole piece 12", concave south pole surface 17b" adjacently facing convex inner diameter surface 15a" of circular arcutate segment 15", planar south pole surface 17c adjacently facing rectangular prismatical pole segment 14, and planar south pole surface 17d adjacently facing rectangular prismatical pole segment 16 to enclose the magnetic flux from magnet 17" within loop pole piece 11", and as a result, a magnetic field is established throughout air gap area 11a". Convex north pole surface 17a" of magnet 17" spatially faces concave inner diameter surface 12a" of pole piece 12" to define a working air gap area 11b" having a circular arcuate configuration therebetween. Alternatively, the present invention contemplates that concave south pole surface 17b' can spatially face convex inner diameter surface 15" of circular arcuate pole segment 15", planar south pole surface 17c can spatial face rectangular prismatical pole segment 14, and/or planar south pole surface 17d can spatial face rectangular prismatical pole segment 16.

Still referring to FIGS. 5A–5C, magnetic rotational position sensor 10" further comprises Hall effect device 18 as previously described in connection with FIGS. 1A–1C and accompanying text. Hall effect device 18 is disposed within working air gap area 11b". It is to be appreciated that Hall effect device 18 is operable to sense a different magnitude of magnetic flux density for each degree of synchronized rotation of the magnetic field about rotational axes RA over a definable range of rotation upward to 270 degrees. It is to be further appreciated that, for each degree of synchronized rotation of the magnetic field about rotational axes RA of a definable range of rotation upward to 270 degrees, Hall effect device 18 is operable to either generate a voltage sensing signal as a function of the magnetic flux density of the magnetic flux passing through planar side surface 18a, and/or a voltage sensing signal as a function of the magnetic flux density of the magnetic flux passing through planar side surface 18b.

Referring to FIGS. 6A–6C, a magnetic rotational position sensor 110 is shown. Magnetic rotational position sensor 110 comprises loop pole piece 11 as previously described herein in connection with FIGS. 1A–1C and accompanying text. Magnetic rotational position sensor 110 further comprises a magnet 117. Magnet 117 is a permanent magnet having a convex north pole surface 117a, a concave south pole surface 117b, a planar south pole surface 117c, and a planar south pole surface 117d to generate magnetic flux (not shown). Prior to an assembly of magnetic rotational position sensor 110, the magnetic flux within magnet 117 is rectilinearly magnetized from south pole surfaces 117b–117d to convex north pole surface 117a as exemplary shown by the arrows in FIGS. 6A and 6B. Magnet 117 is disposed within air gap area 11a with convex north pole surface 117a adjacently facing concave inner diameter surface 12a of pole piece 12, concave south pole surface 117b facing convex inner diameter surface 15a of circular arcutate segment 15, planar south pole surface 117c adjacently facing rectangular prismatical pole segment 14, and planar south pole surface 117d adjacently facing rectangular prismatical pole segment 16 to enclose the magnetic flux from magnet 117 within loop pole piece 11, and as a result, a magnetic field is established throughout air gap area 11a. Concave south pole surface 117b spatially faces convex inner diameter surface 15a of circular arcutate segment 15 to define a working air gap area 11c having a circular arcuate configuration therebetween. Alternatively, the present invention contemplates that convex north pole surface 117a can spatially face concave inner diameter surface 12a of pole piece 12, planar south pole surface 117c can spatial face rectangular prismatical pole segment 14, and/or planar south pole surface 117d can spatial face rectangular prismatical pole segment 16.

Still referring to FIGS. 6A–6C, magnetic rotational position sensor 110 further comprises Hall effect device 18 as previously described herein in connection with FIGS.1A–1C and accompanying text. Hall effect device 18 is disposed within working air gap area 11c. It is to be appreciated that Hall effect device 18 is operable to sense a different magnitude of magnetic flux density for each degree of synchronized rotation of the magnetic field about rotational axes RA over a definable range of rotation upward to 180 degrees. It is to be further appreciated that, for each degree of synchronized rotation of the magnetic field about rotational axes RA of a definable range of rotation upward to 180 degrees, Hall effect device 18 is operable to either generate a voltage sensing signal as a function of the magnetic flux density of the magnetic flux passing through planar side surface 18a, and/or a voltage sensing signal as a function of the magnetic flux density of the magnetic flux passing through planar side surface 18b.

Referring to FIGS. 7A–7C, a magnetic rotational position sensor 210 is shown. Magnetic rotational position sensor 210 comprises loop pole piece 11 and magnet 17 as previously described herein in connection with FIGS. 1A–1C and accompanying text. Magnetic rotational position sensor 210 further comprises magnet 117 as previously described herein in connection with FIGS. 6A–6C and accompanying text. Magnet 17 and magnet 117 are disposed within air gap area 11a with convex north pole surface 17a facing concave south pole surface 117b, concave south pole surface 17b adjacently facing convex inner diameter surface 15a of circular arcutate segment 15, planar south pole surface 17c adjacently facing rectangular prismatical pole segment 14, planar south pole surface 17d adjacently facing rectangular prismatical pole segment 16, convex north pole surface 117a adjacently facing concave inner diameter surface 12a of pole piece 12, planar south pole surface 117c adjacently facing rectangular prismatical pole segment 14, and planar south pole surface 117d adjacently facing rectangular prismatical pole segment 16 to enclose the magnetic flux from magnet 17 and the magnetic flux from magnet 117 within loop pole piece 11, and as a result, a magnetic field is established throughout air gap area 11a. Convex north pole surface 17a spatially faces concave south pole surface 117b to define a working air gap area 11d having a circular arcutate configuration therebetween. Alternatively, the present invention contemplates that concave south pole surface 17b can spatially face convex inner diameter surface 15 of circular arcuate pole segment 15, planar south pole surface 17c can spatial face rectangular prismatical pole segment 14, planar south pole surface 17d can spatial face rectangular prismatical pole segment 16, convex north pole surface 117a can spatially face concave inner diameter surface 12a of pole piece 12, planar south pole surface 117c can spatial face rectangular prismatical pole segment 14, and/or planar south pole surface 117d can spatial face rectangular prismatical pole segment 16.

Still referring to FIGS. 7A–7C, magnetic rotational position sensor 210 further comprises Hall effect device 18 as previously described in connection with FIGS. 1A–1C and accompanying text. Hall effect device 18 is disposed within working air gap area 11d. It is to be appreciated that Hall effect device 18 is operable to sense a different magnitude of magnetic flux density for each degree of synchronized rotation of the magnetic field about rotational axis over a definable range of rotation upward to 180 degrees. It is to be further appreciated that, for each degree of synchronized rotation of the magnetic field about rotational axes RA of a definable range of rotation upward to 180 degrees, Hall effect device 18 is operable to either generate a voltage sensing signal as a function of the magnetic flux density of the magnetic flux passing through planar side surface 18a, and/or a voltage sensing signal as a function of the magnetic flux density of the magnetic flux passing through planar side surface 18b.

Figure 8A:
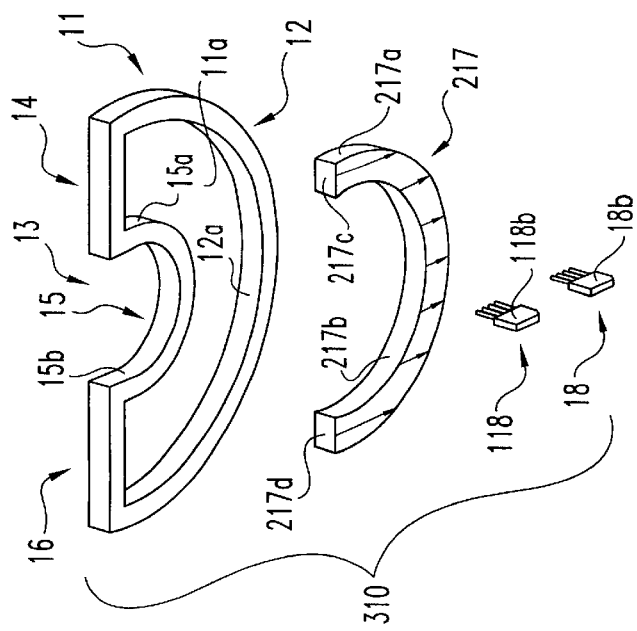
FIGS. 8A–8C are views of a third alternative embodiment of the magnetic rotational position sensor of FIGS. 1A–1C.
Figure 8B:
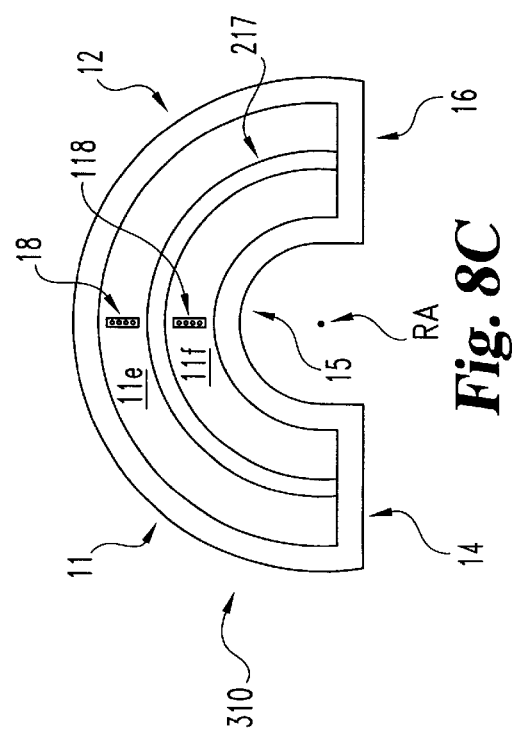
Figure 8C:
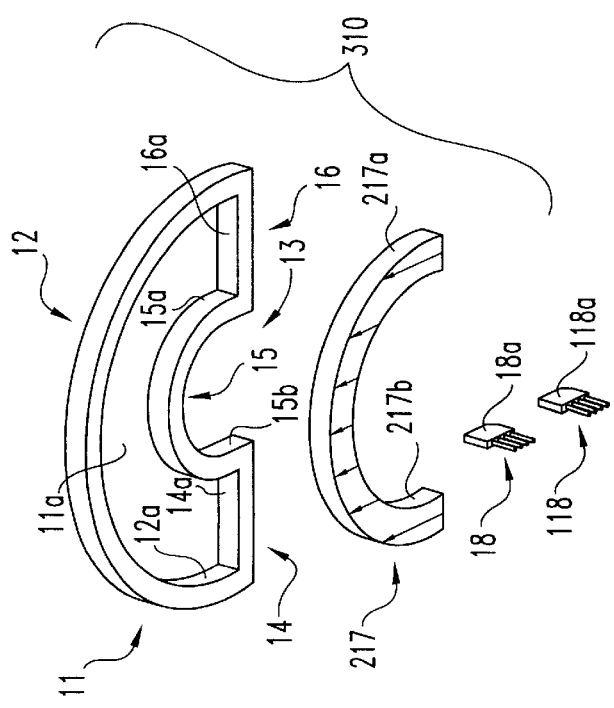

Referring to FIGS. 8A–8C, a magnetic rotational position sensor 310 is shown. Magnetic rotational position sensor 310 comprises loop pole piece 11 as previously described herein in connection with FIGS. 1A–1C and accompanying text. Magnetic rotational position sensor 310 further comprises a magnet 217. Magnet 217 is a permanent magnet having a convex north pole surface 217a, a concave south pole surface 217b, a planar south pole surface 217c, and a planar south pole surface 217d to generate magnetic flux (not shown). Prior to an assembly of magnetic rotational position sensor 210, the magnetic flux within magnet 217 is rectilinearly magnetized from south pole surfaces 217b–217d to convex north pole surface 217a as exemplary shown by the arrows in FIGS. 8A and 8B. Magnet 217 is disposed within air gap area 11a with convex north pole surface 217a facing concave inner diameter surface 12a of pole piece 12, concave south pole surface 217b facing convex inner diameter surface 15a of circular arcutate segment 15, planar south pole surface 117c adjacently facing rectangular prismatical pole segment 14, and planar south pole surface 117d adjacently facing rectangular prismatical pole segment 16 to enclose the magnetic flux from magnet 217 within loop pole piece 11, and as a result, a magnetic field is established throughout air gap area 11a. Convex north pole surface 217a spatially faces concave inner diameter surface 12a of pole piece 12 to define a working air gap area 11e having a circular arcuate configuration therebetween, and concave south pole surface 217b spatially faces convex inner diameter surface 15a of circular arcutate segment 15 to define a working air gap area 11d having a circular arcuate configuration therebetween. Alternatively, the present invention contemplates that planar south pole surface 217c can spatial face rectangular prismatical pole segment 14, and/or planar south pole surface 217d can spatial face rectangular prismatical pole segment 16.

Still referring to FIGS. 8A–8C, magnetic rotational position sensor 310 further comprises Hall effect device 18 as previously described herein in connection with FIGS. 1A–1C and accompanying text, and a Hall effect device 118 being identical to Hall effect device 18. Hall effect device 18 is disposed within working air gap area 11e, and Hall effect device 118 is disposed within working air gap area 11f. It is to be appreciated that Hall effect device 18 and Hall effect device 118 are operable to sense a different magnitude of magnetic flux density, respectively, for each degree of synchronized rotation of the magnetic field about rotational axes RA over a definable range of rotation upward to 180 degrees. It is to be further appreciated that, for each degree of synchronized rotation of the magnetic field about rotational axes RA of a definable range of rotation upward to 180 degrees, Hall effect device 18 and Hall effect device 118 are operable to either generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b.

Referring to FIGS. 9A–9C, a magnetic rotational position sensor 410 is shown. Magnetic rotational position sensor 410 comprises a loop pole piece 111. Loop pole piece 111 includes circular arcuate pole piece 12, and a pole piece 113 having a rectangular prismatical pole segment 14, a semicircular segment 115, and a rectangular prismatical pole segment 16. Circular arcuate pole piece 12 and pole piece 113 are serially adjoined in a closed configuration to define an air gap area 11a. Preferably, circular arcuate pole piece 12 and pole piece 113 are unitarily fabricated from a ferromagnetic steel, e.g. a low carbon steel. Circular arcuate pole piece 12 and semi-circular segment 115 concentrically align with rotational axis RA, and concave inner diameter surface 12a of pole piece 12 and a convex inner diameter surface 115a of semi- circular segment 115 radially extend from rotational axis RA over approximately 190 degrees to facilitate a rotation of loop pole piece 11 about rotational axis RA over a definable range of rotation upward to 180 degrees.

Still referring to FIGS. 9A–9C, magnetic rotational position sensor 410 further comprises magnet 17 and Hall effect device 18 as previously described herein in connection with FIGS. 1A–1C and accompanying text. Magnet 17 is disposed within air gap area 111a with convex north pole surface 17a facing concave inner diameter surface 12a of pole piece 12, concave south pole surface 117b adjacently facing convex inner diameter surface 115a of semi-circular segment 115, planar south pole surface 17c adjacently facing rectangular prismatical pole segment 14, and planar south pole surface 17d adjacently facing rectangular prismatical pole segment 16 to enclose the magnetic flux from magnet 17 within loop pole piece 111, and as a result, a magnetic field is established throughout air gap area 111a. Convex north pole surface 17a of magnet 17 spatially faces concave inner diameter surface 12a of pole piece 12 to define a working air gap area 111b having a circular arcuate configuration therebetween. Alternatively, the present invention contemplates that concave south pole surface 17b can spatially face convex inner diameter surface 115 of semi-circular segment 115, planar south pole surface 17c can spatial face rectangular prismatical pole segment 14, and/or planar south pole surface 17d can spatial face rectangular prismatical pole segment 16.

Still referring to FIGS. 9A–9C, Hall effect device 18 is disposed within working air gap area 111b. It is to be appreciated that Hall effect device 18 is operable to sense a different magnitude of magnetic flux density for each degree of synchronized rotation of the magnetic field about rotational axis over a definable range of rotation upward to 180 degrees. It is to be further appreciated that, for each degree of synchronized rotation of the magnetic field about rotational axes RA of a definable range of rotation upward to 180 degrees, Hall effect device 18 is operable to either generate a voltage sensing signal as a function of the magnetic flux density of the magnetic flux passing through planar side surface 18a, and/or a voltage sensing signal as a function of the magnetic flux density of the magnetic flux passing through planar side surface 18b.

Referring to FIGS. 10A–10C, a magnetic rotational position sensor 510 is shown. Magnetic rotational position sensor 510 comprises a loop pole piece 211, a magnet 317, and a magnet 417. Magnetic rotational position sensor 510 further comprises Hall effect device 18 as previously described in connection with FIGS. 1A and 1B, and a Hall effect device 118 as previously described in connection with FIGS. 8A and 8B. Loop pole piece 211 includes a circular arcuate pole piece 112, and a pole piece 213 having a rectangular prismatical pole segment 114, a circular arcuate pole segment 115, and a rectangular prismatical pole segment 116. Circular arcuate pole piece 112 and pole piece 213 are serially adjoined in a closed configuration to define an air gap area 212a. Preferably, circular arcuate pole piece 112 and pole piece 213 are unitarily fabricated from a ferromagnetic steel, e.g. a low carbon steel. Loop pole piece 211 further includes a circular arcutate segment 212 and a circular arcuate pole segment 215. Circular arcuate pole segment 212 is adjoined to a rectangular prismatical pole segment 114 and to rectangular prismatical pole segment 116, and circular arcuate pole segment 215 is adjoined to circular arcuate pole segment 115 to define an air gap area 211b. Circular arcuate pole piece 112, circular arcuate pole segment 115, circular arcuate pole segment 212, and circular arcuate pole segment 215 concentrically align with rotational axis RA as best shown in FIG. 10C, and concave inner diameter surface 112a of pole piece 112, a convex inner diameter surface 115a of circular arcuate pole segment 115, a concave inner diameter surface 212a of circular arcuate pole segment 212, and a convex inner diameter surface 215a of circular arcuate pole segment 215 radially extend from rotational axis RA over approximately 175 degrees to facilitate a rotation of loop pole piece 211 about rotational axis RA over a definable range of rotation upward to 170 degrees. A concave outer diameter surface 115b of circular arcuate pole segment 115 and a concave outer diameter surface 215b of circular arcuate pole segment 215 facilitates an adjoining of loop pole piece 211 to a cylindrical control shaft.

Still referring to FIGS. 10A–10C, magnet 317 is a permanent magnet having a convex north pole surface 317a, a concave south pole surface 317b, a planar south pole surface 317c, and a planar south pole surface 317d to generate magnetic flux (not shown). Prior to an assembly of magnetic rotational position sensor 510, the magnetic flux within magnet 317 is rectilinearly magnetized from south pole surfaces 317b–317d to convex north pole surface 317a as exemplary shown by the arrows in FIGS. 10A and 10B. Magnet 317 is disposed within air gap area 211a of loop pole piece 211 with convex north pole surface 317a facing concave inner diameter surface 112a of pole piece 112, concave south pole surface 317b adjacently facing convex inner diameter surface 115a of circular arcutate segment 115, planar south pole surface 317c adjacently facing rectangular prismatical pole segment 114, and planar south pole surface 317d adjacently facing rectangular prismatical pole segment 116 to enclose the magnetic flux from magnet 317 within loop pole piece 211, and as a result, a magnetic field is established throughout air gap area 211a. Convex north pole surface 317a of magnet 317 spatially faces concave inner diameter surface 112a of pole piece 112 to define a working air gap area 211c having a circular arcuate configuration therebetween. Alternatively, the present invention contemplates that concave south pole surface 317b can spatially face convex inner diameter surface 115 of circular arcuate pole segment 115, planar south pole surface 317c can spatial face rectangular prismatical pole segment 114, and/or planar south pole surface 317d can spatial face rectangular prismatical pole segment 116.

Still referring to FIGS. 10A–10C, magnet 417 is a permanent magnet having a convex north pole surface 417a, a concave south pole surface 417b, a planar south pole surface 417c, and a planar south pole surface 417d to generate magnetic flux (not shown). Prior to an assembly of magnetic rotational position sensor 510, the magnetic flux within magnet 417 is rectilinearly magnetized from south pole surfaces 417b–417d to convex north pole surface 417a as exemplary shown by the arrows in FIGS. 10A and 10B. Magnet 417 is disposed within air gap area 211b of loop pole piece 211 with convex north pole surface 417a facing concave inner diameter surface 212a of pole piece 212, concave south pole surface 417b adjacently facing convex inner diameter surface 215a of circular arcuate segment 215, planar south pole surface 417c adjacently facing rectangular prismatical pole segment 114, and planar south pole surface 417d adjacently facing rectangular prismatical pole segment 116 to enclose the magnetic flux from magnet 417 within loop pole piece 211, and as a result, a magnetic field is established throughout air gap area 211b. Convex north pole surface 417a of magnet 417 spatially faces concave inner diameter surface 212a of pole piece 212 to define a working air gap area 211d having a circular arcuate configuration therebetween. Alternatively, the present invention contemplates that concave south pole surface 417b can spatially face convex inner diameter surface 215 of circular arcuate pole segment 215, planar south pole surface 417c can spatial face rectangular prismatical pole segment 114, and/or planar south pole surface 417d can spatial face rectangular prismatical pole segment 116.

Still referring to FIGS. 10A–10C, Hall effect device 18 is disposed within working air gap area 211c, and Hall effect device 118 is disposed within working air gap area 211d. It is to be appreciated that Hall effect device 18 and Hall effect device 118 are operable to sense a different magnitude of magnetic flux density, respectively, for each degree of synchronized rotation of the magnetic field about rotational axes RA over a definable range of rotation upward to 170 degrees. It is to be further appreciated that, for each degree of synchronized rotation of the magnetic field about rotational axes RA of a definable range of rotation upward to 170 degrees, Hall effect device 18 and Hall effect device 118 are operable to either generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 11A–11C, a magnetic rotational position sensor 610 is shown. Magnetic rotational position sensor 610 comprises loop pole piece 211 and Hall effect device 118 as previously described herein in connection with FIGS. 10A and 10B and accompanying text, and Hall effect device as previously described in connection with FIGS. 1A and 1B. Magnetic rotational position sensor 610 further comprises a magnet 517 and a magnet 617. Magnet 517 is a permanent magnet having a convex north pole surface 517a, a concave south pole surface 517b, a planar south pole surface 517c, and a planar south pole surface 517d to generate magnetic flux (not shown). Prior to an assembly of magnetic rotational position sensor 610, the magnetic flux within magnet 517 is rectilinearly magnetized from south pole surfaces 517b–517d to convex north pole surface 517a as exemplary shown by the arrows in FIGS. 11A and 11B. Magnet 517 is disposed within air gap area 211a with convex north pole surface 517a adjacently facing concave inner diameter surface 112a of pole piece 112, concave south pole surface 517b facing convex inner diameter surface 115a of circular arcutate segment 115, planar south pole surface 517c adjacently facing rectangular prismatical pole segment 114, and planar south pole surface 517d adjacently facing rectangular prismatical pole segment 116 to enclose the magnetic flux from magnet 517 within loop pole piece 211, and as a result, a magnetic field is established throughout air gap area 211a. Concave south pole surface 517b spatially faces convex inner diameter surface 115a of circular arcutate segment 115 to define a working air gap area 211e having a circular arcuate configuration therebetween. Alternatively, the present invention contemplates that convex north pole surface 517a can spatially face concave inner diameter surface 112a of pole piece 112, planar south pole surface 517c can spatial face rectangular prismatical pole segment 114, and/or planar south pole surface 517d can spatial face rectangular prismatical pole segment 116.

Still referring to FIGS. 11A–11C, magnet 617 is a permanent magnet having a convex north pole surface 617a, a concave south pole surface 617b, a planar south pole surface 617c, and a planar south pole surface 617d to generate magnetic flux (not shown). Prior to an assembly of magnetic rotational position sensor 610, the magnetic flux within magnet 617 is rectilinearly magnetized from south pole surfaces 617b–617d to convex north pole surface 617a as exemplary shown by the arrows in FIGS. 11A and 11B. Magnet 617 is disposed within air gap area 211b with convex north pole surface 617a adjacently facing concave inner diameter surface 212a of pole piece 212, concave south pole surface 617b facing convex inner diameter surface 215a of circular arcutate segment 215, planar south pole surface 617c adjacently facing rectangular prismatical pole segment 114, and planar south pole surface 617d adjacently facing rectangular prismatical pole segment 116 to enclose the magnetic flux from magnet 617 within loop pole piece 211, and as a result, a magnetic field is established throughout air gap area 211a. Concave south pole surface 617b spatially faces convex inner diameter surface 215a of circular arcutate segment 215 to define a working air gap area 211f having a circular arcuate configuration therebetween. Alternatively, the present invention contemplates that convex north pole surface 617a can spatially face concave inner diameter surface 212a of pole piece 212, planar south pole surface 617c can spatial face rectangular prismatical pole segment 114, and/or planar south pole surface 617d can spatial face rectangular prismatical pole segment 116.

Still referring to FIGS. 11A–11C, magnetic rotational position sensor 610 further comprises Hall effect device 18 as previously described herein in connection with FIGS. 1A and 1B and accompanying text, and Hall effect device 118 as previously described in connection with FIGS. 10A and 10B and accompanying text. Hall effect device 18 is disposed within working air gap area 211e, and Hall effect device 118 is disposed within working air gap area 211f. It is to be appreciated that Hall effect device 18 and Hall effect device 118 are operable to sense a different magnitude of magnetic flux density, respectively, for each degree of synchronized rotation of the magnetic field about rotational axes RA over a definable range of rotation upward to 170 degrees. It is to be further appreciated that, for each degree of synchronized rotation of the magnetic field about rotational axes RA of a definable range of rotation upward to 170 degrees, Hall effect device 18 and Hall effect device 118 are operable to either generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 12A–12C, a magnetic rotational position sensor 710 is shown. Magnetic rotational position sensor 710 comprises loop pole piece 211, magnet 317 and magnet 417 as previously described herein in connection with FIGS. 10A and 10B and accompanying text. Magnetic rotational position sensor 710 further comprises magnet 517 and magnet 617 as previously described herein in connection with FIGS. 11A and 11B and accompanying text. Magnet 317 and magnet 517 are disposed within air gap area 211a with convex north pole surface 317a facing concave south pole surface 517b, concave south pole surface 317b adjacently facing convex inner diameter surface 115a of circular arcutate segment 115, planar south pole surface 317c adjacently facing rectangular prismatical pole segment 114, planar south pole surface 317d adjacently facing rectangular prismatical pole segment 116, convex north pole surface 517a adjacently facing concave inner diameter surface 112a of pole piece 112, planar south pole surface 517c adjacently facing rectangular prismatical pole segment 114, and planar south pole surface 517d adjacently facing rectangular prismatical pole segment 116 to enclose the magnetic flux from magnet 317 and the magnetic flux from magnet 517 within loop pole piece 211, and as a result, a magnetic field is established throughout air gap area 211a. Convex north pole surface 317a spatially faces concave south pole surface 517b to define a working air gap area 211g having a circular arcutate configuration therebetween. Alternatively, the present invention contemplates that concave south pole surface 317b can spatially face convex inner diameter surface 115 of circular arcuate pole segment 115, planar south pole surface 317c can spatial face rectangular prismatical pole segment 114, planar south pole surface 317d can spatial face rectangular prismatical pole segment 116, convex north pole surface 517a can spatially face concave inner diameter surface 112a of pole piece 112, planar south pole surface 517c can spatial face rectangular prismatical pole segment 114, and/or planar south pole surface 517d can spatial face rectangular prismatical pole segment 116.

Still referring to FIGS. 12A–12C, magnet 417 and magnet 617 are disposed within air gap area 211b with convex north pole surface 417a facing concave south pole surface 617b, concave south pole surface 417b adjacently facing convex inner diameter surface 215a of circular arcutate segment 215, planar south pole surface 417c adjacently facing rectangular prismatical pole segment 114, planar south pole surface 417d adjacently facing rectangular prismatical pole segment 116, convex north pole surface 617a adjacently facing concave inner diameter surface 212a of pole piece 212, planar south pole surface 617c adjacently facing rectangular prismatical pole segment 114, and planar south pole surface 617d adjacently facing rectangular prismatical pole segment 116 to enclose the magnetic flux from magnet 417 and the magnetic flux from magnet 617 within loop pole piece 211, and as a result, a magnetic field is established throughout air gap area 211b. Convex north pole surface 517a spatially faces concave south pole surface 617b to define a working air gap area 211h having a circular arcutate configuration therebetween. Alternatively, the present invention contemplates that concave south pole surface 417b can spatially face convex inner diameter surface 115 of circular arcuate pole segment 115, planar south pole surface 417c can spatial face rectangular prismatical pole segment 114, planar south pole surface 417d can spatial face rectangular prismatical pole segment 116, convex north pole surface 617a can spatially face concave inner diameter surface 212a of pole piece 212, planar south pole surface 617c can spatial face rectangular prismatical pole segment 114, and/or planar south pole surface 617d can spatial face rectangular prismatical pole segment 116. In addition, the present invention contemplates that magnet 417 and magnet 617 can be magnetized in opposing directions to establish two magnetic field throughout air gap area 211b.

Still referring to FIGS. 12A–12C, magnetic rotational position sensor 710 further comprises Hall effect device 18 as previously described herein in connection with FIGS. 1A and 1B and accompanying text, and Hall effect device 118 as previously described in connection with FIGS. 10A and 10B and accompanying text. Hall effect device 18 is disposed within working air gap area 211g, and Hall effect device 118 is disposed within working air gap area 211h. It is to be appreciated that Hall effect device 18 and Hall effect device 118 are operable to sense a different magnitude of magnetic flux density, respectively, for each degree of synchronized rotation of the magnetic field about rotational axes RA over a definable range of rotation upward to 170 degrees. It is to be further appreciated that, for each degree of synchronized rotation of the magnetic fields about rotational axes RA of a definable range of rotation upward to 170 degrees, Hall effect device 18 and Hall effect device 118 are operable to either generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 13A–13C, a magnetic rotational position sensor 810 is shown. Magnetic rotational position sensor 810 comprises a loop pole piece 311. Loop pole piece 311 includes circular arcuate pole piece 112, and a pole piece 313 having rectangular prismatical pole segment 114, a circular conical segment 315, and rectangular prismatical pole segment 116. Circular arcuate pole piece 112 and pole piece 313 are serially adjoined in a closed configuration to define an air gap area 311a. Preferably, circular arcuate pole piece 112 and pole piece 313 are unitarily fabricated from a ferromagnetic steel, e.g. a low carbon steel. Loop pole piece 311 further includes a circular arcuate pole piece 212 adjoined to rectangular prismatical pole segment 114 and to rectangular prismatical pole segment 116 to define an air gap area 311b. Circular arcuate pole piece 112, circular conical segment 315, and circular arcuate pole piece 212 concentrically align with rotational axis RA, and concave inner diameter surface 112a of pole piece 112, a convex inner diameter surface 315a of circular conical segment 315, a convex inner diameter surface 315b of circular conical segment 315, and a concave inner diameter surface 212a of pole piece 212 radially extend from rotational axis RA over approximately 175 degrees to facilitate a rotation of loop pole piece 311 about rotational axis RA over a definable range of rotation upward to 170 degrees.

Still referring to FIGS. 13A–13C, magnetic rotational position sensor 810 further comprises magnet 317, and magnet 417 as previously described herein in connection with FIGS. 10A–10C and accompanying text. Magnet 317 is disposed within air gap area 311a with convex north pole surface 317a facing concave inner diameter surface 112a of pole piece 112, concave south pole surface 317b adjacently facing convex inner diameter surface 315a of circular conical segment 315, planar south pole surface 317c adjacently facing rectangular prismatical pole segment 114, and planar south pole surface 317d adjacently facing rectangular prismatical pole segment 116 to enclose the magnetic flux from magnet 317 within loop pole piece 311, and as a result, a magnetic field is established throughout air gap area 311a. Convex north pole surface 317a of magnet 317 spatially faces concave inner diameter surface 112a of pole piece 112 to define a working air gap area 311c having a circular arcuate configuration therebetween. Alternatively, the present invention contemplates that concave south pole surface 317b can spatially face convex inner diameter surface 315a of circular conical segment 315, planar south pole surface 317c can spatial face rectangular prismatical pole segment 114, and/or planar south pole surface 317d can spatial face rectangular prismatical pole segment 116.

Still referring to FIGS. 13A–13C, magnet 417 is disposed within air gap area 311b with convex north pole surface 417a facing concave inner diameter surface 212a of pole piece 212, concave south pole surface 417b adjacently facing convex inner diameter surface 315b of circular conical segment 315, planar south pole surface 417c adjacently facing rectangular prismatical pole segment 114, and planar south pole surface 417d adjacently facing rectangular prismatical pole segment 116 to enclose the magnetic flux from magnet 417 within loop pole piece 311, and as a result, a magnetic field is established throughout air gap area 311b. Convex north pole surface 417a of magnet 417 spatially faces concave inner diameter surface 212a of pole piece 212 to define a working air gap area 311d having a circular arcuate configuration therebetween. Alternatively, the present invention contemplates that concave south pole surface 417b can spatially face convex inner diameter surface 315b of circular conical segment 315, planar south pole surface 417c can spatial face rectangular prismatical pole segment 114, and/or planar south pole surface 417d can spatial face rectangular prismatical pole segment 116.

Still referring to FIGS. 13A–13C, magnetic rotational position sensor 810 further comprises Hall effect device 18 as previously described herein in connection with FIGS. 1A and 1B and accompanying text, and Hall effect device 118 as previously described in connection with FIGS. 10A and 10B and accompanying text. Hall effect device 18 is disposed within working air gap area 311c, and Hall effect device 118 is disposed within working air gap area 311d. It is to be appreciated that Hall effect device 18 and Hall effect device 118 are operable to sense a different magnitude of magnetic flux density, respectively, for each degree of synchronized rotation of the magnetic field about rotational axes RA over a definable range of rotation upward to 170 degrees. It is to be further appreciated that, for each degree of synchronized rotation of the magnetic field about rotational axes RA of a definable range of rotation upward to 170 degrees, Hall effect device 18 and Hall effect device 118 are operable to either generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Figure 14B:
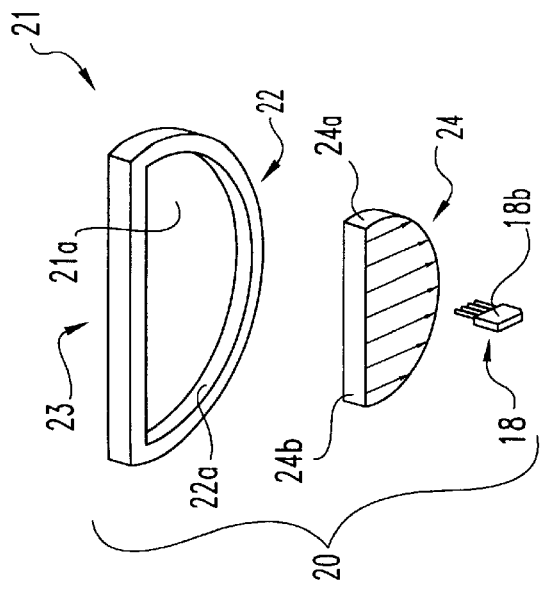
FIGS. 14A–14C are views of another embodiment of a magnetic rotational position sensor in accordance with the present invention.
Figure 14C:
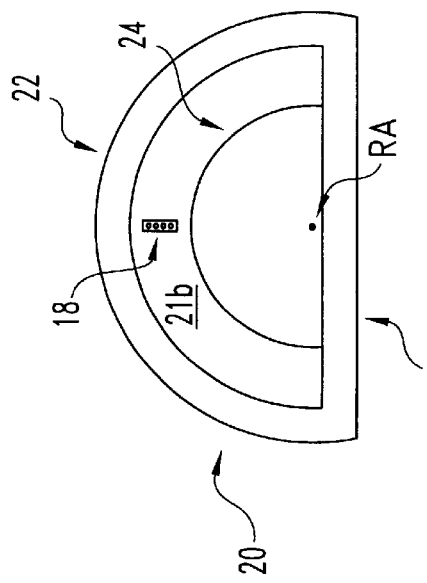
Figure 14A:
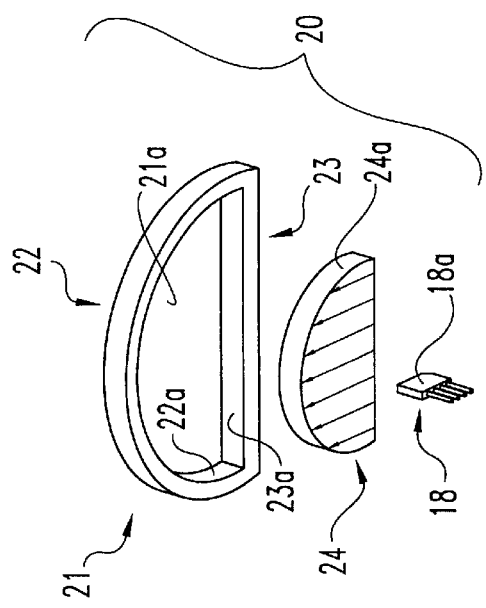

Referring to FIGS. 14A–14C, a magnetic rotational position sensor 20 is shown. Magnetic rotational position sensor 20 comprises a loop pole piece 21, a magnet 24, and Hall effect device 18. Loop pole piece 21 includes a circular arcuate pole piece 22, and a rectangular prismatical pole piece 23 serially adjoined in a closed configuration to define an air gap area 21a. Preferably, circular arcuate pole piece 22 and rectangular prismatical pole piece 23 are unitarily fabricated from a ferromagnetic steel, e.g. a low carbon steel. Circular arcuate pole piece 22 concentrically aligns with rotational axis RA as best shown in FIG. 14C, and concave inner diameter surface 22a of pole piece 22 radially extends from rotational axis RA over approximately 190 degrees to facilitate a rotation of loop pole piece 21 about rotational axis RA over a definable range of rotation upward to 180 degrees. Planar inner diameter surface 23a radially extends from rotational axis RA.

Still referring to FIGS. 14A–14C, magnet 24 is a permanent magnet having a convex north pole surface 24a, and a planar south pole surface 24b to generate magnetic flux (not shown). Prior to an assembly of magnetic rotational position sensor 20, the magnetic flux within magnet 24 is rectilinearly magnetized from south pole surface 24b to convex north pole surface 24a as exemplary shown by the arrows in FIGS. 14A and 14B. Magnet 24 is disposed within air gap area 21a of loop pole piece 21 with convex north pole surface 24a facing concave inner diameter surface 22a of pole piece 22, and planar south pole surface 24b adjacently facing a planar inner diameter surface 23a of pole piece 23 to enclose the magnetic flux from magnet 24 within loop pole piece 21, and as a result, a magnetic field is established throughout air gap area 21a as exemplary shown in FIGS. 16A–16C. Convex north pole surface 24a of magnet 24 spatially faces concave inner diameter surface 22a of pole piece 22 to define a working air gap area 21b having a circular arcuate configuration therebetween. Alternatively, the present invention contemplates that planar south pole surface 24b can spatially planar inner diameter surface 23a of pole piece 23.

Still referring to FIGS. 14A–14C, Hall effect device 18 is disposed within working air gap area 21b. It is to be appreciated that Hall effect device 18 is operable to sense a magnetic flux density of any magnetic flux through Hall effect device 18 via a planar side surface 18a and a planar side surface 18b of Hall effect device 18. Hall effect device 18 is further operable to either generate either a voltage sensing signal as a function of the magnetic flux density of any magnetic flux passing through planar side surface 18a and/or a voltage sensing signal as a function of the magnetic flux density of any magnetic flux passing through planar side surface 18b.

Referring to FIGS. 15A and 15B, an exemplary adjoining of magnetic rotational position sensor 20 to cylindrical control shaft 1 (being non-magnetic and non-magnetizable) is shown. Magnetic rotational position sensor 20 is assembled as previously described in connection with FIGS. 14A–14C and accompanying text within a container 4, and a lid 5 is adjoined to container 4 to house pole piece 21 and magnet 24 within container 4. Lid 5 has a slot 5a to enable the leads of Hall effect device 18 to extend out of lid 5. Container 4, and lid 5 are adjoined to outer diameter surface 1a of cylindrical control shaft 1 to adjoin loop pole piece 21 and magnet 24 to cylindrical control shaft 1 and to coincide rotational axis RA (FIG. 14C) with longitudinal axis LA of cylindrical control shaft 1. It is to be appreciated that loop pole 21 and magnet 24 will synchronously rotate about coinciding rotational axes LA/RA as cylindrical control shaft 1 is rotated about coinciding rotational axes LA/RA, and as a result, each degree of rotation of cylindrical control shaft 1 about coinciding rotational axes LA/RA exclusively corresponds to a distinct degree of synchronized rotation of the magnetic field (not shown) established throughout air gap area 21a (FIGS. 14A and 14B) about coinciding rotational axes LA/RA over a definable range of rotation upward to 180 degrees.

Figure 16A:
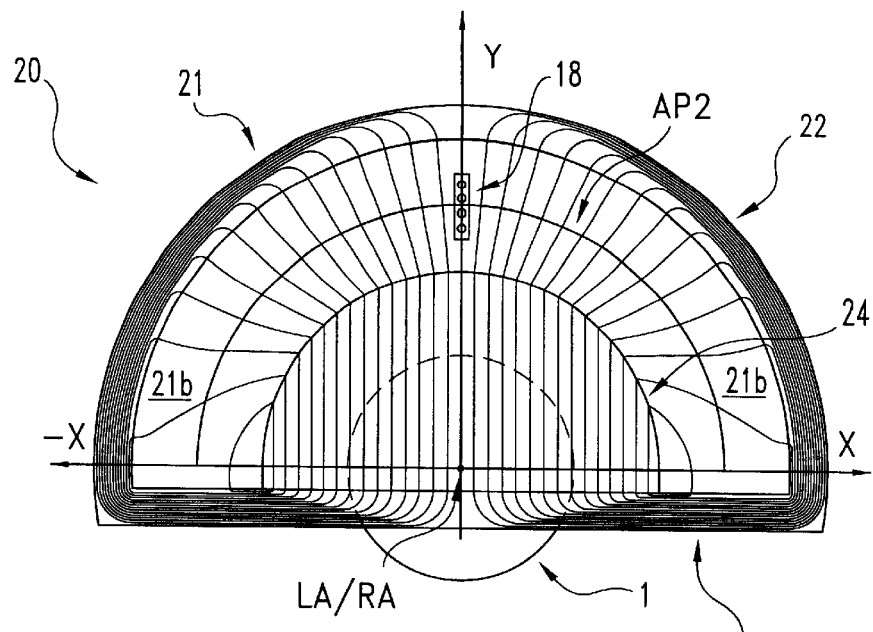
FIGS. 16A–16C are diagrammatic illustrations of a magnet and a loop pole piece of the magnetic rotational position sensor of FIGS. 14A–14C as well as the cylindrical control shaft of FIGS. 15A–15B synchronously rotating about a pair of coinciding rotational axes.
Figure 16B:
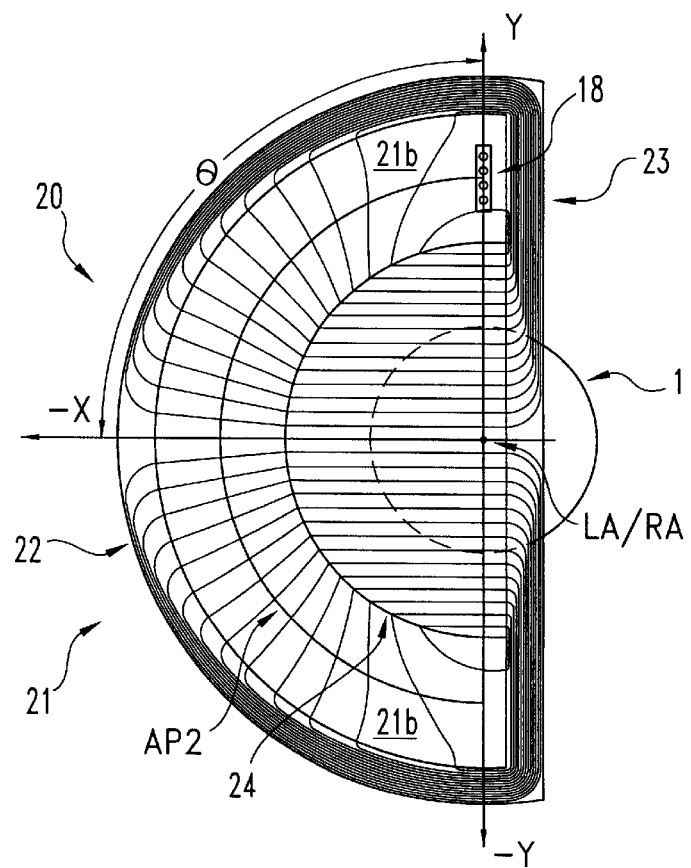
Figure 16C:
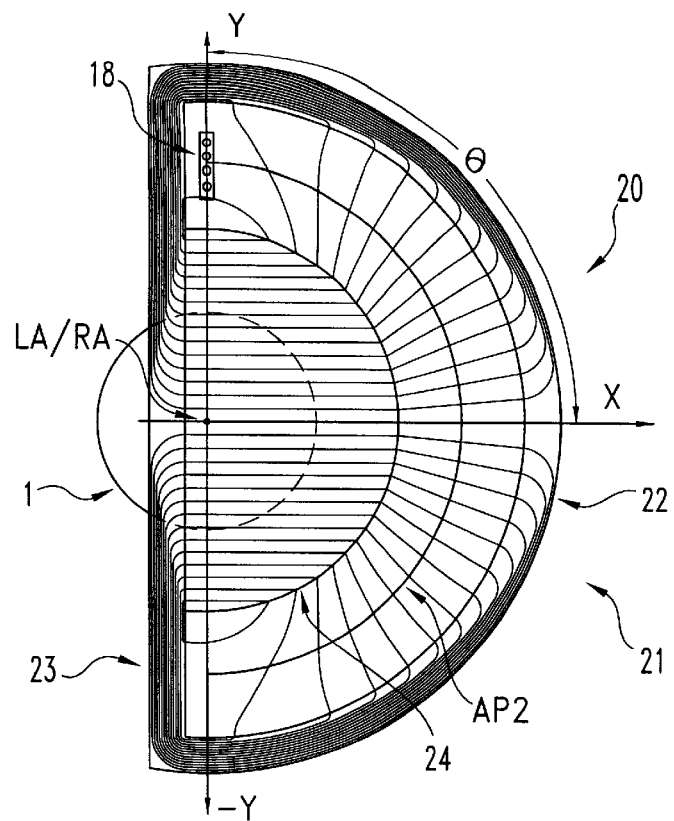
Figure 16D:
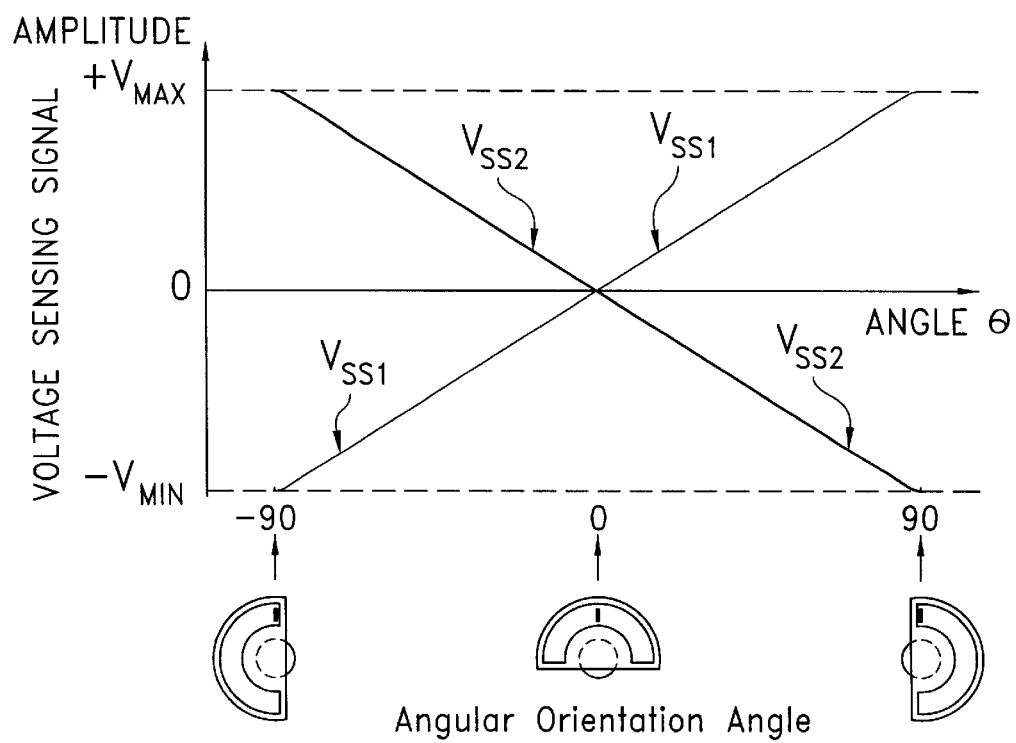
FIG. 16D is a graph depicting exemplary waveforms of a first voltage sensing signal and of a second voltage sensing signal of a Hall effect device of the magnetic rotational position sensor of FIGS. 14A–14C.

Referring to FIGS. 16A–16C, diagrammatic illustrations of loop pole piece 21, magnet 24, and a magnetic field synchronously rotating with cylindrical control shaft 1 about coinciding rotational axes LA/RA over a definable range of rotation upward to 180 degrees is shown. To sense each degree of rotation of cylindrical control shaft 1 about coinciding rotational axes LA/RA over a definable range of rotation upward to 180 degrees, it is to be appreciated that the magnetic flux density of any magnetic flux passing through Hall effect device 18 via planar side surface 18a (FIG. 14A) and planar side surface 18b (FIG. 14B) must be different for each degree of synchronized rotation of the magnetic field about coinciding rotational axes LA/RA. As previously described herein, the magnetic flux within magnet 24 is rectilinearly magnetized from south pole surface 24b (FIG. 14B) to north pole surface 24a (FIG. 14A) prior to the assembly of magnetic rotational position sensor 20. Upon the disposal of magnet 24 within loop pole piece 21, the arcuate configuration of working air gap area 21b realigns the magnetization of the magnetic flux within magnet 24 as exemplary in FIGS. 16A–16C to facilitate a sensing of a different magnitude of magnetic flux density by Hall effect 18 for each degree of synchronized rotation of the magnetic field about coinciding rotational axes LA/RA as evidenced by the positioning of Hall effect device 18 throughout working air gap area 21b along an arc path AP2 radially extending from coinciding rotational axes LA/RA. The arcuate configuration of working air gap area 21b is circular to facilitate a symmetrical balancing of the magnetic flux of the magnetic field throughout working air gap area 21b as shown in FIGS. 16A–16C. Planar side surface 18a and planar side surface 18b of Hall effect device 18 are perpendicular to concave inner diameter surface 22a (FIG. 14B) of pole piece 22 and to convex north pole surface 24a (FIG. 14A) of magnet 24 as loop pole piece 21 and magnet 24 are synchronously rotated about coinciding rotational axes LA/RA to facilitate a uniform differential of the magnetic flux passing through Hall effect device 18 for each degree of synchronized rotation of control shaft 1 and the magnetic field about coinciding rotational axes LA/RA over a definable range of rotation upward to 180 degrees. Thus, it is to be appreciated that Hall effect device 18 is operable to sense a different magnitude of magnetic flux density for each degree of synchronized rotation of control shaft 1 and the magnetic field about coinciding rotational axes LA/RA over a definable range of rotation upward to 180 degrees. It is to be further appreciated that, for each degree of synchronized rotation of control shaft 1 and the magnetic field about coinciding rotational axes LA/RA over a definable range of rotation upward to 180 degrees, Hall effect device 18 is operable to either generate a voltage sensing signal $V_{SS1}$ as a function of the magnetic flux density of the magnetic flux passing through planar side surface 18a as shown in FIG. 16D and/or a voltage sensing signal $V_{SS2}$ as a function of the magnetic flux density of the magnetic flux passing through planar side surface 18b as shown in FIG. 16D.

Figure 17A:
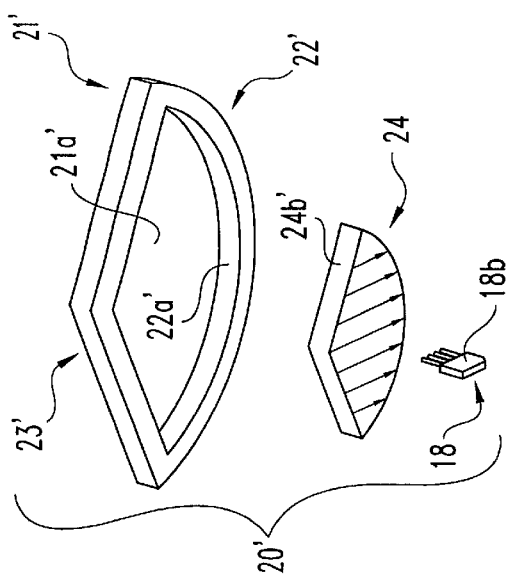
FIGS. 17A–17C are views of a first modified embodiment of the magnetic rotational position sensor of FIGS. 14A–14C.
Figure 17B:
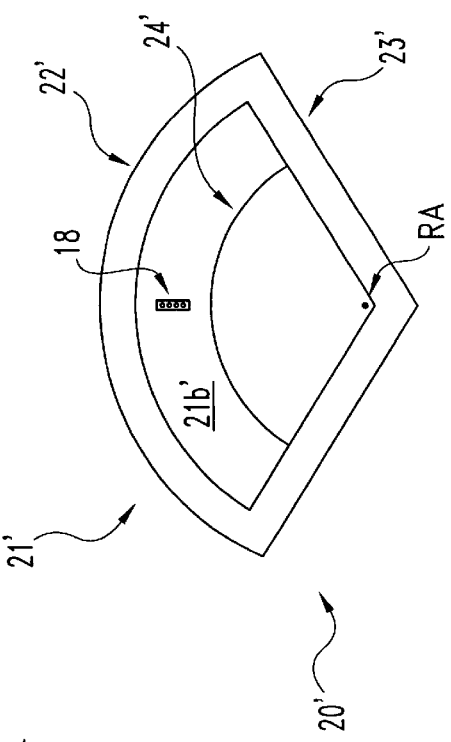
Figure 17C:
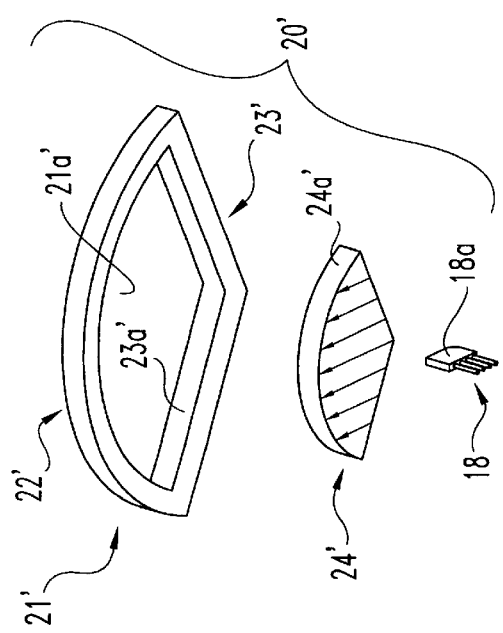

Referring to FIGS. 17A–17C, a magnetic rotational position sensor 20' is shown. Magnetic rotational position sensor 20' comprises loop pole piece 21', and magnet 24'. Loop pole piece 21' includes a circular arcuate pole piece 22', and a rectangular prismatical pole piece 23' serially adjoined in a closed configuration to define an air gap area 21a'. Preferably, circular arcuate pole piece 22' and rectangular prismatical pole piece 23' are unitarily fabricated from a ferromagnetic steel, e.g. a low carbon steel. Circular arcuate pole piece 22' concentrically aligns with rotational axis RA as best shown in FIG. 17C, and concave inner diameter surface 22a' of pole piece 22' radially extends from rotational axis RA over approximately 100 degrees to facilitate a rotation of loop pole piece 21' about rotational axis RA over a definable range of rotation upward to ninety (90) degrees. Planar inner diameter surface 23a' radially extends from rotational axis RA.

Still referring to FIGS. 17A–17C, magnet 24' is a permanent magnet having a convex north pole surface 24a', and a planar south pole surface 24b' to generate magnetic flux (not shown). Prior to an assembly of magnetic rotational position sensor 20', the magnetic flux within magnet 24' is rectilinearly magnetized from south pole surface 24b' to convex north pole surface 24a' as exemplary shown by the arrows in FIGS. 17A and 17B. Magnet 24' is disposed within air gap area 21a' of loop pole piece 21' with convex north pole surface 24a' facing concave inner diameter surface 22a' of pole piece 22', and planar south pole surface 24b' adjacently facing a planar inner diameter surface 23a' of pole piece 23' to enclose the magnetic flux from magnet 24' within loop pole piece 21', and as a result, a magnetic field is established throughout air gap area 21a'. Convex north pole surface 24a' of magnet 24' spatially faces concave inner diameter surface 22a' of pole piece 22' to define a working air gap area 21b' having a circular arcuate configuration therebetween. Alternatively, the present invention contemplates that planar south pole surface 24b' can spatially planar inner diameter surface 23a' of pole piece 23'.

Still referring to FIGS. 17A–17C, magnetic rotational position sensor 10' further comprises Hall effect device 18 as previously described in connection with FIGS. 1A and 1B and accompanying text. Hall effect device 18 is disposed within working air gap area 21b'. It is to be appreciated that Hall effect device 18 is operable to sense a different magnitude of magnetic flux density for each degree of synchronized rotation of the magnetic field about rotational axes RA over a definable range of rotation upward to ninety (90) degrees. It is to be further appreciated that, for each degree of synchronized rotation of the magnetic field about rotational axes RA of a definable range of rotation upward to ninety (90) degrees, Hall effect device 18 is operable to either generate a voltage sensing signal as a function of the magnetic flux density of the magnetic flux passing through planar side surface 18a, and/or a voltage sensing signal as a function of the magnetic flux density of the magnetic flux passing through planar side surface 18b.

Figure 18B:
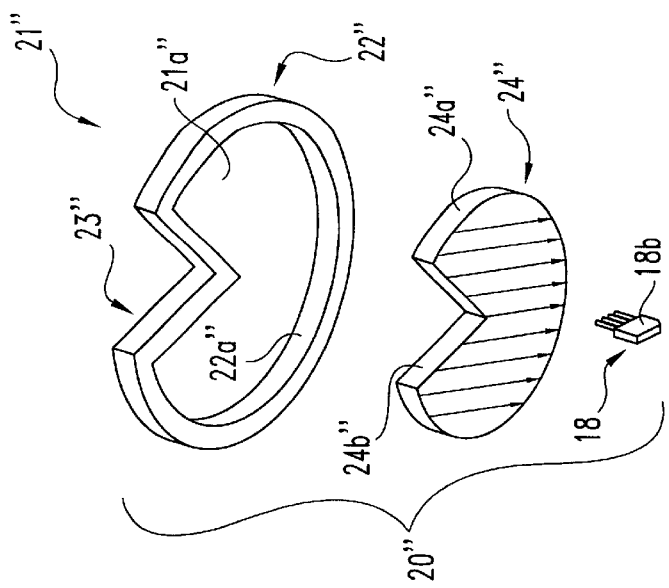
FIGS. 18A–18C are views of a second modified embodiment of the magnetic rotational position sensor of FIGS. 14A–14C.
Figure 18C:
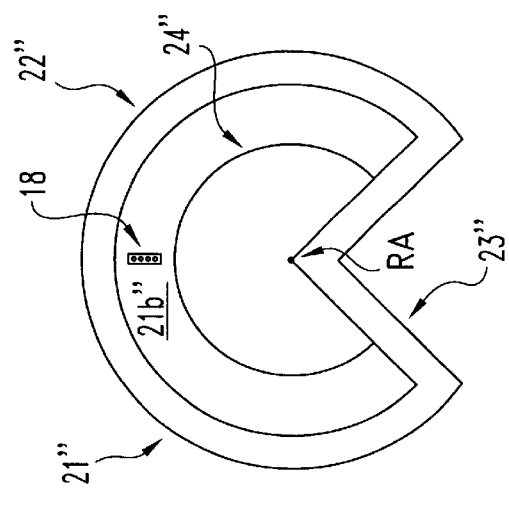
Figure 18A:
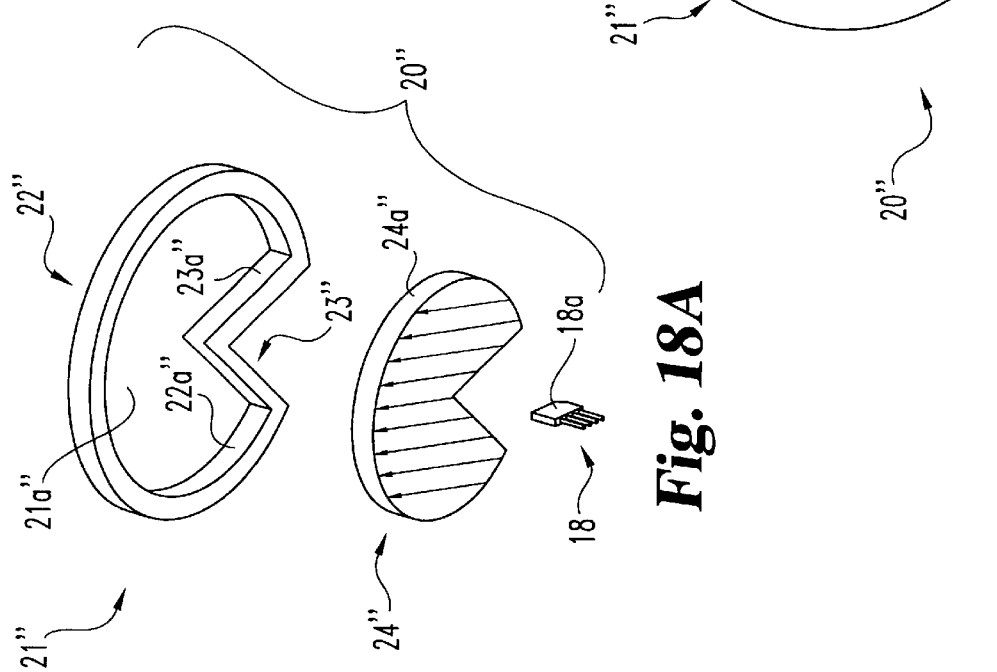

Referring to FIGS. 18A–18C, a magnetic rotational position sensor 20" is shown. Magnetic rotational position sensor 20" comprises loop pole piece 21", and magnet 24". Loop pole piece 21 " includes a circular arcuate pole piece 22", and a rectangular prismatical pole piece 23" serially adjoined in a closed configuration to define an air gap area 21a". Preferably, circular arcuate pole piece 22" and rectangular prismatical pole piece 23" are unitarily fabricated from a ferromagnetic steel, e.g. a low carbon steel. Circular arcuate pole piece 22" concentrically aligns with rotational axis RA as best shown in FIG. 18C, and concave inner diameter surface 22a" of pole piece 22" radially extends from rotational axis RA over approximately 280 degrees to facilitate a rotation of loop pole piece 21" about rotational axis RA over a definable range of rotation upward to 270 degrees. Planar inner diameter surface 23a" radially extends from rotational axis RA.

Still referring to FIGS. 18A–18C, magnet 24" is a permanent magnet having a convex north pole surface 24a", and a planar south pole surface 24b" to generate magnetic flux (not shown). Prior to an assembly of magnetic rotational position sensor 20", the magnetic flux within magnet 24" is rectilinearly magnetized from south pole surface 24b" to convex north pole surface 24a" as exemplary shown by the arrows in FIGS. 18A and 18B. Magnet 24" is disposed within air gap area 21a" of loop pole piece 21" with convex north pole surface 24a" facing concave inner diameter surface 22a" of pole piece 22", and planar south pole surface 24b" adjacently facing a planar inner diameter surface 23a" of pole piece 23" to enclose the magnetic flux from magnet 24" within loop pole piece 21", and as a result, a magnetic field is established throughout air gap area 21a". Convex north pole surface 24a" of magnet 24" spatially faces concave inner diameter surface 22a" of pole piece 22" to define a working air gap area 21b" having a circular arcuate configuration therebetween. Alternatively, the present invention contemplates that planar south pole surface 24b" can spatially planar inner diameter surface 23a" of pole piece 23".

Still referring to FIGS. 18A–18C, magnetic rotational position sensor 10" further comprises Hall effect device 18 as previously described in connection with FIGS. 1A and 1B and accompanying text. Hall effect device 18 is disposed within working air gap area 21b". It is to be appreciated that Hall effect device 18 is operable to sense a different magnitude of magnetic flux density for each degree of synchronized rotation of the magnetic field about rotational axes RA over a definable range of rotation upward to ninety (90) degrees. It is to be further appreciated that, for each degree of synchronized rotation of the magnetic field about rotational axes RA of a definable range of rotation upward to ninety (90) degrees, Hall effect device 18 is operable to either generate a voltage sensing signal as a function of the magnetic flux density of the magnetic flux passing through planar side surface 18a, and/or a voltage sensing signal as a function of the magnetic flux density of the magnetic flux passing through planar side surface 18b.

Referring to FIGS. 19A–19C, a magnetic rotational position sensor 120 is shown. Magnetic rotational position sensor 120 comprises loop pole piece 21 and magnet 24 as previously described herein in connection with FIGS. 14A and 14B and accompanying text. Magnetic rotational position sensor 120 further comprises magnet 117 previously described herein in connection with FIGS. 7A and 7B and accompanying text. Magnet 24 and magnet 117 are disposed within air gap area 21a with convex north pole surface 24a faces concave south pole surface 117b of magnet 117, convex north pole surface 117a of magnet 117 adjacently facing concave inner diameter surface 22a of pole piece 22, planar south pole surface 117c of magnet 117 adjacently facing planar inner diameter surface 23a of pole piece 23, planar south pole surface 117d of magnet 117 adjacently facing planar inner diameter surface 23a of pole piece 23, and planar south pole surface 24b of magnet 24 adjacently facing planar inner diameter surface 23a of pole piece 23 to enclose the magnetic flux from magnet 24 and magnet 117 within loop pole piece 21, and as a result, a magnetic field is established throughout air gap area 21a. Concave south pole surface 117b of magnet 117 spatially faces convex north pole surface 24a of magnet 24 to define a working air gap area 21c having a circular arcuate configuration therebetween. Alternatively, the present invention contemplates that convex north pole surface 117a of magnet 117 can spatially face concave inner diameter surface 22a of pole piece 22, planar south pole surface 117d can spatial face planar inner diameter surface 23a of pole piece 23, planar south pole surface 117d can spatial face planar inner diameter surface 23a of pole piece 23, and/or planar south pole surface 24b spatial face planar inner diameter surface 23a of pole piece 23.

Still referring to FIGS. 19A–19C, magnetic rotational position sensor 120 further comprises Hall effect device 18 as previously described herein in connection with FIGS. 19A–19C and accompanying text. Hall effect device 18 is disposed within working air gap area 21c. It is to be appreciated that Hall effect device 18 is operable to sense a different magnitude of magnetic flux density for each degree of synchronized rotation of the magnetic field about rotational axes RA over a definable range of rotation upward to 180 degrees. It is to be further appreciated that, for each degree of synchronized rotation of the magnetic field about rotational axes RA of a definable range of rotation upward to 180 degrees, Hall effect device 18 is operable to either generate a voltage sensing signal as a function of the magnetic flux density of the magnetic flux passing through planar side surface 18a, and/or a voltage sensing signal as a function of the magnetic flux density of the magnetic flux passing through planar side surface 18b.

Referring to FIGS. 20A–20C, a magnetic rotational position sensor 220 is shown. Magnetic rotational position sensor 220 comprises loop pole piece 21 and magnet 24 as previously described herein in connection with FIGS. 14A and 14B and accompanying text. Magnetic rotational position sensor 220 further comprises magnet 217 previously described herein in connection with FIGS. 8A and 8B and accompanying text. Magnet 24 and magnet 217 are disposed within air gap area 21a with convex north pole surface 24a faces concave south pole surface 217b of magnet 217, convex north pole surface 217a of magnet 217 adjacently facing concave inner diameter surface 22a of pole piece 22, planar south pole surface 217c of magnet 217 adjacently facing planar inner diameter surface 23a of pole piece 23, planar south pole surface 217d of magnet 217 adjacently facing planar inner diameter surface 23a of pole piece 23, and planar south pole surface 24b of magnet 24 adjacently facing planar inner diameter surface 23a of pole piece 23 to enclose the magnetic flux from magnet 24 and magnet 217 within loop pole piece 21, and as a result, a magnetic field is established throughout air gap area 21a. Convex south pole surface 217a of magnet 217 spatially faces concave inner diameter surface 22a of pole piece 22 to define a working air gap area 21d having a circular arcuate configuration therebetween, and concave south pole surface 217b of magnet 217 spatially faces convex north pole surface 24a of magnet 24 to define a working air gap area 21e having a circular arcuate configuration therebetween. Alternatively, the present invention contemplates that planar south pole surface 217*d* can spatial face planar inner diameter surface 23*a* of pole piece 23, planar south pole surface 217*d* can spatial face planar inner diameter surface 23*a* of pole piece 23, and/or planar south pole surface 24*b* spatial face planar inner diameter surface 23*a* of pole piece 23.

Still referring to FIGS. 20A–20C, magnetic rotational position sensor 220 further comprises Hall effect device 18 as previously described herein in connection with FIGS. 1A–1C and accompanying text, and Hall effect device 118 as previously described herein in connection with FIGS. 8A–8C and accompanying text. Hall effect device 18 is disposed within working air gap area 21*d*, and Hall effect device 118 is disposed within working air gap area 21*e*. It is to be appreciated that Hall effect device 18 and Hall effect device 118 are operable to sense a different magnitude of magnetic flux density, respectively, for each degree of synchronized rotation of the magnetic field about rotational axes RA over a definable range of rotation upward to 180 degrees. It is to be further appreciated that, for each degree of synchronized rotation of the magnetic field about rotational axes RA of a definable range of rotation upward to 180 degrees, Hall effect device 18 and Hall effect device 118 are operable to either generate a voltage sensing signal as a function of the magnetic flux density of the magnetic flux passing through planar side surface 18*a* and planar side surface 118*a*, respectively, and/or a voltage sensing signal as a function of the magnetic flux density of the magnetic flux passing through planar side surface 18*b* and planar side surface 118*b*, respectively.

Figure 21A:
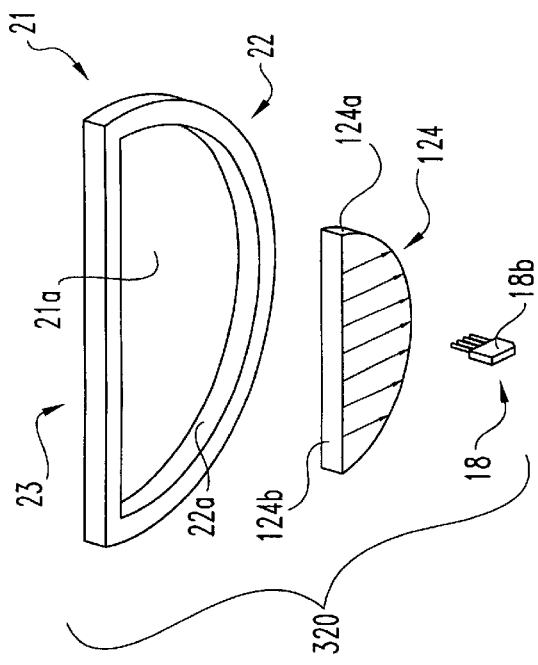
FIGS. 21A–21C are views of a third alternative embodiment of the magnetic rotational position sensor of FIGS. 14A–14C.
Figure 21B:
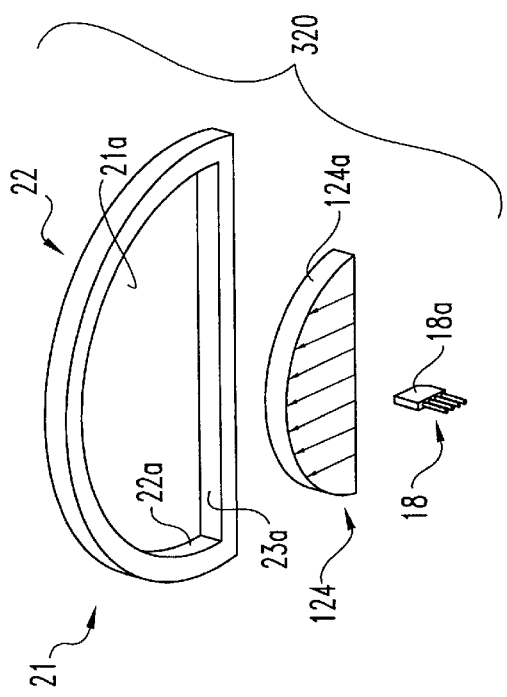
Figure 21C:
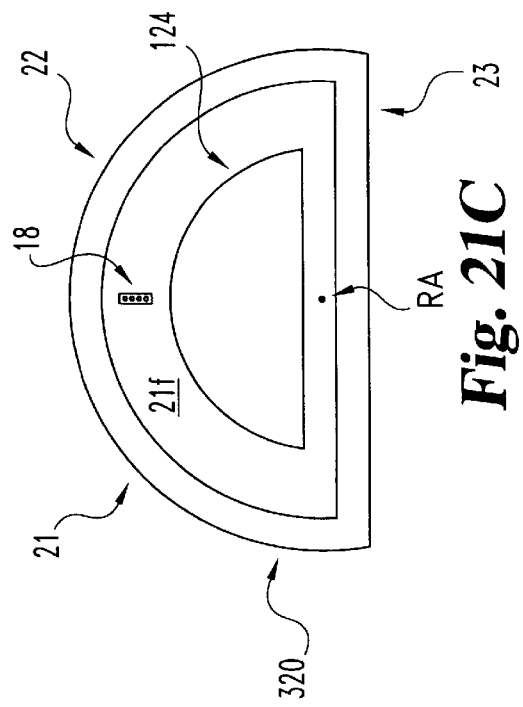

Referring to FIGS. 21A–21C, a magnetic rotational position sensor 320 is shown. Magnetic rotational position sensor 320 comprises loop pole piece 21 as previously described herein in connection with FIGS. 1A–1C and accompanying text. Magnetic rotational position sensor 320 further comprises a magnet 124. Magnet 124 is a permanent magnet having a convex north pole surface 124*a*, and a planar south pole surface 124*b* to generate magnetic flux (not shown). Prior to an assembly of magnetic rotational position sensor 320, the magnetic flux within magnet 124 is rectilinearly magnetized from planar south pole surface 124*b* to convex north pole surface 124*a* as exemplary shown by the arrows in FIGS. 21A and 24B. Magnet 124 is disposed within air gap area 21*a* with convex north pole surface 124*a* facing concave inner diameter surface 22*a* of pole piece 22, and planar south pole surface 124*b* facing planar inner diameter surface 23*a* of pole piece 23 to enclose the magnetic flux from magnet 124 within loop pole piece 21, and as a result, a magnetic field is established throughout air gap area 21*a*. Convex north pole surface 124*a* spatially faces concave inner diameter surface 22*a* of pole piece 22 to define a working air gap area 21*f* having a circular arcuate configuration therebetween, and concave south pole surface 124 spatially faces planar inner diameter surface 23*a* of pole piece 23 to provide an additional spacing within air gap area 21*a*.

Still referring to FIGS. 21A–21C, magnetic rotational position sensor 320 further comprises Hall effect device 18 as previously described herein in connection with FIGS. 1A–1C and accompanying text. Hall effect device 18 is disposed within working air gap area 21*f*. It is to be appreciated that Hall effect device 18 are operable to sense a different magnitude of magnetic flux for each degree of synchronized rotation of the magnetic field about rotational axes RA over a definable range of rotation upward to 180 degrees. It is to be further appreciated that, for each degree of synchronized rotation of the magnetic field about rotational axes RA of a definable range of rotation upward to 180 degrees, Hall effect device 18 are operable to either generate a voltage sensing signal as a function of the magnetic flux density of the magnetic flux passing through planar side surface 18*a*, and/or a voltage sensing signal as a function of the magnetic flux density of the magnetic flux passing through planar side surface 18*b*.

Figure 22B:
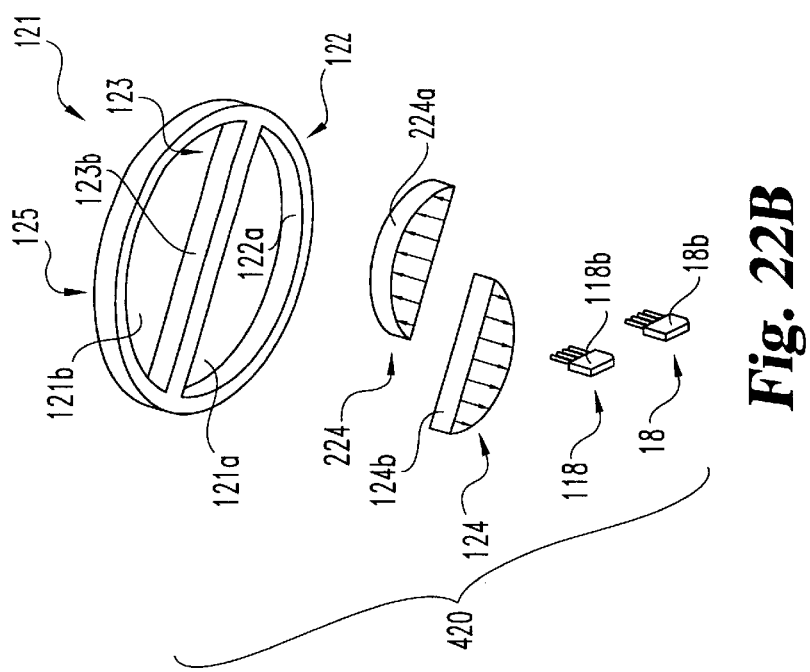
FIGS. 22A–22C are views of a fourth alternative embodiment of the magnetic rotational position sensor of FIGS. 14A–14C.
Figure 22C:
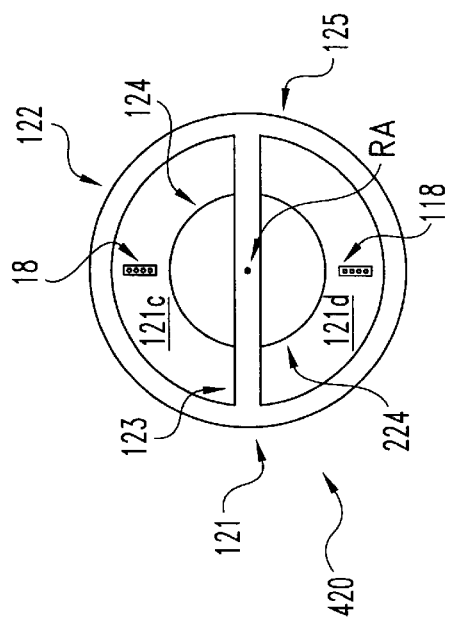
Figure 22A:
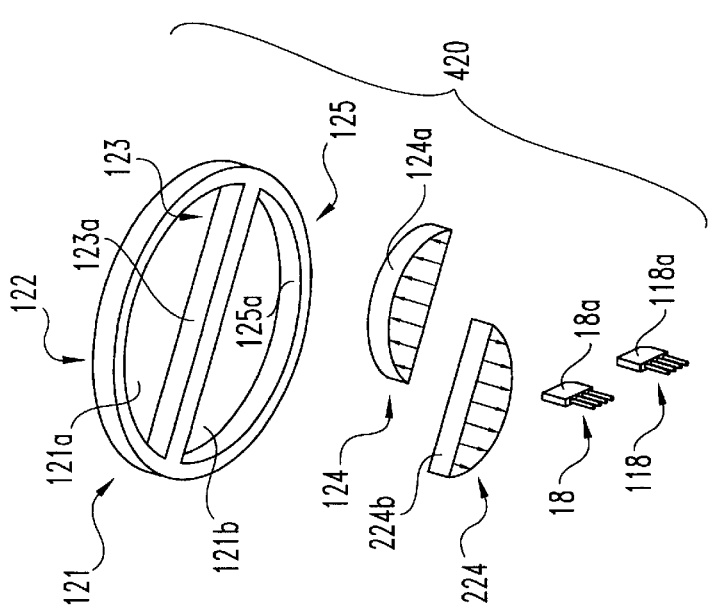

Referring to FIGS. 22A–22C, a magnetic rotational position sensor 420 is shown. Magnetic rotational position sensor 420 comprises a loop pole piece 121, a magnet 124, and a magnet 224. Magnetic rotational position sensor 420 further comprises Hall effect device 18 as previously described in connection with FIGS. 1A and 1B, and a Hall effect device 118 as previously described in connection with FIGS. 8A and 8B. Loop pole piece 121 includes a circular arcuate pole piece 122 and a rectangular prismatical pole piece 123 serially adjoined in a closed configuration to define an air gap area 121*a*. Preferably, circular arcuate pole piece 122 and pole piece 123 are unitarily fabricated from a ferromagnetic steel, e.g. a low carbon steel. Loop pole piece 121 further includes a circular arcutate pole piece 125 adjoined to pole piece 123 to define an air gap area 121*b*. Circular arcuate pole piece 112, and circular arcuate pole piece 125 concentrically align with rotational axis RA as best shown in FIG. 22C, and concave inner diameter surface 112*a* of pole piece 112, a concave inner diameter surface 125*a* of pole piece 125 radially extend from rotational axis RA over approximately 175 degrees to facilitate a rotation of loop pole piece 121 about rotational axis RA over a definable range of rotation upward to 170 degrees.

Still referring to FIGS. 22A–22C, magnet 124 is a permanent magnet having a convex north pole surface 124*a*, and a planar south pole surface 124*b* to generate magnetic flux (not shown). Prior to an assembly of magnetic rotational position sensor 420, the magnetic flux within magnet 124 is rectilinearly magnetized from south pole surface 124*b* to convex north pole surface 124*a* as exemplary shown by the arrows in FIGS. 22A and 22B. Magnet 124 is disposed within air gap area 121*a* of loop pole piece 121 with convex north pole surface 124*a* facing concave inner diameter surface 122*a* of pole piece 122, and planar south pole surface 124*b* adjacently facing planar inner diameter surface 123*a* of pole piece 123 to enclose the magnetic flux from magnet 124 within loop pole piece 121, and as a result, a magnetic field is established throughout air gap area 121*a*. Convex north pole surface 124*a* of magnet 124 spatially faces concave inner diameter surface 122*a* of pole piece 122 to define a working air gap area 121*c* having a circular arcuate configuration therebetween. Alternatively, the present invention contemplates that concave south pole surface 124*b* can spatially face planar inner diameter surface 123*a* of pole piece 123.

Still referring to FIGS. 22A–22C, magnet 224 is a permanent magnet having a convex north pole surface 224*a*, and a planar south pole surface 224*b* to generate magnetic flux (not shown). Prior to an assembly of magnetic rotational position sensor 420, the magnetic flux within magnet 224 is rectilinearly magnetized from south pole surface 224*b* to convex north pole surface 224*a* as exemplary shown by the arrows in FIGS. 22A and 22B. Magnet 224 is disposed within air gap area 121*a* of loop pole piece 121 with convex north pole surface 224*a* facing concave inner diameter surface 125*a* of pole piece 125, and planar south pole surface 224*b* adjacently facing planar inner diameter surface 123*b* of pole piece 123 to enclose the magnetic flux from magnet 224 within loop pole piece 121, and as a result, a magnetic field is established throughout air gap area 121*b*.

Convex north pole surface 224a of magnet 224 spatially faces concave inner diameter surface 125a of pole piece 125 to define a working air gap area 121d having a circular arcuate configuration therebetween. Alternatively, the present invention contemplates that concave south pole surface 224b can spatially face planar inner diameter surface 123b of pole piece 123.

Still referring to FIGS. 22A–22C, Hall effect device 18 is disposed within working air gap area 121c, and Hall effect device 118 is disposed within working air gap area 121d. It is to be appreciated that Hall effect device 18 and Hall effect device 118 are operable to sense a different magnitude of magnetic flux density, respectively, for each degree of synchronized rotation of the magnetic field about rotational axes RA over a definable range of rotation upward to 170 degrees. It is to be further appreciated that, for each degree of synchronized rotation of the magnetic field about rotational axes RA of a definable range of rotation upward to 170 degrees, Hall effect device 18 and Hall effect device 118 are operable to either generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 23A–23C, a magnetic rotational position sensor 520 is shown. Magnetic rotational position sensor 520 comprises loop pole piece 121, magnet 124, and magnet 224 as previously described herein in connection with FIGS. 22A and 2B and accompanying text. Magnetic rotational position sensor 610 further comprises a magnet 324 and a magnet 424. Magnet 324 is a permanent magnet having a convex north pole surface 324a, a concave south pole surface 324b, a planar south pole surface 324c, and a planar south pole surface 324d to generate magnetic flux (not shown). Prior to an assembly of magnetic rotational position sensor 520, the magnetic flux within magnet 324 is rectilinearly magnetized from south pole surfaces 324b–324d to convex north pole surface 324a as exemplary shown by the arrows in FIGS. 23A and 23B. Magnet 124 and magnet 324 are disposed within air gap area 121a with convex north pole surface 324a of magnet 324 facing concave inner diameter surface 122a of pole piece 122, concave south pole surface 324b of magnet 324 convex north pole surface 124a of magnet 124, planar south pole surface 124b of magnet 124 adjacently facing planar inner diameter surface 123a of pole piece 123, planar south pole surface 324c of magnet 324 adjacently facing planar inner diameter surface 123a of pole piece 123, and planar south pole surface 324d of magnet 324 adjacently facing planar inner diameter surface 123a of pole piece 123 to enclose the magnetic flux from magnet 124 and the magnetic flux from magnet 324 within loop pole piece 121, and as a result, a magnetic field is established throughout air gap area 121a. Concave south pole surface 324b of magnet 324 spatially faces convex north pole surface 124a of magnet 124 to define a working air gap area 121e having a circular arcuate configuration therebetween. Alternatively, the present invention contemplates that planar south pole surface 124b can spatially face planar inner diameter surface 123a of pole piece 123, planar south pole surface 324c can spatial face planar inner diameter surface 123a of pole piece 123, and/or planar south pole surface 324d can spatial face planar inner diameter surface 123a of pole piece 123.

Still referring to FIGS. 23A–23C, magnet 424 is a permanent magnet having a convex north pole surface 424a, a concave south pole surface 424b, a planar south pole surface 424c, and a planar south pole surface 424d to generate magnetic flux (not shown). Prior to an assembly of magnetic rotational position sensor 520, the magnetic flux within magnet 424 is rectilinearly magnetized from south pole surfaces 424b–424d to convex north pole surface 424a as exemplary shown by the arrows in FIGS. 23A and 23B. Magnet 224 and magnet 424 are disposed within air gap area 121b with convex north pole surface 424a of magnet 424 facing concave inner diameter surface 125a of pole piece 125, concave south pole surface 424b of magnet 424 convex north pole surface 224a of magnet 224, planar south pole surface 224b of magnet 224 adjacently facing planar inner diameter surface 123a of pole piece 123, planar south pole surface 424c of magnet 424 adjacently facing planar inner diameter surface 123a of pole piece 123, and planar south pole surface 424d of magnet 424 adjacently facing planar inner diameter surface 123a of pole piece 123 to enclose the magnetic flux from magnet 224 and the magnetic flux from magnet 424 within loop pole piece 121, and as a result, a magnetic field is established throughout air gap area 121b. Concave south pole surface 424b of magnet 424 spatially faces convex north pole surface 224a of magnet 224 to define a working air gap area 121f having a circular arcuate configuration therebetween. Alternatively, the present invention contemplates that planar south pole surface 224b can spatially face planar inner diameter surface 123a of pole piece 123, planar south pole surface 424c can spatial face planar inner diameter surface 123a of pole piece 123, and/or planar south pole surface 424d can spatial face planar inner diameter surface 123a of pole piece 123.

Still referring to FIGS. 23A–23C, magnetic rotational position sensor 520 further comprises Hall effect device 18 as previously described herein in connection with FIGS. 1A and 1B and accompanying text, and Hall effect device 118 as previously described in connection with FIGS. 10A and 10B and accompanying text. Hall effect device 18 is disposed within working air gap area 121e, and Hall effect device 118 is disposed within working air gap area 121f. It is to be appreciated that Hall effect device 18 and Hall effect device 118 are operable to sense a different magnitude of magnetic flux density, respectively, for each degree of synchronized rotation of the magnetic field about rotational axes RA over a definable range of rotation upward to 170 degrees. It is to be further appreciated that, for each degree of synchronized rotation of the magnetic field about rotational axes RA of a definable range of rotation upward to 170 degrees, Hall effect device 18 and Hall effect device 118 are operable to either generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 24A–24C, a magnetic rotational position sensor 620 is shown. Magnetic rotational position sensor 620 comprises loop pole piece 121 as previously described herein in connection with FIGS. 22A and 22B and accompanying text. Magnetic rotational position sensor 620 further comprises magnet 524 and magnet 624 Magnet 524 is a permanent magnet having a convex north pole surface 524a, and a planar south pole surface 524b to generate magnetic flux (not shown). Prior to an assembly of magnetic rotational position sensor 620, the magnetic flux within magnet 524 is rectilinearly magnetized from planar south pole surface 524b to convex north pole surface 524a as exemplary shown by the arrows in FIGS. 24A and 24B. Magnet 524 is disposed within air gap area 121a with convex north pole surface 524a facing concave inner diameter surface 122a of pole piece 122, and planar south pole surface 524b facing planar inner diameter surface 123a of pole piece 123 to enclose the magnetic flux from magnet 524 within loop pole piece 121, and as a result, a magnetic field is established throughout air gap area 121a. Convex north pole surface 524a spatially faces concave inner diameter surface 122a of pole piece 122 to define a working air gap area 121fg having a circular arcuate configuration therebetween, and planar south pole surface 524b spatially faces planar inner diameter surface 123a of pole piece 123 to provide an additional spacing within air gap area 121a.

Still referring to FIGS. 24A–24C, magnet 624 is a permanent magnet having a convex north pole surface 624a, and a planar south pole surface 624b to generate magnetic flux (not shown). Prior to an assembly of magnetic rotational position sensor 620, the magnetic flux within magnet 624 is rectilinearly magnetized from planar south pole surface 624b to convex north pole surface 624a as exemplary shown by the arrows in FIGS. 24A and 24B. Magnet 624 is disposed within air gap area 121b with convex north pole surface 624a facing concave inner diameter surface 125a of pole piece 125, and planar south pole surface 624b facing planar inner diameter surface 123b of pole piece 123 to enclose the magnetic flux from magnet 624 within loop pole piece 121, and as a result, a magnetic field is established throughout air gap area 121b. Convex north pole surface 624a spatially faces concave inner diameter surface 125a of pole piece 125 to define a working air gap area 121g having a circular arcuate configuration therebetween, and planar south pole surface 624b spatially faces planar inner diameter surface 123b of pole piece 123 to provide an additional spacing within air gap area 121b.

Still referring to FIGS. 24A–24C, magnetic rotational position sensor 620 further comprises Hall effect device 18 as previously described herein in connection with FIGS. 1A and 1B and accompanying text, and Hall effect device 118 as previously described in connection with FIGS. 10A and 10B and accompanying text. Hall effect device 18 is disposed within working air gap area 121g, and Hall effect device 118 is disposed within working air gap area 121h. It is to be appreciated that Hall effect device 18 and Hall effect device 118 are operable to sense a different magnitude of magnetic flux density, respectively, for each degree of synchronized rotation of the magnetic field about rotational axes RA over a definable range of rotation upward to 170 degrees. It is to be further appreciated that, for each degree of synchronized rotation of the magnetic field about rotational axes RA of a definable range of rotation upward to 170 degrees, Hall effect device 18 and Hall effect device 118 are operable to either generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 25A–25C, a magnetic rotational position sensor 30 is shown. Magnetic rotational position sensor 30 comprises a loop pole piece 31, a magnet 35, a magnet 135, an optional auxiliary pole piece 34, and Hall effect device 18 as previously described in connection with FIGS. 1A and 1B and accompanying text. Loop pole piece 31 includes a circular arcuate pole piece 32, and a circular arcuate pole piece 33 serially adjoined in a closed configuration to define an air gap area 21a. Preferably, pole piece 32 and pole piece 33 are unitarily fabricated from a ferromagnetic steel, e.g. a low carbon steel. Pole piece 32 and pole piece 33 concentrically align with rotational axis RA as best shown in FIG. 25C, and concave inner diameter surface 32a of pole piece 32 and a concave inner diameter surface 33a of pole piece 33 radially extend from rotational axis RA over approximately 180 degrees to facilitate a rotation of loop pole piece 31 about rotational axis RA over a definable range of rotation upward to 360 degrees.

Still referring to FIGS. 25A–25C, magnet 35 is a permanent magnet having a convex north pole surface 35a, a concave south pole surface 35b, a planar south pole surface 35c, and a planar south pole surface 35d to generate magnetic flux (not shown). Magnet 135 is also a permanent magnet having a convex south pole surface 135a, a concave north pole surface 135b, a planar north pole surface 135c, and a planar north pole surface 135d to generate magnetic flux (not shown). Prior to an assembly of magnetic rotational position sensor 30, the magnetic flux within magnet 35 is rectilinearly magnetized from south pole surfaces 35b–35d to convex north pole surface 35a, and the magnetic flux within magnet 135 is rectilinearly magnetized from convex south pole surface 135a to north pole surfaces 135b–135d as exemplary shown by the arrows in FIGS. 1A and 1B. Magnet 35, magnet 135, and auxiliary pole piece 34 are disposed within air gap area 31a of loop pole piece 31 with convex north pole surface 35a of magnet 35 facing concave inner diameter surface 32a of pole piece 32, convex south pole surface 135a of magnet 135 facing concave inner diameter surface 33a of pole piece 33, concave south pole surface 35b of magnet 35 adjacently facing convex outer surface 34a of auxiliary pole piece 34, concave north pole surface 135b of magnet 315 adjacently facing convex outer surface 34b of auxiliary pole piece 34, planar south pole surface 35c of magnet 35 adjacently facing planar north pole surface 135d of magnet 135, and planar south pole surface 35d of magnet 35 adjacently facing planar north pole surface 135c of magnet 135 to enclose the magnetic flux from magnet 35 and the magnetic flux from magnet 135 within loop pole piece 31, and as a result, a magnetic field is established throughout air gap area 31a as exemplary shown in FIGS. 27A–27C. Convex north pole surface 35a of magnet 35 spatially faces concave inner diameter surface 32a of pole piece 32 to define a working air gap area 31b having a circular arcuate configuration therebetween, and convex south pole surface 135a of magnet 135 spatially faces concave inner diameter surface 33a of pole piece 33 to define a working air gap area 31c having a circular arcuate configuration therebetween. Alternatively, the present invention contemplates that concave south pole surface 35b of magnet 35 spatially facing convex outer surface 34a of auxiliary pole piece 34, concave north pole surface 135b of magnet 315 spatially facing convex outer surface 34b of auxiliary pole piece 34, planar south pole surface 35c of magnet 35 spatially facing planar north pole surface 135d of magnet 135, and/or planar south pole surface 35d of magnet 35 spatially facing planar north pole surface 135c of magnet 135. In addition, the present invention contemplates that magnet 35 and magnet 135 can be unitarily fabricated to constitute single magnet, e.g. a loop magnet. The present invention further contemplates that a ferromagnetic control shaft may replace auxiliary pole piece 34 when auxiliary pole piece 34 is excluded from an embodiment of magnetic rotational position sensor 30.

Still referring to FIGS. 25A–25C, Hall effect device 18 is disposed air gap area 31a and locatable within working air gap area 31b and working air gap area 31c. It is to be appreciated that Hall effect device 18 is operable to sense a magnetic flux density of any magnetic flux passing through Hall effect device 18 via a planar side surface 18a and a planar side surface 18b of Hall effect device 18. Hall effect device 18 is further operable to either generate either a voltage sensing signal as a function of the magnetic flux density of any magnetic flux passing through planar side surface 18a and/or a voltage sensing signal as a function of the magnetic flux density of any magnetic flux passing through planar side surface 18b. The present invention contemplates that a second Hall effect device, e.g. Hall effect device 118 (FIGS. 8A and 8B) can disposed air gap area 31a and locatable within working air gap area 31b and working air gap area 31c. Accordingly, the second Hall effect device would be offset from Hall effect device 18, e.g. a ninety (90) degree phase shift.

Referring to FIGS. 26A and 26B, an exemplary adjoining of magnetic rotational position sensor 30 to cylindrical control shaft 1 (being made from a ferromagnetic material) is shown. Magnetic rotational position sensor 30 is assembled as previously described in connection with FIGS. 25A–25C and accompanying text within a container 6. A lid 7 is adjoined to container 6 to house pole piece 31, and a cover 8 is adjoined to magnet 35, magnet 135, and auxiliary pole piece 34. Container 6, and lid 7 are adjoined to outer diameter surface 1a of cylindrical control shaft 1 to adjoin loop pole piece 31, magnet 35, magnet 135, and auxiliary pole piece 34 to cylindrical control shaft 1 and to coincide rotational axis RA (FIG. 25C) with a longitudinal axis LA of cylindrical control shaft 1. It is to be appreciated that loop pole loop pole piece 31, magnet 35, magnet 135, and auxiliary pole piece 34 will synchronously rotate about coinciding rotational axes LA/RA as cylindrical control shaft 1 is rotated about coinciding rotational axes LA/RA, and as a result, each degree of rotation of cylindrical control shaft 1 about coinciding rotational axes LA/RA exclusively corresponds to a distinct degree of synchronized rotation of the magnetic field(s) (not shown) established throughout air gap area 31a (FIGS. 25A and 25C) about coinciding rotational axes LA/RA over a definable range of rotation upward to 360 degrees.

Figure 27A:
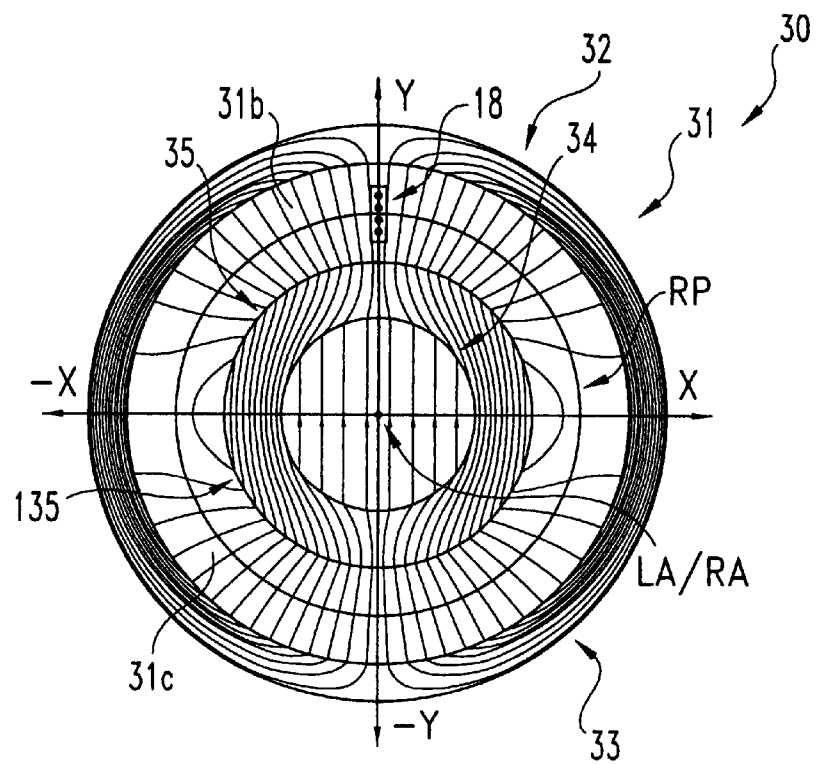
FIGS. 27A–27C are diagrammatic illustrations of a magnet and a loop pole piece of the magnetic rotational position sensor of FIGS. 25A–25C as well as the cylindrical control shaft of FIGS. 26A–26B synchronously rotating about a pair of coinciding rotational axes.
Figure 27B:
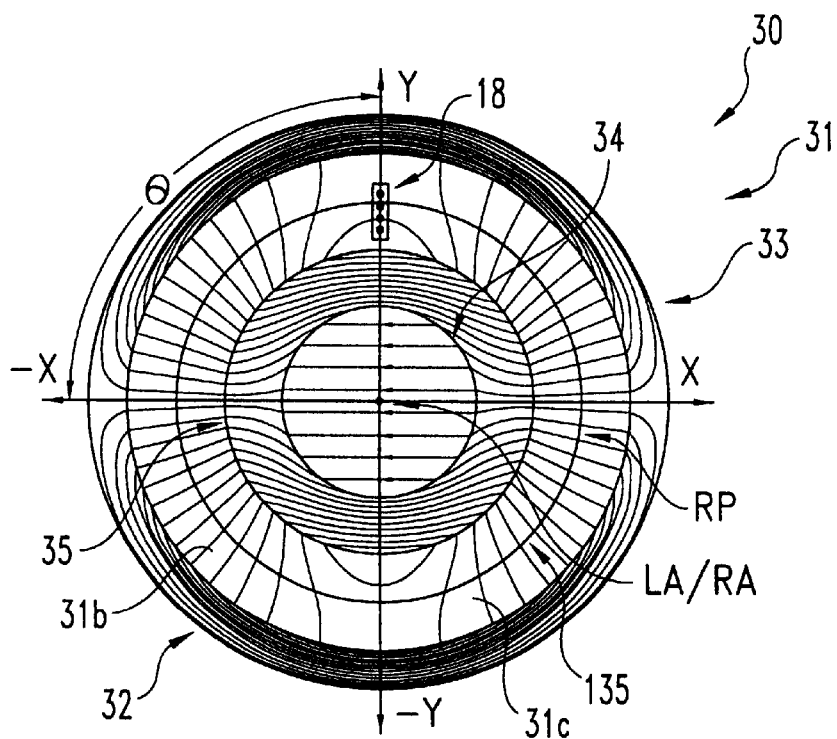
Figure 27C:
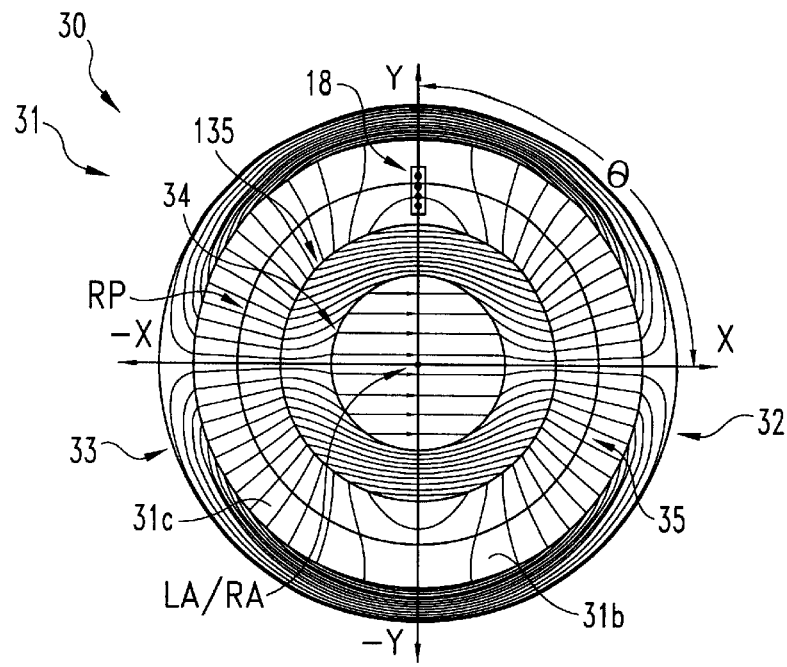
Figure 27D:
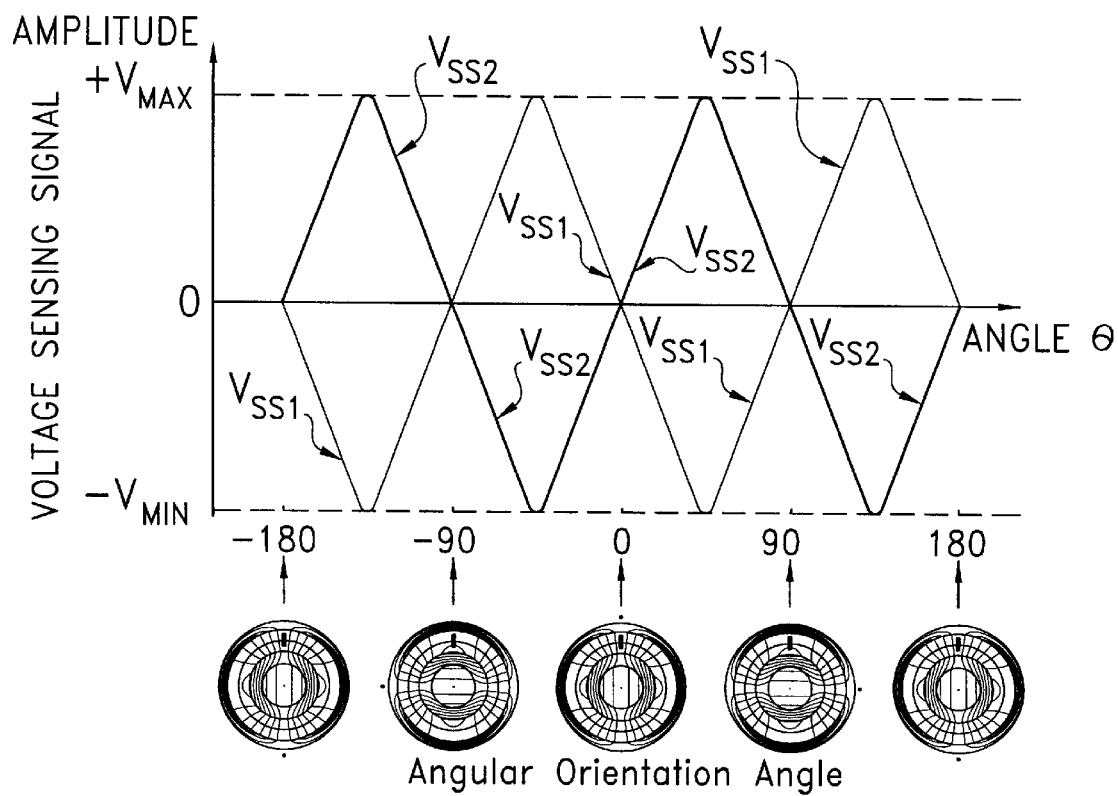
FIG. 27D is a graph depicting exemplary waveforms of a first voltage sensing signal and a waveform of a second voltage sensing signal of a Hall effect device of the magnetic rotational position sensor of FIGS. 25A–25C.

Referring to FIGS. 27A–27C, diagrammatic illustrations of loop pole piece 31, magnet 35, magnet 135, auxiliary pole piece 34, and a magnetic field synchronously rotating with cylindrical control shaft 1 about coinciding rotational axes LA/RA over a definable range of rotation upward to 360 degrees is shown. To sense each degree of rotation of cylindrical control shaft 1 about coinciding rotational axes LA/RA over a 360 degree range of rotation, it is to be appreciated that the magnetic flux density of any magnetic flux passing through Hall effect device 18 via planar side surface 18a (FIG. 25A) and planar side surface 18b (FIG. 25B) must be different for each diametric degree of synchronized rotation of the magnetic field about coinciding rotational axes LA/RA. As previously described herein, the magnetic flux within magnet 35 from south pole surfaces 35b–35d (FIG. 25B) to convex north pole surface 35a (FIG. 25A) and the magnet flux within magnet 135 is rectilinearly magnetized from convex south pole surface 135a (FIG. 25A) to north pole surfaces 135b–135d (FIG. 25B) prior to the assembly of magnetic rotational position sensor 30. Upon the disposal of magnet 35, magnet 135, and auxiliary pole piece 34 within loop pole piece 31, the arcuate configurations of working air gap area 31b and working air gap area 31 realign the magnetization of the magnetic flux within magnet 35 and magnet 135 as exemplary in FIGS. 25A–25C to facilitate a sensing of a different magnitude of magnetic flux density by Hall effect device 18 for each diametric degree of synchronized rotation of the magnetic field about coinciding rotational axes LA/RA as evidenced by the positioning of Hall effect device 18 throughout working air gap area 31b along a radial path RP radially extending from coinciding rotational axes LA/RA. The arcuate configurations of working air gap area 31b and working air gap area 31c are circular to facilitate a symmetrical balancing of the magnetic flux of the magnetic field throughout air gap area 31a as shown in FIGS. 3A–3C. Planar side surface 18a and planar side surface 18b of Hall effect device 18 are perpendicular to concave inner diameter surface 32a (FIGS. 25A and 1B) of pole piece 32 and to convex north pole surface 35a (FIG. 25A) of magnet 35 when located within working air gap area 31b and are perpendicular to concave inner diameter surface 33a (FIGS. 25A and 1B) of pole piece 32 and to convex south pole surface 135a (FIG. 25A) of magnet 135 when located within working air gap area 31c as loop pole piece 31, magnet 35, magnet 135, and auxiliary pole piece 134 are synchronously rotated about coinciding rotational axes LA/RA to facilitate a uniform differential of the magnetic flux passing through Hall effect device 18 for each diametric degree of synchronized rotation of control shaft 1 and the magnetic field about coinciding rotational axes LA/RA a 360 degree range of rotation within working air gap area 31b and within working air gap area 31c. Thus, it is to be appreciated that Hall effect device 18 is operable to sense a different magnitude of magnetic flux density for each diametric degree of synchronized rotation of control shaft 1 and the magnetic field about coinciding rotational axes LA/RA over a 360 degree range of rotation. It is to be further appreciated that, for each diametric degree of synchronized rotation of control shaft 1 and the magnetic field about coinciding rotational axes LA/RA over a 360 degree range of rotation, Hall effect device 18 is operable to either generate a voltage sensing signal $V_{SS1}$ as a function of the magnetic flux density of the magnetic flux passing through planar side surface 18a as shown in FIG. 27D and/or a voltage sensing signal $V_{SS2}$ as a function of the magnetic flux density of the magnetic flux passing through planar side surface 18b as shown in FIG. 27D.

Referring to FIGS. 28A–28C, a magnetic rotational position sensor 130 is shown. Magnetic rotational position sensor 230 comprises loop pole piece 31, magnet 35, magnet 135, and optional auxiliary pole piece 34 as previously described in connection with FIGS. 25A–25C and accompanying text. Magnetic rotational position sensor 130 further comprises a magnet 235, and a magnet 335. Magnet 235 is a permanent magnet having a convex north pole surface 235a, a concave south pole surface 235b, a planar south pole surface 235c, and a planar south pole surface 235d to generate magnetic flux (not shown). Magnet 335 is also a permanent magnet having a convex south pole surface 335a, a concave north pole surface 335b, a planar north pole surface 335c, and a planar north pole surface 335d to generate magnetic flux (not shown). Prior to an assembly of magnetic rotational position sensor 130, the magnetic flux within magnet 235 is rectilinearly magnetized from south pole surfaces 235b–235d to convex north pole surface 235a, and the magnetic flux within magnet 335 is rectilinearly magnetized from convex south pole surface 335a to north pole surfaces 335b–335d as exemplary shown by the arrows in FIGS. 28A and 28B. Magnet 235, and magnet 335 are disposed within air gap area 31a of loop pole piece 31 with convex north pole surface 235a of magnet 235 adjacently facing concave inner diameter surface 32a of pole piece 32, convex south pole surface 335a of magnet 335 adjacently facing concave inner diameter surface 33a of pole piece 33, concave south pole surface 235b of magnet 235 facing convex north pole surface 35a of magnet 35, concave north pole surface 335b of magnet 315 facing convex south pole surface 135a of magnet 135, planar south pole surface 235c of magnet 235 adjacently facing planar north pole surface 335d of magnet 335, and planar south pole surface 235d of magnet 235 adjacently facing planar north pole surface 335c of magnet 335 to enclose the magnetic flux from magnet 235 and the magnetic flux from magnet 335 within loop pole piece 31, and as a result, a magnetic field is established throughout air gap area 31a. Concave south pole surface 235b of magnet 235 spatially faces convex north pole surface 35a of magnet 35 to define a working air gap area 31d having a circular arcuate configuration therebetween, and concave south pole surface 335a of magnet 335 spatially faces convex north pole surface 135a of magnet 135 to define a working air gap area 31d having a circular arcuate configuration therebetween. Alternatively, the present invention contemplates that planar south pole surface 235c of magnet 235 spatially face planar north pole surface 335d of magnet 335, and planar south pole surface 235d of magnet 235 spatially face planar north pole surface 335c. In addition, the present invention contemplates magnet 235 and magnet 335 can be unitarily fabricated to constitute a single magnet.

Still referring to FIGS. 28A–28C, Hall effect device 18 is disposed air gap area 31a and locatable within working air gap area 31d and working air gap area 31e. It is to be appreciated that Hall effect device 18 is operable to sense a different magnitude of magnetic flux density for each diametric degree of synchronized rotation of the magnetic field about rotational axes RA over a 360 range of rotation. It is to be further appreciated that, for each degree of synchronized rotation of the magnetic field about rotational axes RA over the 360 degree range of rotation, Hall effect device 18 and Hall effect device 118 are operable to either generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 29A–29C, a magnetic rotational position sensor 230 is shown. Magnetic rotational position sensor 230 comprises loop pole piece 31, magnet 35, magnet 135, and optional auxiliary pole piece 34 as previously described in connection with FIGS. 25A–25C and accompanying text. Magnetic rotational position sensor 130 further comprises a magnet 435, and a magnet 535. Magnet 435 is a permanent magnet having a convex north pole surface 435a, a concave south pole surface 435b, a planar south pole surface 435c, and a planar south pole surface 435d to generate magnetic flux (not shown). Magnet 535 is also a permanent magnet having a convex south pole surface 535a, a concave north pole surface 535b, a planar north pole surface 535c, and a planar north pole surface 535d to generate magnetic flux (not shown). Prior to an assembly of magnetic rotational position sensor 230, the magnetic flux within magnet 435 is rectilinearly magnetized from south pole surfaces 435b–435d to convex north pole surface 435a, and the magnetic flux within magnet 535 is rectilinearly magnetized from convex south pole surface 535a to north pole surfaces 535b–535d as exemplary shown by the arrows in FIGS. 29A and 29B. Magnet 435, and magnet 535 are disposed within air gap area 31a of loop pole piece 31 with convex north pole surface 435a of magnet 435 facing concave inner diameter surface 32a of pole piece 32, convex south pole surface 535a of magnet 535 facing concave inner diameter surface 33a of pole piece 33, concave south pole surface 435b of magnet 435 facing convex north pole surface 35a of magnet 35, concave north pole surface 535b of magnet 535 facing convex south pole surface 135a of magnet 135, planar south pole surface 435c of magnet 435 adjacently facing planar north pole surface 535d of magnet 535, and planar south pole surface 435d of magnet 435 adjacently facing planar north pole surface 535c of magnet 535 to enclose the magnetic flux from magnet 435 and the magnetic flux from magnet 535 within loop pole piece 31, and as a result, a magnetic field is established throughout air gap area 31a. Concave south pole surface 435b of magnet 435 spatially faces convex north pole surface 35a of magnet 35 to define a working air gap area 31g having a circular arcuate configuration therebetween, concave south pole surface 535a of magnet 535 spatially faces convex north pole surface 435a of magnet 435 to define a working air gap area 31h having a circular arcuate configuration therebetween, convex north pole surface 435a of magnet 435 spatially faces concave inner diameter surface 32a of pole piece 32 to define a working air gap area 31f having a circular arcuate configuration therebetween, and convex south pole surface 535a of magnet 535 spatially faces concave inner diameter surface 33a of pole piece 33 to define a working air gap area 31i having a circular arcuate configuration therebetween. Alternatively, the present invention contemplates that planar south pole surface 435c of magnet 435 spatially face planar north pole surface 535d of magnet 535, and planar south pole surface 435d of magnet 435 spatially face planar north pole surface 535c. In addition, the present invention contemplates that magnet 435 and magnet 535 can be unitarily fabricated to constitute a single magnet.

Still referring to FIGS. 29A–29C, Hall effect device 18 is disposed air gap area 31a and locatable within working air gap area 31f and working air gap area 31i. Hall effect device 118 is disposed air gap area 31a and locatable within working air gap area 31g and working air gap area 31h. It is to be appreciated that Hall effect device 18 and Hall effect device 118 are operable to sense a different magnitude of magnetic flux density, respectively, for each diametric degree of synchronized rotation of the magnetic field about rotational axes RA over a 360 degree range of rotation. It is to be further appreciated that, for each degree of synchronized rotation of the magnetic field about rotational axes RA a 360 degree range of rotation, Hall effect device 18 and Hall effect device 118 are operable to either generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

While the present invention has been illustrated and described in detail in the drawings and foregoing description, the same is to be considered as illustrative and not restrictive in character, it being understood that the preferred embodiments have been shown and described and that all changes and modifications that come within the spirit of the invention are desired to be protected.

What is claimed is:

1. A magnetic rotational position sensor for sensing each degree of rotation of a control shaft about a first rotational axis over a definable range of rotation, said magnetic rotational position sensor comprising:

a loop pole piece including a plurality of pole pieces serially adjoined in a closed configuration to define an air gap area, a first pole piece of said plurality of pole pieces having an inner surface swept out over the definable range of rotation by an outer end of a first radius having its opposite end located on a second rotational axis, a second pole piece of said plurality of pole pieces having an inner surface swept out over the definable range of rotation by an outer end of a second radius having its opposite end located on said second rotational axis;

a magnet having a first pole surface and a second pole surface to generate magnetic flux, said magnet disposed within said air gap area of said loop pole piece, wherein said first pole surface of said magnet faces said inner surface of said first pole piece and said second pole surface of said magnet faces said inner surface of said second pole piece to enclose said magnetic flux within said loop pole piece whereby a magnetic field is established throughout said air gap area, wherein said first pole surface of said magnet spatially faces said inner surface of said first pole piece to define a working air gap area of said air gap area therebetween, and wherein said loop pole piece and said magnet are adjoined to the control shaft to synchronously rotate about said second rotational axis for each degree of rotation of the control shaft about the first rotational axis over the definable range of rotation whereby each degree of rotation of the control shaft about the first rotational axis over the definable range of rotation exclusively corresponds to a distinct degree of synchronized rotation of said magnetic field about said second rotational axis over the definable range of rotation; and a magnetic flux sensitive transducer disposed within said working air gap area, said magnetic flux sensitive transducer being operable to sense a magnetic flux density of any portion of said magnetic flux passing through said magnetic flux sensitive transducer, wherein said inner surface of said first pole piece and said first pole surface of said magnet are contoured to arcuately configure said working air gap area therebetween whereby said magnetic flux sensitive transducer is operable to sense a different magnitude of magnetic flux density for each degree of said synchronized rotation of the control shaft and said magnetic field over the definable range of rotation.

2. The magnetic rotational position sensor of claim 1 wherein said inner surface of said first pole piece has a concave contour and said first pole surface of said magnet has a convex contour.

3. The magnetic rotational position sensor of claim 1 wherein said inner surface of said first pole piece has a convex contour and said first pole surface of said magnet has a concave contour.

4. The magnetic rotational position sensor of claim 1 wherein said second rotational axis coincides with the first rotational axis.

5. A magnetic rotational position sensor for sensing each degree of rotation of a control shaft about a first rotational axis over a definable range of rotation, said magnetic rotational position sensor comprising:

a loop pole piece including a plurality of pole pieces serially adjoined in a closed configuration to define an air gap area, a first pole piece of said plurality of pole pieces having an inner surface swept out over the definable range of rotation by an outer end of a first radius having its opposite end located on a second rotational axis, a second pole piece of said plurality of pole pieces having an inner surface swept out over the definable range of rotation by an outer end of a second radius having its opposite end located on said second rotational axis;

a magnet having a first pole surface and a second pole surface to generate magnetic flux, said magnet disposed within said air gap area of said loop pole piece, wherein said first pole surface of said magnet faces said inner surface of said first pole piece and said second pole surface of said magnet faces said inner surface of said second pole piece to enclose said magnetic flux within said loop pole piece whereby a magnetic field is established throughout said air gap area, wherein said first pole surface of said magnet spatially faces said inner surface of said first pole piece to define a first working air gap area of said air gap area therebetween and said second pole surface of said magnet spatially faces said inner surface of said second pole piece to define a second working air gap area of said air gap area therebetween, and wherein said loop pole piece and said magnet are adjoined to the control shaft to synchronously rotate about said second rotational axis for each degree of rotation of the control shaft about the first rotational axis over the definable range of rotation whereby each degree of rotation of the control shaft about the first rotational axis over the definable range of rotation exclusively corresponds to a distinct degree of synchronized rotation of said magnetic field about said second rotational axis over the definable range of rotation;

a first magnetic flux sensitive transducer disposed within said first working air gap area, said first magnetic flux sensitive transducer being operable to sense a magnetic flux density of any first portion of said magnetic flux passing through said first magnetic flux sensitive transducer, wherein said inner surface of said first pole piece and said first pole surface of said magnet are contoured to arcuately configure said first working air gap area therebetween whereby said first magnetic flux sensitive transducer is operable to sense a different magnitude of magnetic flux density for each degree of said synchronized rotation of the control shaft and said magnetic field over the definable range of rotation; and a second magnetic flux sensitive transducer disposed within said second working air gap area, said second magnetic flux sensitive transducer being operable to sense a magnetic flux density of any second portion of said magnetic flux passing through said second magnetic flux sensitive transducer, wherein said inner surface of said second pole piece and said second pole surface of said magnet are contoured to arcuately configure said second working air gap area therebetween whereby said second magnetic flux sensitive transducer is operable to sense a different magnitude of magnetic flux density for each degree of said synchronized rotation of the control shaft and said magnetic field over the definable range of rotation.

6. The magnetic rotational position sensor of claim 5 wherein said inner surface of said first pole piece has a concave contour, and said first pole surface of said magnet has a convex contour.

7. The magnetic rotational position sensor of claim 6 wherein said inner surface of said second pole piece has a convex contour, and said second pole surface of said magnet has a concave contour.

8. The magnetic rotational position sensor of claim 5 wherein said second rotational axis coincides with the first rotational axis.

9. A magnetic rotational position sensor for sensing each degree of rotation of a control shaft about a first rotational axis over a definable range of rotation, said magnetic rotational position sensor comprising:
- a loop pole piece including a plurality of pole pieces serially adjoined in a closed configuration to define an air gap area, a first pole piece of said plurality of pole pieces having an inner surface swept out over the definable range of rotation by an outer end of a first radius having its opposite end located on a second rotational axis, a second pole piece of said plurality of pole pieces having an inner surface swept out over the definable range of rotation by an outer end of a second radius having its opposite end located on said second rotational axis;
- a first magnet having a first pole surface and a second pole surface to generate a first set of magnetic flux, said first magnet disposed within said air gap area of said loop pole piece;
- a second magnet having a first pole surface and a second pole surface to generate a second set of magnetic flux, said second magnet disposed within said air gap area of said loop pole piece,
  - wherein said first pole surface of said first magnet faces said inner surface of said first pole piece, said first pole surface of said second magnet faces said inner surface of said second pole piece, and said second pole surface of said first magnet faces said second pole surface of said second magnet to enclose said first set of magnetic flux and said second set of magnetic flux within said loop pole piece whereby a magnetic field is established throughout said air gap area,
  - wherein said second pole surface of said first magnet spatially faces said second pole surface of said second magnet to define a working air gap area of said air gap area therebetween, and
  - wherein said loop pole piece, said first magnet, and said second magnet are adjoined to the control shaft to synchronously rotate about said second rotational axis for each degree of rotation of the control shaft about the first rotational axis over the definable range of rotation whereby each degree of rotation of the control shaft about the first rotational axis over the definable range of rotation exclusively corresponds to a distinct degree of synchronized rotation of said magnetic field about said second rotational axis over the definable range of rotation; and
- a magnetic flux sensitive transducer disposed within said working air gap area, said magnetic flux sensitive transducer being operable to sense a magnetic flux density of a portion of a compilation of said first set of magnetic flux and said second set of magnetic flux passing through said magnetic flux sensitive transducer,
  - wherein said second pole surface of said first magnet and said second pole surface of said second magnetic are contoured to arcuately configure said working air gap area therebetween whereby said magnetic flux sensitive transducer is operable to sense a different magnitude of magnetic flux density for each degree of said synchronized rotation of the control shaft and said at least one magnetic field over the definable range of rotation.

10. The magnetic rotational position sensor of claim 9 wherein said second pole surface of said first magnet has a convex contour, and said second pole surface of said second magnet has a concave contour.

11. The magnetic rotational position sensor of claim 9 wherein said second rotational axis coincides with the first rotational axis.

12. A magnetic rotational position sensor for sensing each degree of rotation of a control shaft about a first rotational axis, said magnetic rotational position sensor comprising:
- a loop pole piece including a plurality of pole pieces serially adjoined in a closed configuration to define an air gap area, a first pole piece of said plurality of pole pieces having an inner surface swept out over the definable range of rotation by an outer end of a first radius having its opposite end located on a second rotational axis, a second pole piece of said plurality of pole pieces having an inner surface swept out over the definable range of rotation by an outer end of the first radius having its opposite end located on said second rotational axis;
- a first magnet having a first pole surface and a second pole surface to generate a first set of magnetic flux, said first magnet disposed within said air gap area of said loop pole piece;
- a second magnet having a first pole surface and a second pole surface to generate a second set of magnetic flux, said second magnet disposed within said air gap area of said loop pole piece,
  - wherein said first pole surface of said first magnet faces said inner surface of said first pole piece, said first pole surface of said second magnet faces said inner surface of said second pole piece, and said second pole surface of said first magnet faces said second pole surface of said second magnet to enclose said first set of magnetic flux and said second set of magnetic flux within said loop pole piece whereby a magnetic field is established throughout said air gap area,
  - wherein said first pole surface of said first magnet spatially faces said inner surface of said first pole piece to define a first working air gap area of said air gap area therebetween and said first pole surface of said second magnet spatially faces said inner surface of said second pole piece to define a second working air gap area of said air gap area therebetween, said first working air gap area and said second working air gap area being contiguous,
  - wherein said loop pole piece, said first magnet, and said second magnet are adjoined to the control shaft to synchronously rotate about said second rotational axis for each degree of rotation of the control shaft about the first rotational axis whereby each degree of rotation of the control shaft about the first rotational axis exclusively corresponds to a distinct degree of synchronized rotation of said magnetic field about said second rotational axis; and
- a first magnetic flux sensitive transducer disposed within said air gap area of said loop pole piece, said first magnetic flux sensitive transducer locatable within said first working air gap area and locatable within said second working air gap area as said magnetic field is synchronously rotated about said second rotational axis, said first magnetic flux sensitive transducer being operable to sense a magnetic flux density of any portion of said first set of magnetic flux passing through said first magnetic flux sensitive transducer when said first magnetic flux sensitive transducer is located within said first working air gap area and being operable to sense a magnetic flux density of any portion of said second set of magnetic flux passing through said first magnetic flux sensitive transducer when said first magnetic flux sensitive transducer is located within said second working air gap area, wherein said first pole surface of said first magnet and said inner surface of said first pole piece are contoured to arcuately configure said first working air gap area therebetween whereby said first magnetic flux sensitive transducer is operable to sense a different magnitude of magnetic flux density for each degree of said synchronized rotation of the control shaft and said magnetic field when said magnetic flux sensitive transducer is located within said first working air gap area, and wherein said first pole surface of said second magnet and said inner surface of said second pole piece are contoured to arcuately configure said second working air gap area therebetween whereby said magnetic flux sensitive transducer is operable to sense a different magnitude of magnetic flux density passing through said magnetic flux sensitive transducer for each degree of said synchronized rotation of the control shaft and said magnetic field when said magnetic flux sensitive transducer is located within said second working air gap area.

13. The magnetic rotational position sensor of claim 12 wherein said inner surface of said first pole piece has a concave contour and said first pole surface of said first magnet has a convex contour.

14. The magnetic rotational position sensor of claim 13 wherein said inner surface of said second pole piece has a concave contour and said first pole surface of said second magnet has a convex contour.

15. The magnetic rotational position sensor of claim 12 further comprising an auxiliary pole piece, wherein said second pole surface of said first magnet spatially faces said second pole surface of said second magnet, and said auxiliary pole piece is disposed therebetween.

16. The magnetic rotational position sensor of claim 12 wherein said second rotational axis coincides with the first rotational axis.

17. A magnetic rotational position sensor for sensing each degree of rotation of a control shaft about a first rotational axis, said magnetic rotational position sensor comprising:

a loop pole piece including a plurality of pole pieces serially adjoined in a closed configuration to define an air gap area, a first pole piece of said plurality of pole pieces having an inner surface swept out over the definable range of rotation by an outer end of a first radius having its opposite end located on a second rotational axis, a second pole piece of said plurality of pole pieces having an inner surface swept out over the definable range of rotation by an outer end of a first radius having its opposite end located on said second rotational axis;

a first magnet having a first pole surface and a second pole surface to generate a first set of magnetic flux, said first magnet disposed within said air gap area of said loop pole piece;

a second magnet having a first pole surface and a second pole surface to generate a second set of magnetic flux, said second magnet disposed within said air gap area of said loop pole piece;

a third magnet having a first pole surface and a second pole surface to generate a third set of magnetic flux, said third magnet disposed within said air gap area of said loop pole piece;

a fourth magnet having a first pole surface and a second pole surface to generate a fourth set of magnetic flux, said fourth magnet disposed within said air gap area of said loop pole piece, wherein said first pole surface of said first magnet faces said first pole surface of said third magnet, said second pole surface of said third magnet faces said inner surface of said first pole piece, said first pole surface of said second magnet faces said first pole surface of said fourth magnet, said second pole surface of said fourth magnet faces said inner surface of said second pole piece, and said second pole surface of said first magnet faces said second pole surface of said second magnet to enclose said first set of magnetic flux, said second set of magnetic flux, said third set of magnetic flux and said fourth set of magnetic flux within said loop pole piece whereby a magnetic field is established throughout said air gap area, wherein said first pole surface of said first magnet spatially faces said first pole surface of said third magnet to define a first working air gap area of said air gap area therebetween and said first pole surface of said second magnet spatially faces said first pole surface of said fourth magnet to define a second working air gap area of said air gap area therebetween, said first working air gap area and said second working air gap area being contiguous, wherein said loop pole piece, said first magnet, said second magnet, said third magnet and said fourth magnet are adjoined to the control shaft to synchronously rotate about said second rotational axis for each degree of rotation of the control shaft about the first rotational axis whereby each degree of rotation of the control shaft about the first rotational axis exclusively corresponds to a distinct degree of synchronized rotation of magnetic field about said second rotational axis; and a first magnetic flux sensitive transducer disposed within said air gap area of said loop pole piece, said first magnetic flux sensitive transducer locatable within said first working air gap area and locatable within said second working air gap area as said loop pole piece, said first magnet, said second magnet, said third magnet and said fourth magnet are synchronously rotated about said second rotational axis, said first magnetic flux sensitive transducer operable to sense a magnetic flux density of any compilation of said first set of magnetic flux and said third set of magnetic flux when located within said first working air gap area and being operable to sense a magnetic flux density of any compilation of said second set of magnetic flux and said fourth set of magnetic flux when located within said second working air gap area, wherein said first pole surface of said first magnet and said first pole surface of said third magnet are contoured to arcuately configure said first working air gap area therebetween whereby said first magnetic flux sensitive transducer is operable to sense a different magnitude of magnetic flux density for each degree of said synchronized rotation of the control shaft and said magnetic field when said first magnetic flux sensitive transducer is located within said first working air gap area, and wherein said first pole surface of said second magnet and said first pole surface of said fourth magnet are contoured to arcuately configure said second working air gap area therebetween whereby said first magnetic flux sensitive transducer is operable to sense a different magnitude of magnetic flux density for each degree of said synchronized rotation of the control shaft and said magnetic field when said first magnetic flux sensitive transducer is located within said second working air gap area.

18. The magnetic rotational position sensor of claim 17 wherein said first pole surface of said first magnet has a convex contour and said first pole surface of said third magnet has a concave contour.

19. The magnetic rotational position sensor of claim 18 wherein said first pole surface of said second magnet has a convex contour and said first pole surface of said fourth magnet has a concave contour.

20. The magnetic rotational position sensor of claim 17 further comprising an auxiliary pole piece, wherein said second pole surface of said first magnet spatially faces said second pole surface of said second magnet, and said auxiliary pole piece is disposed therebetween.

21. The magnetic rotational position sensor of claim 17 wherein said second rotational axis coincides with the first rotational axis.

22. The magnetic rotational position sensor of claim 17 further comprising a second magnetic flux sensitive transducer, said second magnetic flux sensitive transducer operable to sense a magnetic flux density passing through said second magnetic flux sensitive transducer, wherein said second pole surface of said third magnet spatially faces said inner surface of said first pole piece to define a third working air gap area of said air gap area therebetween and said second pole surface of said fourth magnet spatially faces said inner surface of said second pole piece to define a fourth working air gap area of said air gap area therebetween, said third working air gap and said fourth working air gap area being contiguous, wherein said second magnetic flux sensitive transducer is disposed within said air gap area of said loop pole piece, said second magnetic flux sensitive transducer locatable within said third working air gap area and locatable within said fourth working air gap area as said loop pole piece, said first magnet, said second magnet, said third magnet and said fourth magnet are synchronously rotated about said second rotational axis, wherein said second magnetic flux sensitive transducer is operable to sense a magnetic flux density of any portion of said third set of magnetic flux when located within said third working air gap area and is operable to sense a magnetic flux density of any portion of said fourth set of magnetic flux when located within said fourth working air gap area, wherein said second pole surface of said third magnet and said inner surface of said first pole piece are contoured to arcuately configure said third working air gap area therebetween whereby said second magnetic flux sensitive transducer is operable to sense a different magnitude of magnetic flux density for each degree of said synchronized rotation of the control shaft and said magnetic field when said second magnetic flux sensitive transducer is located within said third working air gap area, and wherein said second pole surface of said fourth magnet and said inner surface of said second pole piece are contoured to arcuately configure said fourth working air gap area therebetween whereby said second magnetic flux sensitive transducer is operable to sense a different magnetic flux density for each degree of said synchronized rotation of the control shaft and said magnetic field when said second magnetic flux sensitive transducer is located within said fourth working air gap area.

23. The magnetic rotational position sensor of claim 22 wherein said second pole surface of said third magnet has a convex contour and said inner surface of said first pole piece has a concave contour.

24. The magnetic rotational position sensor of claim 22 wherein said second pole surface of said fourth magnet has a convex contour and said inner surface of said second pole piece has a concave contour.

25. A magnetic rotational position sensor for sensing each degree of rotation of a control shaft about a first rotational axis, said magnetic rotational position sensor comprising:

a loop pole piece including a plurality of pole pieces serially adjoined in a closed configuration to define an air gap area, a first pole piece of said plurality of pole pieces having an inner surface swept out over the definable range of rotation by an outer end of a first radius having its opposite end located on a second rotational axis, a second pole piece of said plurality of pole pieces having an inner surface swept out over the definable range of rotation by an outer end of the first radius having its opposite end located on said second rotational axis;

a first magnet having a first pole surface, and a second pole surface to generate a first set of magnetic flux, said first magnet disposed within said air gap area of said loop pole piece;

a second magnet having a first pole surface, a second pole surface, a third pole surface, and a fourth pole surface to generate a second set of magnetic flux, said second magnet disposed within said air gap area of said loop pole piece, wherein said first pole surface of said first magnet faces said first pole surface of said second magnet, said second pole surface of said second magnet faces said inner surface of said first pole piece, said second pole surface of said first magnet faces said third pole surface of said second magnet, and said fourth pole surface of said second magnet faces said inner surface of said second pole piece to enclose said first set of magnetic flux, and said second set of magnetic flux within said loop pole piece whereby a magnetic field is established throughout said air gap area, wherein said first pole surface of said first magnet spatially faces said first pole surface of said second magnet to define a first working air gap area of said air gap area therebetween and said second pole surface of said first magnet spatially faces said third pole surface of said second magnet to define a second working air gap area of said air gap area therebetween, said first working air gap area and said second working air gap area being contiguous, wherein said loop pole piece, said first magnet, and said second magnet are adjoined to the control shaft to synchronously rotate about said second rotational axis for each degree of rotation of the control shaft about the first rotational axis whereby each degree of rotation of the control shaft about the first rotational axis exclusively corresponds to a distinct degree of synchronized rotation of said magnetic field about said second rotational axis, and a first magnetic flux sensitive transducer disposed within said air gap area of said loop pole piece, said first magnetic flux sensitive transducer locatable within said first working air gap area of said loop pole piece and locatable within said second working air gap area of said loop pole piece as said loop pole piece, said first magnet, and said second magnet are synchronously rotated about said second rotational axis, said first magnetic flux sensitive transducer operable to sense a magnetic flux density of any compilation of said first set of magnetic flux and said second set of magnetic flux passing through said first magnetic flux sensitive transducer, wherein said first pole surface of said first magnet and said first pole surface of said second magnet are contoured to arcuately configure said first working air gap area therebetween whereby said first magnetic flux sensitive transducer is operable to sense a different magnitude of magnetic flux density for each degree of said synchronized rotation of the control shaft and said magnetic field when said first magnetic flux sensitive transducer is located within said first working air gap area, and wherein said second pole surface of said first magnet and said third pole surface of said second magnet are contoured to arcuately configure said second working air gap area therebetween whereby said first magnetic flux sensitive transducer is operable to sense a different magnitude of magnetic flux density for each degree of said synchronized rotation of the control shaft and said magnetic field when said first magnetic flux sensitive transducer is located within said second working air gap area.

26. The magnetic rotational position sensor of claim 25 wherein said first pole surface of said first magnet has a convex contour and said first pole surface of said second magnet has a concave contour.

27. The magnetic rotational position sensor of claim 25 wherein said second pole surface of said first magnet has a convex contour and said third pole surface of said second magnet has a concave contour.

28. The magnetic rotational position sensor of claim 25 further comprising an auxiliary pole piece, wherein said first magnet further has a third pole surface and a fourth pole surface spatially facing said third pole surface, said auxiliary pole piece being disposed between said third pole surface of said first magnet and said fourth pole surface of said first magnet.

29. The magnetic rotational position sensor of claim 25 wherein said second rotational axis coincides with the first rotational axis.

30. The magnetic rotational position sensor of claim 25 further comprising a second magnetic flux sensitive transducer, said second magnetic flux sensitive transducer operable to sense a magnetic flux density of any second compilation of said first set of magnetic flux and said second set of magnetic flux passing through said second magnetic flux sensitive transducer, wherein said second pole surface of said second magnet spatially faces said inner surface of said first pole piece to define a third working air gap area of said air gap area therebetween, and said fourth pole surface of said second magnet spatially faces said inner surface of said second pole piece to define a fourth working air gap area of said air gap area therebetween, said third working air gap area and said fourth working air gap area being contiguous, wherein said second magnetic flux sensitive transducer is disposed within said air gap area of said loop pole piece, said second magnetic flux sensitive transducer locatable within said third working air gap area and locatable within said fourth working air gap area as said loop pole piece, said first magnet, and said second magnet are synchronously rotated about said second rotational axis, wherein said second pole surface of said second magnet and said inner surface of said first pole piece are contoured to arcuately configure said third working air gap area therebetween whereby said second magnetic flux sensitive transducer is operable to sense a different magnitude of magnetic flux density for each degree of said synchronized rotation of the control shaft and said magnetic field when said second magnetic flux sensitive transducer is located within said third working air gap area, and wherein said fourth pole surface of said second magnet and said inner surface of said second pole piece are contoured to arcuately configure said fourth working air gap area therebetween whereby said second magnetic flux sensitive transducer is operable to sense a different magnitude of magnetic flux density for each degree of said synchronized rotation of the control shaft and said magnetic field when said second magnetic flux sensitive transducer is located within said fourth working air gap area.

31. The magnetic rotational position sensor of claim 30 wherein said second pole surface of said second magnet has a convex contour and said inner surface of said first pole piece has a concave contour.

32. The magnetic rotational position sensor of claim 30 wherein said fourth pole surface of said second magnet has a convex contour and said inner surface of said second pole piece has a concave contour.

* * * * *

UNITED STATES PATENT AND TRADEMARK OFFICE
CERTIFICATE OF CORRECTION

| | | |
|---|---|---|
| PATENT NO. | : 6,310,473 B1 | |
| APPLICATION NO. | : 09/211538 | |
| DATED | : October 30, 2001 | |
| INVENTOR(S) | : Zhao | |

It is certified that error appears in the above-identified patent and that said Letters Patent is hereby corrected as shown below:

PLEASE DELETE THE SPECIFICATION COLUMNS 1 LINE 5 – COLUMNS 34 LINE 62 AND INSERT THE ATTACHED SPECIFICATION AS SHOWN

Signed and Sealed this

Twenty-second Day of May, 2007

JON W. DUDAS
*Director of the United States Patent and Trademark Office*

MAGNETIC ROTATIONAL POSITION SENSOR

BACKGROUND OF THE INVENTION

The present invention generally relates to the field of rotational position sensors, and more specifically to a magnetic rotational position sensor for sensing each rotational position of a control shaft about a rotational axis over a definable range of rotation.

Electronic fuel injected engines used in motor vehicles typically embody a microprocessor based control system. Fuel is metered or injector activation time is varied in accordance with various engine parameters including the regulation of air flow into the engine via a rotational position of a throttle diaphragm relative to a closed position of the throttle diaphragm. Typically, a shaft is adjoined to the throttle diaphragm to synchronously rotate the throttle diaphragm as the shaft is rotated between the closed position and a maximal open position of the throttle diaphragm. Rotational position sensors are adjoined to or adjacent the shaft to sense each rotational position of the shaft, i.e. each degree of rotation of the shaft relative to the closed position, thereby sensing the rotational position of the throttle diaphragm relative to the closed position.

One of the problems associated with prior contact rotational position sensors that incorporate a contact element, e.g. a contact potentiometer, is the wear and tear experienced by the contact element that reduces the useable life of the contact rotational position sensor. One of the problems associated with prior magnetic rotational position sensors is magnetic hysteresis. Magnetic hysteresis causes an offset error signal to be generated whenever a magnet of the sensor is advanced from and returned to a reference position of the magnet, or whenever a magnetizable component of the sensor, e.g. a magnetizable pole piece, is advanced from or toward the magnet of the sensor.

Annealing the magnet can minimize, but never eliminate, magnetic hysteresis. What is therefore needed is a novel and unique magnetic rotational position sensor that neither incorporates a contact element nor experiences magnetic hysteresis.

SUMMARY OF THE INVENTION

The present invention is a magnetic rotational position sensor for sensing each degree of rotation of a control shaft about a first rotational axis over a definable range of rotation. The present invention overcomes the aforementioned drawbacks associated with prior contact rotational position sensors and prior magnetic rotational position sensors. Various aspects of the present invention are novel, non-obvious, and provide various advantages. While the actual nature of the present invention described in detail herein can only be determined with reference to the claims appended hereto, certain features which are characteristic of the present invention disclosed herein can be described briefly.

Each embodiment of a magnetic rotational position sensor in accordance with the present invention comprises a loop pole piece, one or more magnets, and one or more magnetic flux sensitive transducers. The loop pole piece includes a plurality of pole pieces serially adjoined in a closed configuration to define an air gap area. One or more pole pieces of the loop pole piece has an inner surface radially extending from a second rotational axis. Each magnet has a north pole surface and a south pole surface to generate magnetic flux.

A magnet is disposed within the air gap area of the loop pole piece with each pole surface of the magnet facing either the inner surface of a pole piece of the loop pole piece or a pole surface of another magnet disposed within the air gap area to enclose the magnetic flux from the magnet(s) within the loop pole piece to thereby establish a magnetic field throughout the air gap area. The loop pole piece and the magnet(s) are adjoined to the control shaft to synchronously rotate about the second rotational axis over the definable range of rotation as the control shaft is rotated about the first rotational axis over the definable range of rotation. Thus, each degree of rotation of the control shaft about the first rotational axis over the definable range of rotation exclusively corresponds to a distinct degree of synchronized rotation of the magnetic field about the second rotational axis over the definable range of rotation.

In a first aspect of the present invention, a pole surface of a magnet disposed within the air gap area spatially faces an inner surface of a pole piece of the loop pole piece to define a working air gap area therebetween. The pole surface of the magnet, and the inner surface of the pole piece are contoured to arcuately configure the working air gap area. In a second aspect of the present invention, a pole surface of a first magnet disposed within the air gap area spatially faces a pole surface of a second magnet disposed within the air gap area to define a working air gap area therebetween. The pole surface of the first magnet, and the pole surface of the second magnet are contoured to arcuately configure the working air gap area.

Each magnetic flux sensitive transducer is operable to sense a magnetic flux density of any magnetic flux passing through the magnetic flux sensitive transducer. A magnetic flux sensitive transducer is disposed within each working air gap area. The arcuate configuration of the working air gap area enables the magnetic flux sensitive transducer to be operable to sense a different magnitude of magnetic flux density for each degree of synchronously rotation of the control shaft and the magnetic field over a definable range of rotation.

It is a primary object of the present invention to sense each rotational position of the control shaft about the rotational axis over the definable range of rotation without experiencing magnetic hysteresis by synchronously rotating the loop pole piece, and the magnet(s) about the second rotational axis as the control shaft rotates about the first rotational axis.

Further objects, features, and advantages of the present invention shall become apparent from the detailed drawings and descriptions provided herein.

BRIEF DESCRIPTION OF THE DRAWINGS

FIGS. 1A-1C are views of one embodiment of a magnetic rotational position sensor in accordance with the present invention.

FIGS. 2A-2B are views of an exemplary adjoining of the magnetic rotational position sensor of FIGS. 1A-1C to a cylindrical control shaft.

FIGS. 3A-3C are diagrammatic illustrations of a magnet and a loop pole piece of the magnetic rotational position sensor of FIGS. 1A-1C as well as the cylindrical control shaft of FIGS. 2A-2B synchronously rotating about a pair of coinciding rotational axes.

FIG. 3D is a graph depicting exemplary waveforms of a first voltage sensing signal and of a second voltage sensing signal of a Hall effect device of the magnetic rotational position sensor of FIGS. 1A-1C.

FIGS. 4A-4C are views of a first modified embodiment of the magnetic rotational position sensor of FIGS. 1A-1C.

FIGS. 5A-5C are views of a second modified embodiment of the magnetic rotational position sensor of FIGS. 1A-1C.

FIGS. 6A-6C are views of a first alternative embodiment of the magnetic rotational position sensor of FIGS. 1A-1C.

FIGS. 7A-7C are views of a second alternative embodiment of the magnetic rotational position sensor of FIGS. 1A-1C.

FIGS. 8A-8C are views of a third alternative embodiment of the magnetic rotational position sensor of FIGS. 1A-1C.

FIGS. 9A-9C are views of a fourth alternative embodiment of the magnetic rotational position sensor of FIGS. 1A-1C.

FIGS. 10A-10C are views of a fifth alternative embodiment of the magnetic rotational position sensor of FIGS. 1A-1C.

FIGS. 11A-11C are views of a sixth alternative embodiment of the magnetic rotational position sensor of FIGS. 1A-1C.

FIGS. 12A-12C are views of a seventh alternative embodiment of the magnetic rotational position sensor of FIGS. 1A-1C.

FIGS. 13A-13C are views of an eighth alternative embodiment of the magnetic rotational position sensor of FIGS. 1A-1C.

FIGS. 14A-14C are views of another embodiment of a magnetic rotational position sensor in accordance with the present invention.

FIGS. 15A-15B are views of an exemplary adjoining of the magnetic rotational position sensor of FIGS. 14A-14C to a cylindrical control shaft.

FIGS. 16A-16C are diagrammatic illustrations of a magnet and a loop pole piece of the magnetic rotational position sensor of FIGS. 14A-14C as well as the cylindrical control shaft of FIGS. 15A-15B synchronously rotating about a pair of coinciding rotational axes.

FIG. 16D is a graph depicting exemplary waveforms of a first voltage sensing signal and of a second voltage sensing signal of a Hall effect device of the magnetic rotational position sensor of FIGS. 14A-14C.

FIGS. 17A-17C are views of a first modified embodiment of the magnetic rotational position sensor of FIGS. 14A-14C.

FIGS. 18A-18C are views of a second modified embodiment of the magnetic rotational position sensor of FIGS. 14A-14C.

FIGS. 19A-19C are views of a first alternative embodiment of the magnetic rotational position sensor of FIGS. 14A-14C.

FIGS. 20A-20C are views of a second alternative embodiment of the magnetic rotational position sensor of FIGS. 14A-14C.

FIGS. 21A-21C are views of a third alternative embodiment of the magnetic rotational position sensor of FIGS. 14A-14C.

FIGS. 22A-22C are views of a fourth alternative embodiment of the magnetic rotational position sensor of FIGS. 14A-14C.

FIGS. 23A-23C are views of a fifth alternative embodiment of the magnetic rotational position sensor of FIGS. 14A-14C.

FIGS. 24A-24C are views of a sixth alternative embodiment of the magnetic rotational position sensor of FIGS. 14A-14C.

FIGS. 25A-25C are views of another embodiment of a magnetic rotational position sensor in accordance with the present invention.

FIGS. 26A-26B are views of an exemplary adjoining of the magnetic rotational position sensor of FIGS. 25A-25C to a cylindrical control shaft.

FIGS. 27A-27C are diagrammatic illustrations of a magnet and a loop pole piece of the magnetic rotational position sensor of FIGS. 25A-25C as well as the cylindrical control shaft of FIGS. 26A-26B synchronously rotating about a pair of coinciding rotational axes.

FIG. 27D is a graph depicting exemplary waveforms of a first voltage sensing signal and a waveform of a second voltage sensing signal of a Hall effect device of the magnetic rotational position sensor of FIGS. 25A-25C.

FIGS. 28A-28C are views of a first alternative embodiment of the magnetic rotational position sensor of FIGS. 25A-25C.

FIGS. 29A-29C are views of a second alternative embodiment of the magnetic rotational position sensor of FIGS. 25A-25C.

DESCRIPTION OF THE PREFERRED EMBODIMENTS

For the purposes of promoting an understanding of the principles of the present invention, reference will now be made to the preferred embodiments of the present invention as illustrated in the drawings and specific language will be used to describe the same. It will nevertheless be understood that no limitation of the scope of the present invention is thereby intended. Any alterations and further modifications in the illustrated embodiments, and any further applications of the principles of the present invention as illustrated herein are contemplated as would normally occur to one skilled in the art to which the present invention relates.

The present invention is a series of novel and unique magnetic rotational position sensors for sensing each degree of rotation of a control shaft about a rotational axis over a definable range of rotation without experiencing magnetic hysteresis. For purposes of the present invention, a control shaft is broadly defined as an article of manufacture or a combination of manufactured articles for controlling, directly or indirectly, any rotational movement, any linear movement, and/or any angular movement of an object, e.g. a throttle diaphragm, a foot pedal, a piston, etc., as the control shaft is rotated about a rotational axis, e.g. a longitudinal axis of the control shaft. The present invention contemplates that a control shaft may be magnetic or magnetizable. The present invention further contemplates that a control shaft can have any geometric configuration and any physical dimensions.

Each embodiment of a magnetic rotational position sensor in accordance with the present invention comprises a loop pole piece, one or more magnets, and one or more magnetic flux sensitive transducers. An embodiment of a magnetic rotational position sensor in accordance with the present invention can further include one or more auxiliary pole pieces.

For purposes of the present invention, a pole piece is broadly defined as an article of manufacture or a combination of manufactured articles for conducting magnetic flux, and a loop pole piece is defined as a plurality of pole pieces serially adjoined in a closed configuration to define an air gap area. Also for purposes of the present invention, a serial adjoining of the plurality of pole pieces is broadly defined as a unitary fabrication, a permanent affixation, a detachable coupling, an engagement, and/or a contiguous disposal of each pole piece in a serial arrangement by any manufacturing method. The present invention also contemplates that a pole piece can be made from any ferromagnetic material or any combination of ferromagnetic materials. The present invention further contemplates that a pole piece can have any geometric configuration and any physical dimensions. Consequently, any preferential reference to a particular type of adjoining of the plurality of pole pieces of an illustrated loop pole piece herein, any preferential reference to a particular ferromagnetic material or combination of ferromagnetic materials for an illustrated pole piece herein, and any reference to a particular geometric configuration and/or physical dimensions of an illustrated pole piece herein are given solely for purposes of describing the best mode of the present invention and are not meant to be limiting in any way.

For purposes of the present invention, a magnet is broadly defined as an article of manufacture or a combination of manufactured articles having a north pole surface and a south pole surface for generating magnetic flux. Accordingly, the present invention contemplates that a magnet can be made from any magnetic material or any combination of magnetic materials. The present invention further contemplates that a magnet can have any geometric configuration and any physical dimensions. Consequently, any preferential reference to a particular magnetic material or combination of magnetic materials for an illustrated magnet herein, and any reference to a particular geometric configuration and/or physical dimensions of an illustrated magnet herein is given solely for purposes of describing the best mode of the present invention and are not meant to be limiting in any way. Each magnet illustrated herein is described as having magnetic flux rectilinearly magnetized within the magnet from one or more south pole surfaces to one or more north pole surfaces prior to disposal of the magnet within a loop pole piece. Such rectilinear magnetization of the magnetic flux facilitates a linear sensing of a rotational position of a control shaft, and is illustrated solely for the purposes of describing the best mode of the present invention and is not meant to be limiting in any way. In addition, for each illustrated magnet herein, the present invention contemplates that the north pole surface(s) and the south pole surface(s) of an illustrated magnet can be interchanged.

For purposes of the present invention, a magnetic flux sensitive transducer is broadly defined as an article of manufacture or a combination of articles operable to sense a magnetic flux density of any magnetic flux passing through the magnetic flux sensitive transducer, i.e. a Hall element, a magneto-resistive element, a coil, etc. Consequently, any preferential reference to a particular magnetic flux sensitive transducer as illustrated herein is given solely for purposes of describing the best mode of the present invention and is not meant to be limiting in any way.

For each embodiment of a magnetic rotational position sensor in accordance with the present invention, each magnet is disposed within an air gap area of a loop pole piece to enclose the magnetic flux from the magnet within the loop pole piece to thereby establish a magnetic field throughout the air gap area. Each magnet has a pole surface spatially facing either an inner surface of the loop pole piece, a pole surface of another magnet, or a surface of an auxiliary pole piece disposed within the air gap area of the loop pole piece to define a working air gap area of the air gap area as subsequently described herein. The loop pole piece and the magnet(s) are adjoined to a control shaft to synchronously rotate about a second rotational axis as the control shaft is rotated about the first rotational axis over the definable range of rotation as subsequently described herein, and as a result, each degree of rotation of the control shaft about the first rotational axis exclusively corresponds to a distinct degree of synchronized rotation of the established magnetic field about the second rotational axis over the definable range of rotation. For purposes of the present invention, an adjoining of the loop pole piece and the magnet(s) to the control shaft is broadly defined as a unitary fabrication, a permanent affixation, a detachable coupling, an engagement, and/or a contiguous disposal of the loop pole piece and the magnet(s) to the control shaft by any manufacturing method. The present invention contemplates that the first rotational axis and the second rotational axis may or may not coincide. Consequently, any preferential reference to a type of adjoining of a loop pole piece and magnet or magnets to a control shaft as illustrated herein, and any preferential reference herein to an illustrated spatial positioning of the second rotational axis relative to the first rotational axis as illustrated herein are given solely for purposes of the describing the best mode of the present invention and are not meant to be limiting in any way.

Also, for each embodiment of a magnetic rotational position sensor in accordance with the present invention, each working air gap area is arcuately configured as subsequently described herein, and as a result, a magnetic flux sensitive transducer disposed within the arcuately configured working air gap area is operable to sense a different magnitude of magnetic flux density for each degree of synchronized rotation of the magnetic field(s) over the definable range of rotation. The present invention contemplates that a working air gap area may or may not have a circular arcuate configuration, and may or may not have a symmetrical arcuate configuration. The present invention further contemplates that a working air gap area having a circular arcuate configuration may or may not concentrically align with either the first rotational axis and/or the second rotational axis. Consequently, any reference to a particular arcuate configuration of an illustrated working air gap area herein, and any reference to a particular alignment of a working air gap area relative to the first rotational axis and to the second rotational axis as illustrated herein are given solely for purposes of the describing the best mode of the present invention and are not meant to be limiting in any way.

Preferred embodiments of the present invention as well as modified and alternative embodiments of the present invention will now be described herein.

Referring to FIGS. 1A-1C, a magnetic rotational position sensor 10 is shown. Magnetic rotational position sensor 10 comprises a loop pole piece 11, a magnet 17, and a magnetic flux sensitive transducer in the preferable form of a Hall effect device 18.

Loop pole piece 11 includes a circular arcuate pole piece 12, and a pole piece 13 having a rectangular prismatical pole segment 14, a circular arcuate pole segment 15, and a rectangular prismatical pole segment 16. Pole piece 12 and pole piece 13 are serially adjoined in a closed configuration to define an air gap area 11a. Preferably, pole piece 12 and pole piece 13 are unitarily fabricated from a ferromagnetic steel, e.g. a low carbon steel. Pole piece 12 and pole segment 15 concentrically align with a rotational axis RA as best shown in FIG. 1C, and concave inner surface 12a of pole piece 12 and a convex inner surface 15a of pole segment 15 are swept out by an outer end of a radius having its opposite end located on rotational axis RA and that extends circumferentially over approximately 190 degrees to facilitate a rotation of loop pole piece 11 about rotational axis RA over a definable range of rotation upward to 180 degrees. A concave outer surface 15b of pole segment 15 facilitates an adjoining of loop pole piece 11 to an outer surface of a cylindrical control shaft 1 as exemplary shown in FIGS. 2A and 2B.

Still referring to FIGS. 1A-1C, magnet 17 is a permanent magnet having a convex north pole surface 17a, a concave south pole surface 17b, a planar south pole surface 17c, and a planar south pole surface 17d to generate magnetic flux (not shown). Prior to an assembly of magnetic rotational position sensor 10, the magnetic flux within magnet 17 is rectilinearly magnetized from south pole surfaces 17b-17d to pole surface 17a as exemplary shown by the arrows in FIGS. 1A and 1B. Magnet 17 is disposed within air gap area 11a of loop pole piece 11 with pole surface 17a facing inner surface 12a of pole piece 12, pole surface 17b adjacently facing inner surface 15a of arcuate pole segment 15, pole surface 17c adjacently facing a planar inner surface 14a of pole segment 14, and pole surface 17d adjacently facing a planar inner pole surface 16a of pole segment 16 to enclose the magnetic flux from magnet 17 within loop pole piece 11, and as a result, a magnetic field is established throughout air gap area 11a as exemplary shown in FIGS. 3A-3C. Pole surface 17a of magnet 17 spatially faces inner surface 12a of pole piece 12 to define a working air gap area 11b having a circular arcuate configuration therebetween. Alternatively, the present invention contemplates that pole surface 17b can spatially face inner surface 15a of pole segment 15, pole surface 17c can spatially face a planar inner surface 14a of pole segment 14, and/or pole surface 17d can spatially face a planar inner surface 16a of pole segment 16.

Still referring to FIGS. 1A-1C, Hall effect device 18 is disposed within working air gap area 11b. It is to be appreciated that Hall effect device 18 is operable to sense a magnetic flux density of any magnetic flux passing through Hall effect device 18 via a planar side surface 18a and a planar side surface 18b of Hall effect device 18. Hall effect device 18 is further operable to generate a voltage sensing signal as a function of the magnetic flux density of any magnetic flux passing through side surface 18a and/or a voltage sensing signal as a function of the magnetic flux density of any magnetic flux passing through side surface 18b.

Referring to FIGS. 2A and 2B, an exemplary adjoining of magnetic rotational position sensor 10 to a cylindrical control shaft 1 is shown. Magnetic rotational position sensor 10 is assembled as previously described in connection with FIGS. 1A-1C and accompanying text within a container 2, and a lid 3 is adjoined to container 2 to house pole piece 11 and magnet 17 within container 2. Lid 3 has a slot 3a to enable the leads of Hall effect device 18 to extend out of lid 3. Container 2 and lid 3 are adjoined to an outer surface 1a of cylindrical control shaft 1 to adjoin loop pole piece 11 and magnet 17 to cylindrical control shaft 1 and to coincide rotational axis RA (FIG. 1C) with a longitudinal axis LA of cylindrical control shaft 1. It is to be appreciated that loop pole piece 11 and magnet 17 will synchronously rotate about coinciding rotational axes LA/RA as cylindrical control shaft 1 is rotated about coinciding rotational axes LA/RA, and as a result, each degree of rotation of cylindrical control shaft 1 about coinciding rotational axes LA/RA exclusively corresponds to a distinct degree of synchronized rotation of the magnetic field (not shown) established throughout air gap area 11a (FIGS. 1A and 1B) about coinciding rotational axes LA/RA over a definable range of rotation upward to 180 degrees.

Referring to FIGS. 3A-3C, diagrammatic illustrations of loop pole piece 11, magnet 17, and a magnetic field synchronously rotating with cylindrical control shaft 1 (being non-magnetic and non-magnetizable) about coinciding rotational axes LA/RA over a definable range of rotation upward to 180 degrees is shown. To sense each degree of rotation of cylindrical control shaft 1 about coinciding rotational axes LA/RA over a definable range of rotation upward to 180 degrees, it is to be appreciated that the magnetic flux density of any magnetic flux passing through Hall effect device 18 via side surface 18a (FIG. 1A) and side surface 18b (FIG. 1B) must be different for each degree of synchronized rotation of the magnetic field about coinciding rotational axes LA/RA. As previously described herein, the magnetic flux within magnet 17 is rectilinearly magnetized from south pole surfaces 17b-17d (FIG. 1B) to north pole surface 17a (FIG. 1A) prior to the assembly of magnetic rotational position sensor 10. Upon the disposal of magnet 17 within loop pole piece 11, the arcuate configuration of working air gap area 11b realigns the magnetization of the magnetic flux within magnet 17 as exemplary

17 shown in FIGS. 3A-3C to facilitate a sensing of a different magnitude of magnetic flux density by Hall effect device 18 for each degree of synchronized rotation of the magnetic field about coinciding rotational axes LA/RA as evidenced by the positioning of Hall effect device 18 throughout working air gap area 11b along an arc path AP1 radially 5    extending from coinciding rotational axes LA/RA. The arcuate configuration of working air gap area 11b is circular to facilitate a symmetrical balancing of the magnetic flux of the magnetic field throughout working air gap area 11b as shown in FIGS. 3A-3C. Side surface 18a and side surface 18b of Hall effect device 18 are perpendicular to concave inner surface 12a (FIGS. 1A and 1B) of pole piece 12 and to north pole surface 17a (FIG.

10    1A) of magnet 17 as loop pole piece 11 and magnet 17 are synchronously rotated about coinciding rotational axes LA/RA to facilitate a uniform differential of the magnetic flux passing through Hall effect device 18 for each degree of synchronized rotation of control shaft 1 and the magnetic field about coinciding rotational axes LA/RA over a definable range of rotation upward to 180 degrees. Thus, it is to be appreciated that Hall effect 15    device 18 is operable to sense a different magnitude of magnetic flux density for each degree of synchronized rotation of control shaft 1 and the magnetic field about coinciding rotational axes LA/RA over a definable range of rotation upward to 180 degrees. It is to be further appreciated that, for each degree of synchronized rotation of control shaft 1 and the magnetic field about coinciding rotational axes LA/RA over a definable range of 20    rotation upward to 180 degrees, Hall effect device 18 is operable to generate a voltage sensing signal $V_{SS1}$ as a function of the magnetic flux density of the magnetic flux passing through side surface 18a as shown in FIG. 3D and/or a voltage sensing signal $V_{SS2}$ as a function of the magnetic flux density of the magnetic flux passing through side surface 18b as shown in FIG. 3D.

Referring to FIGS. 4A-4C, a magnetic rotational position sensor 10' is shown. Magnetic rotational position sensor 10' comprises a loop pole piece 11' and a magnet 17'. Loop pole piece 11' includes a circular arcuate pole piece 12', and a pole piece 13' having rectangular prismatical pole segment 14, a circular arcuate pole segment 15', and rectangular prismatical pole segment 16. Pole piece 12' and pole piece 13' are serially adjoined in a closed configuration to define an air gap area 11a'. Preferably, pole piece 12' and pole piece 13' are unitarily fabricated from a ferromagnetic steel, e.g. a low carbon steel. Pole piece 12' and pole segment 15' concentrically align with rotational axis RA, and inner surface 12a' of pole piece 12' and an inner surface 15a' of pole segment 15' are swept out by the outer end of a radius having its opposite end located on rotational axis RA and that extends circumferentially over approximately 100 degrees to facilitate a rotation of loop pole piece 11' about rotational axis RA over a definable range of rotation upward to ninety (90) degrees. A concave outer surface 15b' of pole segment 15' facilitates an adjoining of loop pole piece 11' to an outer surface of a cylindrical control (not shown).

Still referring to FIGS. 4A-4C, magnet 17' is a permanent magnet having a convex north pole surface 17a', a concave south pole surface 17b', a planar south pole surface 17c, and a planar south pole surface 17d to generate magnetic flux (not shown). Prior to an assembly of magnetic rotational position sensor 10', the magnetic flux within magnet 17' is rectilinearly magnetized from south pole surfaces 17b'-17d to north pole surface 17a' as exemplary shown by the arrows in FIGS. 4A and 4B. Magnet 17' is disposed within air gap area 11a' with north pole surface 17a' facing inner surface 12a' of pole piece 12', south pole surface 17b' adjacently facing inner surface 15a' of arcuate segment 15', south pole surface 17c adjacently facing a planar inner surface 14a of pole segment 14, and south pole surface 17d adjacently facing a planar inner surface 16a of
5   pole segment 16 to enclose the magnetic flux from magnet 17' within loop pole piece 11', and as a result, a magnetic field is established throughout air gap area 11a'. Convex north pole surface 17a' of magnet 17' spatially faces concave inner surface 12a' of pole piece 12' to define a working air gap area 11b' having a circular arcuate configuration therebetween. Alternatively, the present invention contemplates that concave south pole
10  surface 17b' can spatially face convex inner surface 15a' of circular arcuate pole segment 15', planar south pole surface 17c can spatially face a planar inner surface 14a of pole segment 14, and/or planar south pole surface 17d can spatially face a planar surface 16a of pole segment 16.

Still referring to FIGS. 4A-4C, magnetic rotational position sensor 10' further
15  comprises Hall effect device 18 as previously described in connection with FIGS. 1A-1C and accompanying text. Hall effect device 18 is disposed within working air gap area 11b'. It is to be appreciated that Hall effect device 18 is operable to sense a different magnitude of magnetic flux density for each degree of synchronized rotation of the magnetic field about rotational axis RA over a definable range of rotation upward to
20  ninety (90) degrees. It is to be further appreciated that, for each degree of synchronized rotation of the magnetic field about rotational axis RA of a definable range of rotation upward to ninety (90) degrees, Hall effect device 18 is operable to generate a voltage sensing signal as a function of the magnetic flux density of the magnetic flux passing through planar side surface 18a, and/or a voltage sensing signal as a function of the magnetic flux density of the magnetic flux passing through planar side surface 18b.

Referring to FIGS. 5A-5C, a magnetic rotational position sensor 10" is shown. Magnetic rotational position sensor 10" comprises a loop pole piece 11", and a magnet 17". Loop pole piece 11" includes a circular arcuate pole piece 12", and a pole piece 13" having a rectangular prismatical pole segment 14, a circular arcuate pole segment 15", and rectangular prismatical pole segment 16. Circular arcuate pole piece 12" and pole piece 13" are serially adjoined in a closed configuration to define an air gap area 11a". Preferably, circular arcuate pole piece 12" and pole piece 13" are unitarily fabricated from a ferromagnetic steel, e.g. a low carbon steel. Circular arcuate pole piece 12" and circular arcuate pole segment 15" concentrically align with rotational axis RA, and concave inner surface 12a" of pole piece 12" and a convex inner surface 15a" of circular arcuate pole segment 15" are swept out by the outer end of a radius having its opposite end located on rotational axis RA and that extends circumferentially over approximately 280 degrees to facilitate a rotation of loop pole piece 11" about rotational axis RA over a definable range of rotation upward to 270 degrees. A concave outer surface 15b" of circular arcuate pole segment 15" facilitates an adjoining of loop pole piece 11" to an outer surface of a cylindrical control shaft (not shown).

Still referring to FIGS. 5A-5C, magnet 17" is a permanent magnet having a convex north pole surface 17a", a concave south pole surface 17b", a planar south pole surface 17c, and a planar south pole surface 17d to generate magnetic flux (not shown). Prior to an assembly of magnetic rotational position sensor 10", the magnetic flux within magnet 17" is rectilinearly magnetized from south pole surfaces 17b"-17d to convex north pole surface 17a" as exemplary shown by the arrows in FIGS. 5A and 5B. Magnet 17" is disposed within air gap area 11a" with convex north pole surface 17a" facing concave inner surface 12a" of pole piece 12", concave south pole surface 17b" adjacently facing convex inner surface 15a" of circular arcuate segment 15", planar south pole surface 17c adjacently facing a planar inner surface 14a of pole segment 14, and planar south pole surface 17d adjacently facing a planar inner surface 16a of pole segment 16 to enclose the magnetic flux from magnet 17" within loop pole piece 11", and as a result, a magnetic field is established throughout air gap area 11a". Convex north pole surface 17a" of magnet 17" spatially faces concave inner surface 12a" of pole piece 12" to define a working air gap area 11b" having a circular arcuate configuration therebetween. Alternatively, the present invention contemplates that concave south pole surface 17b' can spatially face convex inner surface 15a" of circular arcuate pole segment 15", planar south pole surface 17c can spatially face a planar inner surface 14a of pole segment 14, and/or planar south pole surface 17d can spatially face a planar inner surface 16a of pole segment 16.

Still referring to FIGS. 5A-5C, magnetic rotational position sensor 10" further comprises Hall effect device 18 as previously described in connection with FIGS. 1A-1C and accompanying text. Hall effect device 18 is disposed within working air gap area 11b". It is to be appreciated that Hall effect device 18 is operable to sense a different magnitude of magnetic flux density for each degree of synchronized rotation of the magnetic field about rotational axis RA over a definable range of rotation upward to 270 degrees. It is to be further appreciated that, for each degree of synchronized rotation of the magnetic field about rotational axis RA of a definable range of rotation upward to 270 degrees, Hall effect device 18 is operable to generate a voltage sensing signal as a function of the magnetic flux density of the magnetic flux passing through planar side surface 18a, and/or a voltage sensing signal as a function of the magnetic flux density of the magnetic flux passing through planar side surface 18b.

Referring to FIGS. 6A-6C, a magnetic rotational position sensor 110 is shown. Magnetic rotational position sensor 110 comprises loop pole piece 11 as previously described herein in connection with FIGS. 1A-1C and accompanying text. Magnetic rotational position sensor 110 further comprises a magnet 117. Magnet 117 is a permanent magnet having a convex north pole surface 117a, a concave south pole surface 117b, a planar south pole surface 117c, and a planar south pole surface 117d to generate magnetic flux (not shown). Prior to an assembly of magnetic rotational position sensor 110, the magnetic flux within magnet 117 is rectilinearly magnetized from south pole surfaces 117b-117d to convex north pole surface 117a as exemplary shown by the arrows in FIGS. 6A and 6B. Magnet 117 is disposed within air gap area 11a with convex north pole surface 117a adjacently facing concave inner surface 12a of pole piece 12, concave south pole surface 117b facing convex inner surface 15a of circular arcuate segment 15, planar south pole surface 117c adjacently facing a planar inner surface 14a of pole segment 14, and planar south pole surface 117d adjacently facing a planar inner surface 16a of pole segment 16 to enclose the magnetic flux from magnet 117 within loop pole piece 11, and as a result, a magnetic field is established throughout air gap area 11a. Concave south pole surface 117b spatially faces convex inner surface 15a of circular arcuate segment 15 to define a working air gap area 11c having a circular arcuate configuration therebetween. Alternatively, the present invention contemplates that convex north pole surface 117a can spatially face concave inner surface 12a of pole piece 12, planar south pole surface 117c can spatially face a planar inner surface 14a of pole segment 14, and/or planar south pole surface 117d can spatially face a planar inner surface 16a of pole segment 16.

Still referring to FIGS. 6A-6C, magnetic rotational position sensor 110 further comprises Hall effect device 18 as previously described herein in connection with FIGS. 1A-1C and accompanying text. Hall effect device 18 is disposed within working air gap area 11c. It is to be appreciated that Hall effect device 18 is operable to sense a different magnitude of magnetic flux density for each degree of synchronized rotation of the magnetic field about rotational axis RA over a definable range of rotation upward to 180 degrees. It is to be further appreciated that, for each degree of synchronized rotation of the magnetic field about rotational axis RA of a definable range of rotation upward to 180 degrees, Hall effect device 18 is operable to generate a voltage sensing signal as a function of the magnetic flux density of the magnetic flux passing through planar side surface 18a, and/or a voltage sensing signal as a function of the magnetic flux density of the magnetic flux passing through planar side surface 18b.

Referring to FIGS. 7A-7C, a magnetic rotational position sensor 210 is shown. Magnetic rotational position sensor 210 comprises loop pole piece 11 and magnet 17 as previously described herein in connection with FIGS. 1A-1C and accompanying text. Magnetic rotational position sensor 210 further comprises magnet 117 as previously described herein in connection with FIGS. 6A-6C and accompanying text. Magnet 17 and magnet 117 are disposed within air gap area 11a with convex north pole surface 17a facing concave south pole surface 117b, concave south pole surface 17b adjacently facing convex inner surface 15a of circular arcuate segment 15, planar south pole surface 17c adjacently facing a planar inner surface 14a of pole segment 14, planar south pole surface 17d adjacently facing a planar inner surface 16a of pole segment 16, convex north pole surface 117a adjacently facing concave inner surface 12a of pole piece 12, planar south pole surface 117c adjacently facing a planar inner surface 14a of pole segment 14, and planar south pole surface 117d adjacently facing a planar inner surface 16a of pole segment 16 to enclose the magnetic flux from magnet 17 and the magnetic flux from magnet 117 within loop pole piece 11, and as a result, a magnetic field is established throughout air gap area 11a. Convex north pole surface 17a spatialy faces concave south pole surface 117b to define a working air gap area 11d having a circular arcuate configuration therebetween. Alternatively, the present invention contemplates that concave south pole surface 17b can spatially face convex inner surface 15a of circular arcuate pole segment 15, planar south pole surface 17c can spatially face a planar inner surface 14a of pole segment 14, planar south pole surface 17d can spatially face a planar inner surface 16a of pole segment 16, convex north pole surface 117a can spatially face concave inner surface 12a of pole piece 12, planar south pole surface 117c can spatially face a planar inner surface 14a of pole segment 14, and/or planar south pole surface 117d can spatially face a planar inner surface 16a of pole segment 16.

Still referring to FIGS. 7A-7C, magnetic rotational position sensor 210 further comprises Hall effect device 18 as previously described in connection with FIGS. 1A-1C and accompanying text. Hall effect device 18 is disposed within working air gap area 11d. It is to be appreciated that Hall effect device 18 is operable to sense a different magnitude of magnetic flux density for each degree of synchronized rotation of the magnetic field about rotational axis over a definable range of rotation upward to 180 degrees. It is to be further appreciated that, for each degree of synchronized rotation of the magnetic field about rotational axis RA of a definable range of rotation upward to 180 degrees, Hall effect device 18 is operable to generate a voltage sensing signal as a
function of the magnetic flux density of the magnetic flux passing through planar side surface 18a, and/or a voltage sensing signal as a function of the magnetic flux density of the magnetic flux passing through planar side surface 18b.

Referring to FIGS. 8A-8C, a magnetic rotational position sensor 310 is shown. Magnetic rotational position sensor 310 comprises loop pole piece 11 as previously described herein in connection with FIGS. 1A-1C and accompanying text. Magnetic rotational position sensor 310 further comprises a magnet 217. Magnet 217 is a permanent magnet having a convex north pole surface 217a, a concave south pole surface 217b, a planar south pole surface 217c, and a planar south pole surface 217d to generate magnetic flux (not shown). Prior to an assembly of magnetic rotational position sensor 310, the magnetic flux within magnet 217 is rectilinearly magnetized from south pole surfaces 217b-217d to convex north pole surface 217a as exemplary shown by the arrows in FIGS. 8A and 8B. Magnet 217 is disposed within air gap area 11a with convex north pole surface 217a facing concave inner surface 12a of pole piece 12, concave south pole surface 217b facing convex inner surface 15a of circular arcuate segment 15, planar south pole surface 117c adjacently facing a planar inner surface 14a of pole segment 14, and planar south pole surface 117d adjacently facing a planar inner surface 16a of pole segment 16 to enclose the magnetic flux from magnet 217 within loop pole piece 11, and as a result, a magnetic field is established throughout air gap area 11a. Convex north pole surface 217a spatially faces concave inner surface 12a of pole piece 12 to define a working air gap area 11e having a circular arcuate configuration therebetween, and concave south pole surface 217b spatially faces convex inner surface 15a of circular arcuate segment 15 to define a working air gap area 11f having a circular arcuate configuration therebetween. Alternatively, the present invention contemplates that planar south pole surface 217c can spatially face a planar inner surface 14a of pole segment 14, and/or planar south pole surface 217d can spatially face a planar inner surface 16a of pole segment 16.

Still referring to FIGS. 8A-8C, magnetic rotational position sensor 310 further comprises Hall effect device 18 as previously described herein in connection with FIGS. 1A-1C and accompanying text, and a Hall effect device 118 being identical to Hall effect device 18. Hall effect device 18 is disposed within working air gap area 11e, and Hall effect device 118 is disposed within working air gap area 11f. It is to be appreciated that Hall effect device 18 and Hall effect device 118 are operable to sense a different magnitude of magnetic flux density, respectively, for each degree of synchronized rotation of the magnetic field about rotational axis RA over a definable range of rotation upward to 180 degrees. It is to be further appreciated that, for each degree of synchronized rotation of the magnetic field about rotational axis RA of a definable range of rotation upward to 180 degrees, Hall effect device 18 and Hall effect device 118 are operable to generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 9A-9C, a magnetic rotational position sensor 410 is shown. Magnetic rotational position sensor 410 comprises a loop pole piece 111. Loop pole piece 111 includes circular arcuate pole piece 12, and a pole piece 113 having a rectangular prismatical pole segment 14, a semi-circular segment 115, and a rectangular prismatical pole segment 16. Circular arcuate pole piece 12 and pole piece 113 are serially adjoined in a closed configuration to define an air gap area 111a. Preferably, circular arcuate pole piece 12 and pole piece 113 are unitarily fabricated from a ferromagnetic steel, e.g. a low carbon steel. Circular arcuate pole piece 12 and semi-circular segment 115 concentrically align with rotational axis RA, and concave inner surface 12a of pole piece 12 and a convex inner surface 115a of semi-circular segment 115 are swept out by the outer end of a radius having its opposite end located on rotational axis RA and that extends circumferentially over approximately 190 degrees to facilitate a rotation of loop pole piece 111 about rotational axis RA over a definable range of rotation upward to 180 degrees.

Still referring to FIGS. 9A-9C, magnetic rotational position sensor 410 further comprises magnet 17 and Hall effect device 18 as previously described herein in connection with FIGS. 1A-1C and accompanying text. Magnet 17 is disposed within air gap area 111a with convex north pole surface 17a facing concave inner surface 12a of pole piece 12, concave south pole surface 17b adjacently facing convex inner surface 115a of semi-circular segment 115, planar south pole surface 17c adjacently facing a planar inner surface 14a of pole segment 14, and planar south pole surface 17d adjacently facing a planar inner surface 16a of pole segment 16 to enclose the magnetic flux from magnet 17 within loop pole piece 111, and as a result, a magnetic field is established throughout air gap area 111a. Convex north pole surface 17a of magnet 17 spatially faces concave inner surface 12a of pole piece 12 to define a working air gap area 111b having a circular arcuate configuration therebetween. Alternatively, the present invention contemplates that concave south pole surface 17b can spatially face convex inner surface 115a of semi-circular segment 115, planar south pole surface 17c can spatially face a planar inner surface 14a of pole segment 14, and/or planar south pole surface 17d can spatially face a planar inner surface 16a of pole segment 16.

Still referring to FIGS. 9A-9C, Hall effect device 18 is disposed within working air gap area 111b. It is to be appreciated that Hall effect device 18 is operable to sense a different magnitude of magnetic flux density for each degree of synchronized rotation of the magnetic field about rotational axis RA over a definable range of rotation upward to 180 degrees. It is to be further appreciated that, for each degree of synchronized rotation of the magnetic field about rotational axis RA of a definable range of rotation upward to 180 degrees, Hall effect device 18 is operable to generate a voltage sensing signal as a function of the magnetic flux density of the magnetic flux passing through planar side surface 18a, and/or a voltage sensing signal as a function of the magnetic flux density of the magnetic flux passing through planar side surface 18b.

Referring to FIGS. 10A-10C, a magnetic rotational position sensor 510 is shown. Magnetic rotational position sensor 510 comprises a loop pole piece 211, a magnet 317, and a magnet 417. Magnetic rotational position sensor 510 further comprises Hall effect device 18 as previously described in connection with FIGS. 1A and 1B, and a Hall effect device 118 as previously described in connection with FIGS. 8A and 8B. Loop pole piece 211 includes a circular arcuate pole piece 112, and a pole piece 213 having a rectangular prismatical pole segment 114, a circular arcuate pole segment 115, and a rectangular prismatical pole segment 116. Circular arcuate pole piece 112 and pole piece 213 are serially adjoined in a closed configuration to define an air gap area 211a. Preferably, circular arcuate pole piece 112 and pole piece 213 are unitarily fabricated from a ferromagnetic steel, e.g. a low carbon steel. Loop pole piece 211 further includes a circular arcuate segment 212 and a circular arcuate pole segment 215. Circular arcuate pole segment 212 is adjoined to a rectangular prismatical pole segment 114 and to rectangular prismatical pole segment 116, and circular arcuate pole segment 215 is adjoined to circular arcuate pole segment 115 to define an air gap area 211b. Circular arcuate pole piece 112, circular arcuate pole segment 115, circular arcuate pole segment 212, and circular arcuate pole segment 215 concentrically align with rotational axis RA as best shown in FIG. 10C, and concave inner surface 112a of pole piece 112, a convex inner surface 115a of circular arcuate pole segment 115, a concave inner surface 212a of circular arcuate pole segment 212, and a convex inner surface 215a of circular arcuate pole segment 215 are swept out by the outer end of a radius having its opposite end located on rotational axis RA over approximately 175 degrees to facilitate a rotation of loop pole piece 211 about rotational axis RA over a definable range of rotation upward to 170 degrees. A concave inner surface 115b of circular arcuate pole segment 115 and a concave inner surface 215b of circular arcuate pole segment 215 facilitates an adjoining of loop pole piece 211 to a cylindrical control shaft (not shown).

Still referring to FIGS. 10A-10C, magnet 317 is a permanent magnet having a convex north pole surface 317a, a concave south pole surface 317b, a planar south pole surface 317c, and a planar south pole surface 317d to generate magnetic flux (not shown). Prior to an assembly of magnetic rotational position sensor 510, the magnetic flux within magnet 317 is rectilinearly magnetized from south pole surfaces 317b-317d to convex north pole surface 317a as exemplary shown by the arrows in FIGS. 10A and 10B. Magnet 317 is disposed within air gap area 211a of loop pole piece 211 with convex north pole surface 317a facing concave inner surface 112a of pole piece 112, concave south pole surface 317b adjacently facing convex inner surface 115a of circular arcuate segment 115, planar south pole surface 317c adjacently facing a planar inner surface 114a of pole segment 114, and planar south pole surface 317d adjacently facing a planar inner surface 116a of pole segment 116 to enclose the magnetic flux from magnet 317 within loop pole piece 211, and as a result, a magnetic field is established throughout air gap area 211a. Convex north pole surface 317a of magnet 317 spatially faces concave inner surface 112a of pole piece 112 to define a working air gap area 211c having a circular arcuate configuration therebetween. Alternatively, the present invention contemplates that concave south pole surface 317b can spatially face convex inner surface 115a of circular arcuate pole segment 115, planar south pole surface 317c can spatially face a planar inner surface 114a of pole segment 114, and/or planar south pole surface 317d can spatially face a planar inner surface 116a of pole segment 116.

Still referring to FIGS. 10A-10C, magnet 417 is a permanent magnet having a convex north pole surface 417a, a concave south pole surface 417b, a planar south pole surface 417c, and a planar south pole surface 417d to generate magnetic flux (not shown).

Prior to an assembly of magnetic rotational position sensor 510, the magnetic flux within magnet 417 is rectilinearly magnetized from south pole surfaces 417b-417d to convex north pole surface 417a as exemplary shown by the arrows in FIGS. 10A and 10B. Magnet 417 is disposed within air gap area 211b of loop pole piece 211 with convex north pole surface 417a facing concave inner surface 212a of pole piece 212, concave south pole surface 417b adjacently facing convex inner surface 215a of circular arcuate segment 215, planar south pole surface 417c adjacently facing a planar inner surface 114a of pole segment 114, and planar south pole surface 417d adjacently facing a planar inner surface 116a of pole segment 116 to enclose the magnetic flux from magnet 417 within loop pole piece 211, and as a result, a magnetic field is established throughout air gap area 211b. Convex north pole surface 417a of magnet 417 spatially faces concave inner surface 212a of pole piece 212 to define a working air gap area 211d having a circular arcuate configuration therebetween. Alternatively, the present invention contemplates that concave south pole surface 417b can spatially face convex inner surface 215a of circular arcuate pole segment 215, planar south pole surface 417c can spatially face a planar inner surface 114a of pole segment 114, and/or planar south pole surface 417d can spatially face a planar inner surface 116a of pole segment 116.

Still referring to FIGS. 10A-10C, Hall effect device 18 is disposed within working air gap area 211c, and Hall effect device 118 is disposed within working air gap area 211d. It is to be appreciated that Hall effect device 18 and Hall effect device 118 are operable to sense a different magnitude of magnetic flux density, respectively, for each degree of synchronized rotation of the magnetic field about rotational axis RA over a definable range of rotation upward to 170 degrees. It is to be further appreciated that, for each degree of synchronized rotation of the magnetic field about rotational axis RA of a definable range of rotation upward to 170 degrees, Hall effect device 18 and Hall effect device 118 are operable to generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 11A-11C, a magnetic rotational position sensor 610 is shown. Magnetic rotational position sensor 610 comprises loop pole piece 211 and Hall effect device 118 as previously described herein in connection with FIGS. 10A and 10B and accompanying text, and Hall effect device 18 as previously described in connection with FIGS. 1A and 1B. Magnetic rotational position sensor 610 further comprises a magnet 517 and a magnet 617. Magnet 517 is a permanent magnet having a convex north pole surface 517a, a concave south pole surface 517b, a planar south pole surface 517c, and a planar south pole surface 517d to generate magnetic flux (not shown). Prior to an assembly of magnetic rotational position sensor 610, the magnetic flux within magnet 517 is rectilinearly magnetized from south pole surfaces 517b-517d to convex north pole surface 517a as exemplary shown by the arrows in FIGS. 11A and 11B. Magnet 517 is disposed within air gap area 211a with convex north pole surface 517a adjacently facing concave inner surface 112a of pole piece 112, concave south pole surface 517b facing convex inner surface 115a of circular arcuate segment 115, planar south pole surface 517c adjacently facing a planar inner surface 114a of pole segment 114, and planar south pole surface 517d adjacently facing a planar inner surface 116a of pole segment 116 to enclose the magnetic flux from magnet 517 within loop pole piece 211, and as a result, a magnetic field is established throughout air gap area 211a. Concave south pole surface 517b spatially faces convex inner surface 115a of circular arcuate segment 115 to define a working air gap area 211e having a circular arcuate configuration therebetween.

Alternatively, the present invention contemplates that convex north pole surface 517a can spatially face concave inner surface 112a of pole piece 112, planar south pole surface 517c can spatially face a planar inner surface 114a of pole segment 114, and/or planar south pole surface 517d can spatially face a planar inner surface 116a of pole segment 116.

Still referring to FIGS. 11A-11C, magnet 617 is a permanent magnet having a convex north pole surface 617a, a concave south pole surface 617b, a planar south pole surface 617c, and a planar south pole surface 617d to generate magnetic flux (not shown). Prior to an assembly of magnetic rotational position sensor 610, the magnetic flux within magnet 617 is rectilinearly magnetized from south pole surfaces 617b-617d to convex north pole surface 617a as exemplary shown by the arrows in FIGS. 11A and 11B. Magnet 617 is disposed within air gap area 211b with convex north pole surface 617a adjacently facing concave inner surface 212a of pole piece 212, concave south pole surface 617b facing convex inner surface 215a of circular arcuate segment 215, planar south pole surface 617c adjacently facing a planar inner surface 114a of pole segment 114, and planar south pole surface 617d adjacently facing a planar inner surface 116a of pole segment 116 to enclose the magnetic flux from magnet 617 within loop pole piece 211, and as a result, a magnetic field is established throughout air gap area 211b. Concave south pole surface 617b spatially faces convex inner surface 215a of circular arcuate segment 215 to define a working air gap area 211f having a circular arcuate configuration therebetween. Alternatively, the present invention contemplates that convex north pole surface 617a can spatially face concave inner surface 212a of pole piece 212, planar south pole surface 617c can spatially face a planar inner surface 114a of pole segment 114, and/or planar south pole surface 617d can spatially face a planar inner surface 116a of pole segment 116.

Still referring to FIGS. 11A-11C, magnetic rotational position sensor 610 further comprises Hall effect device 18 as previously described herein in connection with FIGS. 1A and 1B and accompanying text, and Hall effect device 118 as previously described in connection with FIGS. 10A and 10B and accompanying text. Hall effect device 18 is disposed within working air gap area 211e, and Hall effect device 118 is disposed within working air gap area 211f. It is to be appreciated that Hall effect device 18 and Hall effect device 118 are operable to sense a different magnitude of magnetic flux density, respectively, for each degree of synchronized rotation of the magnetic field about rotational axis RA over a definable range of rotation upward to 170 degrees. It is to be further appreciated that, for each degree of synchronized rotation of the magnetic field about rotational axis RA of a definable range of rotation upward to 170 degrees, Hall effect device 18 and Hall effect device 118 are operable to generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 12A-12C, a magnetic rotational position sensor 710 is shown. Magnetic rotational position sensor 710 comprises loop pole piece 211, magnet 317 and magnet 417 as previously described herein in connection with FIGS. 10A and 10B and accompanying text. Magnetic rotational position sensor 710 further comprises magnet 517 and magnet 617 as previously described herein in connection with FIGS. 11A and 11B and accompanying text. Magnet 317 and magnet 517 are disposed within air gap area 211a with convex north pole surface 317a facing concave south pole surface 517b, concave south pole surface 317b adjacently facing convex inner surface 115a of circular arcuate segment 115, planar south pole surface 317c adjacently facing a planar inner surface 114a of pole segment 114, planar south pole surface 317d adjacently facing a planar inner surface 116a of pole segment 116, convex north pole surface 517a adjacently facing concave inner surface 112a of pole piece 112, planar south pole surface 517c adjacently facing a planar inner surface 114a of pole segment 114, and planar south pole surface 517d adjacently facing a planar inner surface 116a of pole segment 116 to enclose the magnetic flux from magnet 317 and the magnetic flux from magnet 517 within loop pole piece 211, and as a result, a magnetic field is established throughout air gap area 211a. Convex north pole surface 317a spatially faces concave south pole surface 517b to define a working air gap area 211g having a circular arcuate configuration therebetween. Alternatively, the present invention contemplates that concave south pole surface 317b can spatially face convex inner surface 115a of circular arcuate pole segment 115, planar south pole surface 317c can spatially face a planar inner surface 114a of pole segment 114, planar south pole surface 317d can spatially face a planar inner surface 116a of pole segment 116, convex north pole surface 517a can spatially face concave inner surface 112a of pole piece 112, planar south pole surface 517c can spatially face a planar inner surface 114a of pole segment 114, and/or planar south pole surface 517d can spatially face a planar inner surface 116a of pole segment 116.

Still referring to FIGS. 12A-12C, magnet 417 and magnet 617 are disposed within air gap area 211b with convex north pole surface 417a facing concave south pole surface 617b, concave south pole surface 417b adjacently facing convex inner surface 215a of circular arcuate segment 215, planar south pole surface 417c adjacently facing a planar inner surface 114b of pole segment 114, planar south pole surface 417d adjacently facing a planar inner surface 116b of pole segment 116, convex north pole surface 617a adjacently facing concave inner surface 212a of pole piece 212, planar south pole surface 617c adjacently facing a planar inner surface 114b of pole segment 114, and planar south pole surface 617d adjacently facing a planar inner surface 116b of pole segment 116 to enclose the magnetic flux from magnet 417 and the magnetic flux from magnet 617 within loop pole piece 211, and as a result, a magnetic field is established throughout air gap area 211b. Convex north pole surface 517a spatially faces concave south pole surface 617b to define a working air gap area 211h having a circular arcuate configuration therebetween. Alternatively, the present invention contemplates that concave south pole surface 417b can spatially face convex inner surface 215a of circular arcuate pole segment 115, planar south pole surface 417c can spatially face a planar inner surface 114b of pole segment 114, planar south pole surface 417d can spatially face a planar inner surface 116b of pole segment 116, convex north pole surface 617a can spatially face concave inner surface 212a of pole piece 212, planar south pole surface 617c can spatially face a planar inner surface 114b of pole segment 114, and/or planar south pole surface 617d can spatially face a planar inner surface 116b of pole segment 116. In addition, the present invention contemplates that magnet 417 and magnet 617 can be magnetized in opposing directions to establish two magnetic fields throughout air gap area 211b.

Still referring to FIGS. 12A-12C, magnetic rotational position sensor 710 further comprises Hall effect device 18 as previously described herein in connection with FIGS. 1A and 1B and accompanying text, and Hall effect device 118 as previously described in connection with FIGS. 10A and 10B and accompanying text. Hall effect device 18 is disposed within working air gap area 211g and Hall effect device 118 is disposed within working air gap area 211h. It is to be appreciated that Hall effect device 18 and Hall effect device 118 are operable to sense a different magnitude of magnetic flux density, respectively, for each degree of synchronized rotation of the magnetic field about rotational axis RA over a definable range of rotation upward to 170 degrees. It is to be further appreciated that, for each degree of synchronized rotation of the magnetic fields about rotational axis RA of a definable range of rotation upward to 170 degrees, Hall effect device 18 and Hall effect device 118 are operable to generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 13A-13C, a magnetic rotational position sensor 810 is shown. Magnetic rotational position sensor 810 comprises a loop pole piece 311. Loop pole piece 311 includes circular arcuate pole piece 112, and a pole piece 313 having rectangular prismatical pole segment 114, a circular conical segment 315, and rectangular prismatical pole segment 116. Circular arcuate pole piece 112 and pole piece 313 are serially adjoined in a closed configuration to define an air gap area 311a. Preferably, circular arcuate pole piece 112 and pole piece 313 are unitarily fabricated from a ferromagnetic steel, e.g. a low carbon steel. Loop pole piece 311 further includes a circular arcuate pole piece 212 adjoined to rectangular prismatical pole segment 114 and to rectangular prismatical pole segment 116 to define an air gap area 311b. Circular arcuate pole piece 112, circular conical segment 315, and circular arcuate pole piece 212 concentrically align with rotational axis RA, and concave inner surface 112a of pole piece 112, a convex inner surface 315a of circular conical segment 315, a convex inner surface 315b of circular conical segment 315, and a concave inner surface 212a of pole piece 212 are swept out by the outer end of a radius having its opposite end located on rotational axis RA and that extends circumferentially over approximately 175 degrees to facilitate a rotation of loop pole piece 311 about rotational axis RA over a definable range of rotation upward to 170 degrees.

Still referring to FIGS. 13A-13C, magnetic rotational position sensor 810 further comprises magnet 317, and magnet 417 as previously described herein in connection with FIGS. 10A-10C and accompanying text. Magnet 317 is disposed within air gap area 311a with convex north pole surface 317a facing concave inner surface 112a of pole piece 112, concave south pole surface 317b adjacently facing convex inner surface 315a of circular conical segment 315, planar south pole surface 317c adjacently facing a planar inner surface 114a of pole segment 114, and planar south pole surface 317d adjacently facing a planar inner surface 116a of pole segment 116 to enclose the magnetic flux from magnet 317 within loop pole piece 311, and as a result, a magnetic field is established throughout air gap area 311a. Convex north pole surface 317a of magnet 317 faces concave inner surface 112a of pole piece 112 to define a working air gap area 311c having a circular arcuate configuration therebetween. Alternatively, the present invention contemplates that concave south pole surface 317b can spatially face convex inner surface 315a of circular conical segment 315, planar south pole surface 317c can spatially face a planar inner surface 114a of pole segment 114, and/or planar south pole surface 317d can spatially face a planar inner surface 116a of pole segment 116.

Still referring to FIGS. 13A-13C, magnet 417 is disposed within air gap area 311b with convex north pole surface 417a facing concave inner surface 212a of pole piece 212, concave south pole surface 417b adjacently facing convex inner surface 315b of circular conical segment 315, planar south pole surface 417c adjacently facing a planar inner surface 114b of pole segment 114, and planar south pole surface 417d adjacently facing a planar inner surface 116b of pole segment 116 to enclose the magnetic flux from magnet 417 within loop pole piece 311, and as a result, a magnetic field is established throughout air gap area 311b. Convex north pole surface 417a of magnet 417 spatially faces concave inner surface 212a of pole piece 212 to define a working air gap area 311d having a circular arcuate configuration therebetween. Alternatively, the present invention contemplates that concave south pole surface 417b can spatially face convex inner surface 315b of circular conical segment 315, planar south pole surface 417c can spatially face a planar inner surface 114b of pole segment 114, and/or planar south pole surface 417d can spatially face a planar inner surface 116b of pole segment 116.

Still referring to FIGS. 13A-13C, magnetic rotational position sensor 810 further comprises Hall effect device 18 as previously described herein in connection with FIGS. 1A and 1B and accompanying text, and Hall effect device 118 as previously described in connection with FIGS. 10A and 10B and accompanying text. Hall effect device 18 is disposed within working air gap area 311c, and Hall effect device 118 is disposed within working air gap area 311d. It is to be appreciated that Hall effect device 18 and Hall effect device 118 are operable to sense a different magnitude of magnetic flux density, respectively, for each degree of synchronized rotation of the magnetic field about rotational axis RA over a definable range of rotation upward to 170 degrees. It is to be further appreciated that, for each degree of synchronized rotation of the magnetic field about rotational axis RA of a definable range of rotation upward to 170 degrees, Hall effect device 18 and Hall effect device 118 are operable to generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 14A-14C, a magnetic rotational position sensor 20 is shown. Magnetic rotational position sensor 20 comprises a loop pole piece 21, a magnet 24, and Hall effect device 18. Loop pole piece 21 includes a circular arcuate pole piece 22, and a rectangular prismatical pole piece 23 serially adjoined in a closed configuration to define an air gap area 21a. Preferably, circular arcuate pole piece 22 and rectangular prismatical pole piece 23 are unitarily fabricated from a ferromagnetic steel, e.g. a low carbon steel. Circular arcuate pole piece 22 concentrically aligns with rotational axis RA as best shown in FIG. 14C, and concave inner surface 22a of pole piece 22 radially extends from rotational axis RA over approximately 190 degrees to facilitate a rotation of loop pole piece 21 about rotational axis RA over a definable range of rotation upward to 180 degrees. Planar inner surface 23a of pole piece 23 radially extends from rotational axis RA.

Still referring to FIGS. 14A-14C, magnet 24 is a permanent magnet having a convex north pole surface 24a, and a planar south pole surface 24b to generate magnetic flux (not shown). Prior to an assembly of magnetic rotational position sensor 20, the magnetic flux within magnet 24 is rectilinearly magnetized from south pole surface 24b to convex north pole surface 24a as exemplary shown by the arrows in FIGS. 14A and 14B. Magnet 24 is disposed within air gap area 21a of loop pole piece 21 with convex north pole surface 24a facing concave inner surface 22a of pole piece 22, and planar south pole surface 24b adjacently facing a planar inner surface 23a of pole piece 23 to enclose the magnetic flux from magnet 24 within loop pole piece 21, and as a result, a magnetic field is established throughout air gap area 21a as exemplary shown in FIGS. 16A-16C. Convex north pole surface 24a of magnet 24 spatially faces concave inner surface 22a of pole piece 22 to define a working air gap area 21b having a circular arcuate configuration therebetween. Alternatively, the present invention contemplates that planar south pole surface 24b can spatially face planar inner surface 23a of pole piece 23.

Still referring to FIGS. 14A-14C, Hall effect device 18 is disposed within working air gap area 21b. It is to be appreciated that Hall effect device 18 is operable to sense a magnetic flux density of any magnetic flux through Hall effect device 18 via a planar side surface 18a and a planar side surface 18b of Hall effect device 18. Hall effect device 18 is further operable to generate a voltage sensing signal as a function of the magnetic flux density of any magnetic flux passing through planar side surface 18a and/or a voltage sensing signal as a function of the magnetic flux density of any magnetic flux passing through planar side surface 18b.

Referring to FIGS. 15A and 15B, an exemplary adjoining of magnetic rotational position sensor 20 to cylindrical control shaft 1 (being non-magnetic and non-magnetizable) is shown. Magnetic rotational position sensor 20 is assembled as previously described in connection with FIGS. 14A-14C and accompanying text within a container 4, and a lid 5 is adjoined to container 4 to house pole piece 21 and magnet 24 within container 4. Lid 5 has a slot 5a to enable the leads of Hall effect device 18 to extend out of lid 5. Container 4 and lid 5 are adjoined to outer surface 1b of cylindrical control shaft 1 to adjoin loop pole piece 21 and magnet 24 to cylindrical control shaft 1 and to coincide rotational axis RA (FIG. 14C) with longitudinal axis LA of cylindrical control shaft 1. It is to be appreciated that loop pole piece 21 and magnet 24 will synchronously rotate about coinciding rotational axes LA/RA as cylindrical control shaft 1 is rotated about coinciding rotational axes LA/RA, and as a result, each degree of rotation of cylindrical control shaft 1 about coinciding rotational axes LA/RA exclusively corresponds to a distinct degree of synchronized rotation of the magnetic field (not shown) established throughout air gap area 21a (FIGS. 14A and 14B) about coinciding rotational axes LA/RA over a definable range of rotation upward to 180 degrees.

Referring to FIGS. 16A-16C, diagrammatic illustrations of loop pole piece 21, magnet 24, and a magnetic field synchronously rotating with cylindrical control shaft 1 about coinciding rotational axes LA/RA over a definable range of rotation upward to 180 degrees is shown. To sense each degree of rotation of cylindrical control shaft 1 about coinciding rotational axes LA/RA over a definable range of rotation upward to 180 degrees, it is to be appreciated that the magnetic flux density of any magnetic flux passing through Hall effect device 18 via planar side surface 18a (FIG. 14A) and planar side surface 18b (FIG. 14B) must be different for each degree of synchronized rotation of the magnetic field about coinciding rotational axes LA/RA. As previously described herein, the magnetic flux within magnet 24 is rectilinearly magnetized from south pole surface 24b (FIG. 14B) to north pole surface 24a (FIG. 14A) prior to the assembly of magnetic rotational position sensor 20. Upon the disposal of magnet 24 within loop pole piece 21, the arcuate configuration of working air gap area 21b realigns the magnetization of the magnetic flux within magnet 24 as exemplary shown in FIGS. 16A-16C to facilitate a sensing of a different magnitude of magnetic flux density by Hall effect 18 for each degree of synchronized rotation of the magnetic field about coinciding rotational axes LA/RA as evidenced by the positioning of Hall effect device 18 throughout working air gap area 21b along an arc path AP2 radially extending from coinciding rotational axes LA/RA. The arcuate configuration of working air gap area 21b is circular to facilitate a symmetrical balancing of the magnetic flux of the magnetic field throughout working air gap area 21b as shown in FIGS. 16A-16C. Planar side surface 18a and planar side surface 18b of Hall effect device 18 are perpendicular to concave inner surface 22a (FIG. 14B) of pole piece 22 and to convex north pole surface 24a (FIG. 14A) of magnet 24 as loop pole piece 21 and magnet 24 are synchronously rotated about coinciding rotational axes LA/RA to facilitate a uniform differential of the magnetic flux passing through Hall effect device 18 for each degree of synchronized rotation of control shaft 1 and the magnetic field about coinciding rotational axes LA/RA over a definable range of rotation upward to 180 degrees. Thus, it is to be appreciated that Hall effect device 18 is operable to sense a different magnitude of magnetic flux density for each degree of synchronized rotation of control shaft 1 and the magnetic field about coinciding rotational axes LA/RA over a definable range of rotation upward to 180 degrees. It is to be further appreciated that, for each degree of synchronized rotation of control shaft 1 and the magnetic field about coinciding rotational axes LA/RA over a definable range of rotation upward to 180 degrees, Hall effect device 18 is operable to generate a voltage sensing signal $V_{SS1}$ as a function of the magnetic flux density of the magnetic flux passing through planar side surface 18a as shown in FIG. 16D and/or a voltage sensing signal $V_{SS2}$ as a function of the magnetic flux density of the magnetic flux passing through planar side surface 18b as shown in FIG. 16D.

Referring to FIGS. 17A-17C, a magnetic rotational position sensor 20' is shown. Magnetic rotational position sensor 20' comprises loop pole piece 21' and magnet 24'. Loop pole piece 21' includes a circular arcuate pole piece 22', and a rectangular prismatical pole piece 23' serially adjoined in a closed configuration to define an air gap area 21a'. Preferably, circular arcuate pole piece 22' and rectangular prismatical pole piece 23' are unitarily fabricated from a ferromagnetic steel, e.g. a low carbon steel. Circular arcuate pole piece 22' concentrically aligns with rotational axis RA as best shown in FIG. 17C, and concave inner surface 22a' of pole piece 22' radially extends from rotational axis RA over approximately 100 degrees to facilitate a rotation of loop pole piece 21' about rotational axis RA over a definable range of rotation upward to ninety (90) degrees. Planar inner surface 23a' radially extends from rotational axis RA.

Still referring to FIGS. 17A-17C, magnet 24' is a permanent magnet having a convex north pole surface 24a', and a planar south pole surface 24b' to generate magnetic flux (not shown). Prior to an assembly of magnetic rotational position sensor 20', the magnetic flux within magnet 24' is rectilinearly magnetized from south pole surface 24b' to convex north pole surface 24a' as exemplary shown by the arrows in FIGS. 17A and 17B. Magnet 24' is disposed within air gap area 21a' of loop pole piece 21' with convex north pole surface 24a' facing concave inner surface 22a' of pole piece 22', and planar south pole surface 24b' adjacently facing a planar inner surface 23a' of pole piece 23' to enclose the magnetic flux from magnet 24' within loop pole piece 21', and as a result, a magnetic field is established throughout air gap area 21a'. Convex north pole surface 24a' of magnet 24' spatially faces concave inner surface 22a' of pole piece 22' to define a working air gap area 21b' having a circular arcuate configuration therebetween. Alternatively, the present invention contemplates that planar south pole surface 24b' can spatially face planar inner surface 23a' of pole piece 23'.

Still referring to FIGS. 17A-17C, magnetic rotational position sensor 20' further comprises Hall effect device 18 as previously described in connection with FIGS. 1A and 1B and accompanying text. Hall effect device 18 is disposed within working air gap area 21b'. It is to be appreciated that Hall effect device 18 is operable to sense a different magnitude of magnetic flux density for each degree of synchronized rotation of the magnetic field about rotational axis RA over a definable range of rotation upward to ninety (90) degrees. It is to be further appreciated that, for each degree of synchronized rotation of the magnetic field about rotational axis RA of a definable range of rotation upward to ninety (90) degrees, Hall effect device 18 is operable to generate a voltage sensing signal as a function of the magnetic flux density of the magnetic flux passing through planar side surface 18a, and/or a voltage sensing signal as a function of the magnetic flux density of the magnetic flux passing through planar side surface 18b.

Referring to FIGS. 18A-18C, a magnetic rotational position sensor 20" is shown. Magnetic rotational position sensor 20" comprises loop pole piece 21" and magnet 24". Loop pole piece 21" includes a circular arcuate pole piece 22", and a rectangular prismatical pole piece 23" serially adjoined in a closed configuration to define an air gap area 21a". Preferably, circular arcuate pole piece 22" and rectangular prismatical pole piece 23" are unitarily fabricated from a ferromagnetic steel, e.g. a low carbon steel. Circular arcuate pole piece 22" concentrically aligns with rotational axis RA as best shown in FIG. 18C, and concave inner surface 22a" of pole piece 22" radially extends from rotational axis RA over approximately 280 degrees to facilitate a rotation of loop pole piece 21" about rotational axis RA over a definable range of rotation upward to 270 degrees. Planar inner surface 23a" radially extends from rotational axis RA.

Still referring to FIGS. 18A-18C, magnet 24" is a permanent magnet having a convex north pole surface 24a", and a planar south pole surface 24b" to generate magnetic flux (not shown). Prior to an assembly of magnetic rotational position sensor 20", the magnetic flux within magnet 24" is rectilinearly magnetized from south pole surface 24b" to convex north pole surface 24a" as exemplary shown by the arrows in FIGS. 18A and 18B. Magnet 24" is disposed within air gap area 21a" of loop pole piece 21" with convex north pole surface 24a" facing concave inner surface 22a" of pole piece 22", and planar south pole surface 24b" adjacently facing a planar inner surface 23a" of pole piece 23" to enclose the magnetic flux from magnet 24" within loop pole piece 21", and as a result, a magnetic field is established throughout air gap area 21a". Convex north pole surface 24a" of magnet 24" spatially faces concave inner surface 22a" of pole piece 22" to define a working air gap area 21b" having a circular arcuate configuration therebetween. Alternatively, the present invention contemplates that planar south pole surface 24b" can spatially face planar inner surface 23a" of pole piece 23".

Still referring to FIGS. 18A-18C, magnetic rotational position sensor 20" further comprises Hall effect device 18 as previously described in connection with FIGS. 1A and 1B and accompanying text. Hall effect device 18 is disposed within working air gap area 21b". It is to be appreciated that Hall effect device 18 is operable to sense a different magnitude of magnetic flux density for each degree of synchronized rotation of the magnetic field about rotational axis RA over a definable range of rotation upward to 270 degrees. It is to be further appreciated that, for each degree of synchronized rotation of the magnetic field about rotational axis RA of a definable range of rotation upward to 270 degrees, Hall effect device 18 is operable to generate a voltage sensing signal as a function of the magnetic flux density of the magnetic flux passing through planar side surface 18a, and/or a voltage sensing signal as a function of the magnetic flux density of the magnetic flux passing through planar side surface 18b.

Referring to FIGS. 19A-19C, a magnetic rotational position sensor 120 is shown. Magnetic rotational position sensor 120 comprises loop pole piece 21 and magnet 24 as previously described herein in connection with FIGS. 14A and 14B and accompanying text. Magnetic rotational position sensor 120 further comprises magnet 117 previously described herein in connection with FIGS. 7A and 7B and accompanying text. Magnet 24 and magnet 117 are disposed within air gap area 21a with convex north pole surface 24a of magnet 24 facing concave south pole surface 117b of magnet 117, convex north pole surface 117a of magnet 117 adjacently facing concave inner surface 22a of pole piece 22, planar south pole surface 117c of magnet 117 adjacently facing planar inner surface 23a of pole piece 23, planar south pole surface 117d of magnet 117 adjacently facing planar inner surface 23a of pole piece 23, and planar south pole surface 24b of magnet 24 adjacently facing planar inner surface 23a of pole piece 23 to enclose the magnetic flux from magnet 24 and magnet 117 within loop pole piece 21, and as a result, a magnetic field is established throughout air gap area 21a. Concave south pole surface 117b of magnet 117 spatially faces convex north pole surface 24a of magnet 24 to define a working air gap area 21c having a circular arcuate configuration therebetween. Alternatively, the present invention contemplates that convex north pole surface 117a of magnet 117 can spatially face concave inner surface 22a of pole piece 22, planar south pole surface 117d can spatially face planar inner surface 23a of pole piece 23, planar south pole surface 117d can spatially face planar inner surface 23a of pole piece 23, and/or planar south pole surface 24b can spatially face planar inner surface 23a of pole piece 23.

Still referring to FIGS. 19A-19C, magnetic rotational position sensor 120 further comprises Hall effect device 18 as previously described herein in connection with FIGS. 1A-1C and accompanying text. Hall effect device 18 is disposed within working air gap area 21c. It is to be appreciated that Hall effect device 18 is operable to sense a different magnitude of magnetic flux density for each degree of synchronized rotation of the magnetic field about rotational axis RA over a definable range of rotation upward to 180 degrees. It is to be further appreciated that, for each degree of synchronized rotation of the magnetic field about rotational axis RA of a definable range of rotation upward to 180 degrees, Hall effect device 18 is operable to generate a voltage sensing signal as a function of the magnetic flux density of the magnetic flux passing through planar side surface 18a, and/or a voltage sensing signal as a function of the magnetic flux density of the magnetic flux passing through planar side surface 18b.

Referring to FIGS. 20A-20C, a magnetic rotational position sensor 220 is shown. Magnetic rotational position sensor 220 comprises loop pole piece 21 and magnet 24 as previously described herein in connection with FIGS. 14A and 14B and accompanying text. Magnetic rotational position sensor 220 further comprises magnet 217 previously described herein in connection with FIGS. 8A and 8B and accompanying text. Magnet 24 and magnet 217 are disposed within air gap area 21a with convex north pole surface 24a facing concave south pole surface 217b of magnet 217, convex north pole surface 217a of magnet 217 adjacently facing concave inner surface 22a of pole piece 22, planar south pole surface 217c of magnet 217 adjacently facing planar inner surface 23a of pole piece 23, planar south pole surface 217d of magnet 217 adjacently facing planar inner surface 23a of pole piece 23, and planar south pole surface 24b of magnet 24 adjacently facing planar inner surface 23a of pole piece 23 to enclose the magnetic flux from magnet 24 and magnet 217 within loop pole piece 21, and as a result, a magnetic field is established throughout air gap area 21a. Convex south pole surface 217a of magnet 217 spatially faces concave inner surface 22a of pole piece 22 to define a working air gap area 21d having a circular arcuate configuration therebetween, and concave south pole surface 217b of magnet 217 spatially faces convex north pole surface 24a of magnet 24 to define a working air gap area 21e having a circular arcuate configuration therebetween. Alternatively, the present invention contemplates that planar south pole surface 217d can spatially face planar inner surface 23a of pole piece 23, planar south pole surface 217d can spatially face planar inner surface 23a of pole piece 23, and/or planar south pole surface 24b can spatially face planar inner surface 23a of pole piece 23.

Still referring to FIGS. 20A-20C, magnetic rotational position sensor 220 further comprises Hall effect device 18 as previously described herein in connection with FIGS. 1A-1C and accompanying text, and Hall effect device 118 as previously described herein in connection with FIGS. 8A-8C and accompanying text. Hall effect device 18 is disposed within working air gap area 21d, and Hall effect device 118 is disposed within working air gap area 21e. It is to be appreciated that Hall effect device 18 and Hall effect device 118 are operable to sense a different magnitude of magnetic flux density, respectively, for each degree of synchronized rotation of the magnetic field about rotational axis RA over a definable range of rotation upward to 180 degrees. It is to be further appreciated that, for each degree of synchronized rotation of the magnetic field about rotational axis RA of a definable range of rotation upward to 180 degrees, Hall effect device 18 and Hall effect device 118 are operable to generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 21A-21C, a magnetic rotational position sensor 320 is shown. Magnetic rotational position sensor 320 comprises loop pole piece 21 as previously described herein in connection with FIGS. 14A-14C and accompanying text. Magnetic rotational position sensor 320 further comprises a magnet 124. Magnet 124 is a permanent magnet having a convex north pole surface 124a, and a planar south pole surface 124b to generate magnetic flux (not shown). Prior to an assembly of magnetic rotational position sensor 320, the magnetic flux within magnet 124 is rectilinearly magnetized from planar south pole surface 124b to convex north pole surface 124a as exemplary shown by the arrows in FIGS. 21A and 21B. Magnet 124 is disposed within air gap area 21a with convex north pole surface 124a facing concave inner surface 22a of pole piece 22, and planar south pole surface 124b facing planar inner surface 23a of pole piece 23 to enclose the magnetic flux from magnet 124 within loop pole piece 21, and as a result, a magnetic field is established throughout air gap area 21a. Convex north pole surface 124a spatially faces concave inner surface 22a of pole piece 22 to define a working air gap area 21f having a circular arcuate configuration therebetween, and concave south pole surface 124b spatially faces planar inner surface 23a of pole piece 23 to provide an additional spacing within air gap area 21a.

Still referring to FIGS. 21A-21C, magnetic rotational position sensor 320 further comprises Hall effect device 18 as previously described herein in connection with FIGS. 1A-1C and accompanying text. Hall effect device 18 is disposed within working air gap area 21f. It is to be appreciated that Hall effect device 18 is operable to sense a different magnitude of magnetic flux for each degree of synchronized rotation of the magnetic field about rotational axis RA over a definable range of rotation upward to 180 degrees.

It is to be further appreciated that, for each degree of synchronized rotation of the magnetic field about rotational axis RA of a definable range of rotation upward to 180 degrees, Hall effectdevice 18 is operable to generate a voltage sensing signal as a function of the magnetic flux density of the magnetic flux passing through planar side
5   surface 18a, and/or a voltage sensing signal as a function of the magnetic flux density of the magnetic flux passing through planar side surface 18b.

Referring to FIGS. 22A-22C, a magnetic rotational position sensor 420 is shown. Magnetic rotational position sensor 420 comprises a loop pole piece 121, a magnet 124, and a magnet 224. Magnetic rotational position sensor 420 further comprises Hall effect
10  device 18 as previously described in connection with FIGS. 1A and 1B, and a Hall effect device 118 as previously described in connection with FIGS. 8A and 8B. Loop pole piece 121 includes a circular arcuate pole piece 122 and a rectangular prismatical pole piece 123 serially adjoined in a closed configuration to define an air gap area 121a. Preferably, circular arcuate pole piece 122 and pole piece 123 are unitarily fabricated
15  from a ferromagnetic steel, e.g. a low carbon steel. Loop pole piece 121 further includes a circular arcuate pole piece 125 adjoined to pole piece 123 to define an air gap area 121b. Circular arcuate pole piece 122, and circular arcuate pole piece 125 concentrically align with rotational axis RA as best shown in FIG. 22C, and concave inner surface 122a of pole piece 122 and a concave inner surface 125a of pole piece 125 are swept out by
20  the outer end of a radius having its opposite end located on rotational axis RA and that extends circumferentially over approximately 175 degrees to facilitate a rotation of loop pole piece 121 about rotational axis RA over a definable range of rotation upward to 170 degrees.

Still referring to FIGS. 22A-22C, magnet 124 is a permanent magnet having a convex north pole surface 124a, and a planar south pole surface 124b to generate magnetic flux (not shown). Prior to an assembly of magnetic rotational position sensor 420, the magnetic flux within magnet 124 is rectilinearly magnetized from south pole surface 124b to convex north pole surface 124a as exemplary shown by the arrows in FIGS. 22A and 22B. Magnet 124 is disposed within air gap area 121a of loop pole piece 121 with convex north pole surface 124a facing concave inner surface 122a of pole piece 122, and planar south pole surface 124b adjacently facing planar inner surface 123a of pole piece 123 to enclose the magnetic flux from magnet 124 within loop pole piece 121, and as a result, a magnetic field is established throughout air gap area 121a. Convex north pole surface 124a of magnet 124 spatially faces concave inner surface 122a of pole piece 122 to define a working air gap area 121c having a circular arcuate configuration therebetween. Alternatively, the present invention contemplates that concave south pole surface 124b can spatially face planar inner surface 123a of pole piece 123.

Still referring to FIGS. 22A-22C, magnet 224 is a permanent magnet having a convex north pole surface 224a, and a planar south pole surface 224b to generate magnetic flux (not shown). Prior to an assembly of magnetic rotational position sensor 420, the magnetic flux within magnet 224 is rectilinearly magnetized from south pole surface 224b to convex north pole surface 224a as exemplary shown by the arrows in FIGS. 22A and 22B. Magnet 224 is disposed within air gap area 121b of loop pole piece 121 with convex north pole surface 224a facing concave inner surface 125a of pole piece 125, and planar south pole surface 224b adjacently facing planar inner surface 123b of pole piece 123 to enclose the magnetic flux from magnet 224 within loop pole piece 121, and as a result, a magnetic field is established throughout air gap area 121b. Convex north pole surface 224a of magnet 224 spatially faces concave inner surface 125a of pole piece 125 to define a working air gap area 121d having a circular arcuate configuration therebetween. Alternatively, the present invention contemplates that concave south pole surface 224b can spatially face planar inner surface 123b of pole piece 123.

Still referring to FIGS. 22A-22C, Hall effect device 18 is disposed within working air gap area 121c, and Hall effect device 118 is disposed within working air gap area 121d. It is to be appreciated that Hall effect device 18 and Hall effect device 118 are operable to sense a different magnitude of magnetic flux density, respectively, for each degree of synchronized rotation of the magnetic field about rotational axis RA over a definable range of rotation upward to 170 degrees. It is to be further appreciated that, for each degree of synchronized rotation of the magnetic field about rotational axis RA of a definable range of rotation upward to 170 degrees, Hall effect device 18 and Hall effect device 118 are operable to generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 23A-23C, a magnetic rotational position sensor 520 is shown. Magnetic rotational position sensor 520 comprises loop pole piece 121, magnet 124, and magnet 224 as previously described herein in connection with FIGS. 22A and 22B and accompanying text. Magnetic rotational position sensor 610 further comprises a magnet 324 and a magnet 424. Magnet 324 is a permanent magnet having a convex north pole surface 324a, a concave south pole surface 324b, a planar south pole surface 324c, and a planar south pole surface 324d to generate magnetic flux (not shown). Prior to an assembly of magnetic rotational position sensor 520, the magnetic flux within magnet 324 is rectilinearly magnetized from south pole surfaces 324b-324d to convex north pole
5 surface 324a as exemplary shown by the arrows in FIGS. 23A and 23B. Magnet 124 and magnet 324 are disposed within air gap area 121a with convex north pole surface 324a of magnet 324 facing concave inner surface 122a of pole piece 122, concave south pole surface 324b of magnet 324 facing convex north pole surface 124a of magnet 124, planar south pole surface 124b of magnet 124 adjacently facing planar inner surface 123a of
10 pole piece 123, planar south pole surface 324c of magnet 324 adjacently facing planar inner surface 123a of pole piece 123, and planar south pole surface 324d of magnet 324 adjacently facing planar inner surface 123a of pole piece 123 to enclose the magnetic flux from magnet 124 and the magnetic flux from magnet 324 within loop pole piece 121, and as a result, a magnetic field is established throughout air gap area 121a. Concave south
15 pole surface 324b of magnet 324 spatially faces convex north pole surface 124a of magnet 124 to define a working air gap area 121e having a circular arcuate configuration therebetween. Alternatively, the present invention contemplates that planar south pole surface 124b can spatially face planar inner surface 123a of pole piece 123, planar south pole surface 324c can spatially face planar inner surface 123a of pole piece 123, and/or
20 planar south pole surface 324d can spatially face planar inner surface 123a of pole piece 123.

Still referring to FIGS. 23A-23C, magnet 424 is a permanent magnet having a convex north pole surface 424a, a concave south pole surface 424b, a planar south pole surface 424c, and a planar south pole surface 424d to generate magnetic flux (not shown). Prior to an assembly of magnetic rotational position sensor 520, the magnetic flux within magnet 424 is rectilinearly magnetized from south pole surfaces 424b-424d to convex north pole surface 424a as exemplary shown by the arrows in FIGS. 23A and 23B.

5   Magnet 224 and magnet 424 are disposed within air gap area 121b with convex north pole surface 424a of magnet 424 facing concave inner surface 125a of pole piece 125, concave south pole surface 424b of magnet 424 facing convex north pole surface 224a of magnet 224, planar south pole surface 224b of magnet 224 adjacently facing planar inner surface 123a of pole piece 123, planar south pole surface 424c of magnet 424 adjacently 10  facing planar inner surface 123a of pole piece 123, and planar south pole surface 424d of magnet 424 adjacently facing planar inner surface 123a of pole piece 123 to enclose the magnetic flux from magnet 224 and the magnetic flux from magnet 424 within loop pole piece 121, and as a result, a magnetic field is established throughout air gap area 121b. Concave south pole surface 424b of magnet 424 spatially faces convex north pole surface 15  224a of magnet 224 to define a working air gap area 121f having a circular arcuate configuration therebetween. Alternatively, the present invention contemplates that planar south pole surface 224b can spatially face planar inner surface 123a of pole piece 123, planar south pole surface 424c can spatially face planar inner surface 123a of pole piece 123, and/or planar south pole surface 424d can spatially face planar inner surface 123a of 20  pole piece 123.

Still referring to FIGS. 23A-23C, magnetic rotational position sensor 520 further comprises Hall effect device 18 as previously described herein in connection with FIGS. 1A and 1B and accompanying text, and Hall effect device 118 as previously described in connection with FIGS. 8A and 8B and accompanying text. Hall effect device 18 is disposed within working air gap area 121e, and Hall effect device 118 is disposed within working air gap area 121f. It is to be appreciated that Hall effect device 18 and Hall effect device 118 are operable to sense a different magnitude of magnetic flux density, respectively, for each degree of synchronized rotation of the magnetic field about rotational axis RA over a definable range of rotation upward to 170 degrees. It is to be further appreciated that, for each degree of synchronized rotation of the magnetic field about rotational axis RA of a definable range of rotation upward to 170 degrees, Hall effect device 18 and Hall effect device 118 are operable to generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 24A-24C, a magnetic rotational position sensor 620 is shown. Magnetic rotational position sensor 620 comprises loop pole piece 121 as previously described herein in connection with FIGS. 22A and 22B and accompanying text. Magnetic rotational position sensor 620 further comprises magnet 524 and magnet 624. Magnet 524 is a permanent magnet having a convex north pole surface 524a, and a planar south pole surface 524b to generate magnetic flux (not shown). Prior to an assembly of magnetic rotational position sensor 620, the magnetic flux within magnet 524 is rectilinearly magnetized from planar south pole surface 524b to convex north pole surface 524a as exemplary shown by the arrows in FIGS. 24A and 24B. Magnet 524 is disposed within air gap area 121a with convex north pole surface 524a facing concave inner surface 122a of pole piece 122, and planar south pole surface 524b facing planar inner surface 123a of pole piece 123 to enclose the magnetic flux from magnet 524 within loop pole piece 121, and as a result, a magnetic field is established throughout air gap area 121a. Convex north pole surface 524a spatially faces concave inner surface 122a of pole piece 122 to define a working air gap area 121g having a circular arcuate configuration therebetween, and planar south pole surface 524b spatially faces planar inner surface 123a of pole piece 123 to provide an additional spacing within air gap area 121a.

Still referring to FIGS. 24A-24C, magnet 624 is a permanent magnet having a convex north pole surface 624a, and a planar south pole surface 624b to generate magnetic flux (not shown). Prior to an assembly of magnetic rotational position sensor 620, the magnetic flux within magnet 624 is rectilinearly magnetized from planar south pole surface 624b to convex north pole surface 624a as exemplary shown by the arrows in FIGS. 24A and 24B. Magnet 624 is disposed within air gap area 121b with convex north pole surface 624a facing concave inner surface 125a of pole piece 125, and planar south pole surface 624b facing planar inner surface 123b of pole piece 123 to enclose the magnetic flux from magnet 624 within loop pole piece 121, and as a result, a magnetic field is established throughout air gap area 121b. Convex north pole surface 624a spatially faces concave inner surface 125a of pole piece 125 to define a working air gap area 121h having a circular arcuate configuration therebetween, and planar south pole surface 624b spatially faces planar inner surface 123b of pole piece 123 to provide an additional spacing within air gap area 121b.

Still referring to FIGS. 24A-24C, magnetic rotational position sensor 620 further comprises Hall effect device 18 as previously described herein in connection with FIGS. 1A and 1B and accompanying text, and Hall effect device 118 as previously described in connection with FIGS. 8A and 8B and accompanying text. Hall effect device 18 is disposed within working air gap area 121g, and Hall effect device 118 is disposed within working air gap area 121h. It is to be appreciated that Hall effect device 18 and Hall effect device 118 are operable to sense a different magnitude of magnetic flux density, respectively, for each degree of synchronized rotation of the magnetic field about rotational axis RA over a definable range of rotation upward to 170 degrees. It is to be further appreciated that, for each degree of synchronized rotation of the magnetic field about rotational axis RA of a definable range of rotation upward to 170 degrees, Hall effect device 18 and Hall effect device 118 are operable to generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

Referring to FIGS. 25A-25C, a magnetic rotational position sensor 30 is shown. Magnetic rotational position sensor 30 comprises a loop pole piece 31, a magnet 35, a magnet 135, an optional auxiliary pole piece 34, and Hall effect device 18 as previously described in connection with FIGS. 1A and 1B and accompanying text. Loop pole piece 31 includes a circular arcuate pole piece 32, and a circular arcuate pole piece 33 serially adjoined in a closed configuration to define an air gap area 31a. Preferably, pole piece 32 and pole piece 33 are unitarily fabricated from a ferromagnetic steel, e.g. a low carbon steel. Pole piece 32 and pole piece 33 concentrically align with rotational axis RA as best shown in FIG. 25C, and concave inner surface 32a of pole piece 32 and a concave inner surface 33a of pole piece 33 are swept out by the outer end of a radius having its opposite end located on rotational axis RA and that extends circumferentially over approximately 180 degrees to facilitate a rotation of loop pole piece 31 about rotational axis RA over a definable range of rotation upward to 360 degrees.

Still referring to FIGS. 25A-25C, magnet 35 is a permanent magnet having a convex north pole surface 35a, a concave south pole surface 35b, a planar south pole surface 35c, and a planar south pole surface 35d to generate magnetic flux (not shown). Magnet 135 is also a permanent magnet having a convex south pole surface 135a, a concave north pole surface 135b, a planar north pole surface 135c, and a planar north pole surface 135d to generate magnetic flux (not shown). Prior to an assembly of magnetic rotational position sensor 30, the magnetic flux within magnet 35 is rectilinearly magnetized from south pole surfaces 35b-35d to convex north pole surface 35a, and the magnetic flux within magnet 135 is rectilinearly magnetized from convex south pole surface 135a to north pole surfaces 135b-135d as exemplary shown by the arrows in FIGS. 25A and 25B. Magnet 35, magnet 135, and auxiliary pole piece 34 are disposed within air gap area 31a of loop pole piece 31 with convex north pole surface 35a of magnet 35 facing concave inner surface 32a of pole piece 32, convex south pole surface 135a of magnet 135 facing concave inner surface 33a of pole piece 33, concave south pole surface 35b of magnet 35 adjacently facing convex outer surface 34a of auxiliary pole piece 34, concave north pole surface 135b of magnet 135 adjacently facing convex outer surface 34b of auxiliary pole piece 34, planar south pole surface 35c of magnet 35 adjacently facing planar north pole surface 135d of magnet 135, and planar south pole surface 35d of magnet 35 adjacently facing planar north pole surface 135c of magnet 135 to enclose the magnetic flux from magnet 35 and the magnetic flux from magnet 135 within loop pole piece 31, and as a result, a magnetic field is established throughout air gap area 31a as exemplary shown in FIGS. 27A-27C. Convex north pole surface 35a of magnet 35 spatially faces concave inner surface 32a of pole piece 32 to define a working air gap area 31b having a circular arcuate configuration therebetween, and convex south pole surface 135a of magnet 135 spatially faces concave inner surface 33a of pole piece 33 to define a working air gap area 31c having a circular arcuate configuration therebetween. Alternatively, the present invention contemplates that concave south pole surface 35b of magnet 35 spatially faces convex outer surface 34a of auxiliary pole piece 34, concave north pole surface 135b of magnet 135 spatially faces convex outer surface 34b of auxiliary pole piece 34, planar south pole surface 35c of magnet 35 spatially faces planar north pole surface 135d of magnet 135, and/or planar south pole surface 35d of magnet 35 spatially faces planar north pole surface 135c of magnet 135. In addition, the present invention contemplates that magnet 35 and magnet 135 can be unitarily fabricated to constitute a single magnet, e.g. a loop magnet. The present invention further contemplates that a ferromagnetic control shaft (not shown) may replace auxiliary pole piece 34 when auxiliary pole piece 34 is excluded from an embodiment of magnetic rotational position sensor 30.

Still referring to FIGS. 25A-25C, Hall effect device 18 is disposed in air gap area 31a and locatable within contiguous working air gap area 31b and working air gap area 31c. It is to be appreciated that Hall effect device 18 is operable to sense a magnetic flux density of any magnetic flux passing through Hall effect device 18 via a planar side surface 18a and a planar side surface 18b of Hall effect device 18. Hall effect device 18 is further operable to generate a voltage sensing signal as a function of the magnetic flux density of any magnetic flux passing through planar side surface 18a and/or a voltage 5   sensing signal as a function of the magnetic flux density of any magnetic flux passing through planar side surface 18b. The present invention contemplates that a second Hall effect device, e.g. Hall effect device 118 (FIGS. 8A and 8B) can be disposed within air gap area 31a and locatable within working air gap area 31b and working air gap area 31c. Accordingly, the second Hall effect device 118 would be offset from Hall effect device 10  18, e.g. a ninety (90) degree phase shift.

Referring to FIGS. 26A and 26B, an exemplary adjoining of magnetic rotational position sensor 30 to cylindrical control shaft 1 (being made from a ferromagnetic material) is shown. Magnetic rotational position sensor 30 is assembled as previously described in connection with FIGS. 25A-25C and accompanying text within a container 15  6. A lid 7 is adjoined to container 6 to house pole piece 31, and a cover 8 is adjoined to magnet 35, magnet 135, and auxiliary pole piece 34. Container 6, and lid 7 are adjoined to outer surface 1a of cylindrical control shaft 1 to adjoin loop pole piece 31, magnet 35, magnet 135, and auxiliary pole piece 34 to cylindrical control shaft 1 and to coincide rotational axis RA (FIG. 25C) with a longitudinal axis LA of cylindrical control shaft 1.

20  It is to be appreciated that loop pole loop pole piece 31, magnet 35, magnet 135, and auxiliary pole piece 34 will synchronously rotate about coinciding rotational axes LA/RA as cylindrical control shaft 1 is rotated about coinciding rotational axes LA/RA, and as a result, each degree of rotation of cylindrical control shaft 1 about coinciding rotational axes LA/RA exclusively corresponds to a distinct degree of synchronized rotation of the magnetic field(s) (not shown) established throughout air gap area 31a (FIGS. 25A and 25B) about coinciding rotational axes LA/RA over a definable range of rotation upward to 360 degrees.

Referring to FIGS. 27A-27C, diagrammatic illustrations of loop pole piece 31, magnet 35, magnet 135, auxiliary pole piece 34, and a magnetic field synchronously rotating with cylindrical control shaft 1 about coinciding rotational axes LA/RA over a definable range of rotation upward to 360 degrees is shown. To sense each degree of rotation of cylindrical control shaft 1 about coinciding rotational axes LA/RA over a 360 degree range of rotation, it is to be appreciated that the magnetic flux density of any magnetic flux passing through Hall effect device 18 via planar side surface 18a (FIG. 25A) and planar side surface 18b (FIG. 25B) must be different for each diametric degree of synchronized rotation of the magnetic field about coinciding rotational axes LA/RA. As previously described herein, the magnetic flux within magnet 35 from south pole surfaces 35b-35d (FIG. 25B) to convex north pole surface 35a (FIG. 25A) and the magnet flux within magnet 135 is rectilinearly magnetized from convex south pole surface 135a (FIG. 25A) to north pole surfaces 135b-135d (FIG. 25B) prior to the assembly of magnetic rotational position sensor 30. Upon the disposal of magnet 35, magnet 135, and auxiliary pole piece 34 within loop pole piece 31, the arcuate configurations of working air gap area 31b and working air gap area 31c realign the magnetization of the magnetic flux within magnet 35 and magnet 135 as exemplary shown in FIGS. 27A-27C to facilitate a sensing of a different magnitude of magnetic flux density by Hall effect device 18 for each diametric degree of synchronized rotation of the magnetic field about coinciding rotational axes LA/RA as evidenced by the positioning of Hall effect device 18 throughout working air gap area 31b along a radial path RP radially extending from coinciding rotational axes LA/RA. The arcuate configurations of working air gap area 31b and working air gap area 31c are circular to facilitate a symmetrical balancing of the 5    magnetic flux of the magnetic field throughout air gap area 31a as shown in FIGS. 27A-27C. Planar side surface 18a and planar side surface 18b of Hall effect device 18 are perpendicular to concave inner surface 32a (FIGS. 25A and 1B) of pole piece 32 and to convex north pole surface 35a (FIG. 25B) of magnet 35 when located within working air gap area 31b and are perpendicular to concave inner surface 33a (FIGS. 25A and 1B) of 10   pole piece 32 and to convex south pole surface 135a (FIG. 25A) of magnet 135 when located within working air gap area 31c as loop pole piece 31, magnet 35, magnet 135, and auxiliary pole piece 134 are synchronously rotated about coinciding rotational axes LA/RA to facilitate a uniform differential of the magnetic flux passing through Hall effect device 18 for each diametric degree of synchronized rotation of control shaft 1 and 15   the magnetic field about coinciding rotational axes LA/RA over a 360 degree range of rotation within working air gap area 31b and within working air gap area 31c.

Thus, it is to be appreciated that Hall effect device 18 is operable to sense a different magnitude of magnetic flux density for each diametric degree of synchronized rotation of control shaft 1 and the magnetic field about coinciding rotational axes LA/RA 20   over a 360 degree range of rotation. It is to be further appreciated that, for each diametric degree of synchronized rotation of control shaft 1 and the magnetic field about coinciding rotational axes LA/RA over a 360 degree range of rotation, Hall effect device 18 is operable to generate a voltage sensing signal $V_{SS1}$ as a function of the magnetic flux density of the magnetic flux passing through planar side surface 18a as shown in FIG. 27D and/or a voltage sensing signal $V_{SS2}$ as a function of the magnetic flux density of the magnetic flux passing through planar side surface 18b as shown in FIG. 27D.

Referring to FIGS. 28A-28C, a magnetic rotational position sensor 130 is shown. Magnetic rotational position sensor 130 comprises loop pole piece 31, magnet 35, magnet 135, and optional auxiliary pole piece 34 as previously described in connection with FIGS. 25A-25C and accompanying text. Magnetic rotational position sensor 130 further comprises a magnet 235, and a magnet 335. Magnet 235 is a permanent magnet having a convex north pole surface 235a, a concave south pole surface 235b, a planar south pole surface 235c, and a planar south pole surface 235d to generate magnetic flux (not shown). Magnet 335 is also a permanent magnet having a convex south pole surface 335a, a concave north pole surface 335b, a planar north pole surface 335c, and a planar north pole surface 335d to generate magnetic flux (not shown). Prior to an assembly of magnetic rotational position sensor 130, the magnetic flux within magnet 235 is rectilinearly magnetized from south pole surfaces 235b-235d to convex north pole surface 235a, and the magnetic flux within magnet 335 is rectilinearly magnetized from convex south pole surface 335a to north pole surfaces 335b-335d as exemplary shown by the arrows in FIGS. 28A and 28B. Magnet 235 and magnet 335 are disposed within air gap area 31a of loop pole piece 31 with convex north pole surface 235a of magnet 235 adjacently facing concave inner surface 32a of pole piece 32, convex south pole surface 335a of magnet 335 adjacently facing concave inner surface 33a of pole piece 33, concave south pole surface 235b of magnet 235 facing convex north pole surface 35a of magnet 35, concave north pole surface 335b of magnet 335 facing convex south pole surface 135a of magnet 135, planar south pole surface 235c of magnet 235 adjacently facing planar north pole surface 335d of magnet 335, and planar south pole surface 235d of magnet 235 adjacently facing planar north pole surface 335c of magnet 335 to enclose the magnetic flux from magnet 235 and the magnetic flux from magnet 335 within loop pole piece 31, and as a result, a magnetic field is established throughout air gap area 31a. Concave south pole surface 235b of magnet 235 spatially faces convex north pole surface 35a of magnet 35 to define a working air gap area 31d having a circular arcuate configuration therebetween, and concave north pole surface 335b of magnet 335 spatially faces convex south pole surface 135a of magnet 135 to define a working air gap area 31e having a circular arcuate configuration therebetween. Alternatively, the present invention contemplates that planar south pole surface 235c of magnet 235 spatially face planar north pole surface 335d of magnet 335, and planar south pole surface 235d of magnet 235 spatially faces planar north pole surface 335c of magnet 335. In addition, the present invention contemplates magnet 235 and magnet 335 can be unitarily fabricated to constitute a single magnet.

Still referring to FIGS. 28A-28C, Hall effect device 18 is disposed in air gap area 31a and locatable within contiguous working air gap area 31d and working air gap area 31e. It is to be appreciated that Hall effect device 18 is operable to sense a different magnitude of magnetic flux density for each diametric degree of synchronized rotation of the magnetic field about rotational axis RA over a 360 range of rotation. It is to be further appreciated that, for each degree of synchronized rotation of the magnetic field about rotational axis RA over the 360 degree range of rotation, Hall effect device 18 is operable to generate a voltage sensing signal as a function of the magnetic flux density of the magnetic flux passing through planar side surface 18a and/or a voltage sensing signal as a function of the magnetic flux density of the magnetic flux passing through planar side surface 18b.

Referring to FIGS. 29A-29C, a magnetic rotational position sensor 230 is shown. Magnetic rotational position sensor 230 comprises loop pole piece 31, magnet 35, magnet 135, and optional auxiliary pole piece 34 as previously described in connection with FIGS. 25A-25C and accompanying text. Magnetic rotational position sensor 230 further comprises a magnet 435, and a magnet 535. Magnet 435 is a permanent magnet having a convex north pole surface 435a, a concave south pole surface 435b, a planar south pole surface 435c, and a planar south pole surface 435d to generate magnetic flux (not shown). Magnet 535 is also a permanent magnet having a convex south pole surface 535a, a concave north pole surface 535b, a planar north pole surface 535c, and a planar north pole surface 535d to generate magnetic flux (not shown). Prior to an assembly of magnetic rotational position sensor 230, the magnetic flux within magnet 435 is rectilinearly magnetized from south pole surfaces 435b-435d to convex north pole surface 435a, and the magnetic flux within magnet 535 is rectilinearly magnetized from convex south pole surface 535a to north pole surfaces 535b-535d as exemplary shown by the arrows in FIGS. 29A and 29B. Magnet 435, and magnet 535 are disposed within air gap area 31a of loop pole piece 31 with convex north pole surface 435a of magnet 435 facing concave inner surface 32a of pole piece 32, convex south pole surface 535a of magnet 535 facing concave inner surface 33a of pole piece 33, concave south pole surface 435b of magnet 435 facing convex north pole surface 35a of magnet 35, concave north pole surface 535b of magnet 535 facing convex south pole surface 135a of magnet 135, planar south pole surface 435c of magnet 435 adjacently facing planar north pole surface 535d of magnet 535, and planar south pole surface 435d of magnet 435 adjacently facing planar north pole surface 535c of magnet 535 to enclose the magnetic flux from magnet 435 and the magnetic flux from magnet 535 within loop pole piece 31, and as a result, a magnetic field is established throughout air gap area 31a. Concave south pole surface 435b of magnet 435 spatially faces convex north pole surface 35a of magnet 35 to define a working air gap area 31g having a circular arcuate configuration therebetween, concave north pole surface 535b of magnet 535 spatially faces convex south pole surface 135a of magnet 135 to define a working air gap area 31h having a circular arcuate configuration therebetween, convex north pole surface 435a of magnet 435 spatially faces concave inner surface 32a of pole piece 32 to define a working air gap area 31f having a circular arcuate configuration therebetween, and convex south pole surface 535a of magnet 535 spatially faces concave inner surface 33a of pole piece 33 to define a working air gap area 31i having a circular arcuate configuration therebetween.

Alternatively, the present invention contemplates that planar south pole surface 435c of magnet 435 spatially faces planar north pole surface 535d of magnet 535, and planar south pole surface 435d of magnet 435 spatially faces planar north pole surface 535c. In addition, the present invention contemplates that magnet 435 and magnet 535 can be unitarily fabricated to constitute a single magnet.

Still referring to FIGS. 29A-29C, Hall effect device 18 is disposed within air gap area 31a and locatable within working air gap area 31f and working air gap area 31i. Hall effect device 118 is disposed within air gap area 31a and locatable within working air gap area 31g and working air gap area 31h. It is to be appreciated that Hall effect device 18 and Hall effect device 118 are operable to sense a different magnitude of magnetic flux density, respectively, for each diametric degree of synchronized rotation of the magnetic field about rotational axis RA over a 360 degree range of rotation. It is to be further appreciated that, for each degree of synchronized rotation of the magnetic field about rotational axis RA over a 360 degree range of rotation, Hall effect device 18 and Hall effect device 118 are operable to generate a voltage sensing signal as a function of the magnetic flux density of the magnetic flux passing through planar side surface 18a and planar side surface 118a, respectively, and/or a voltage sensing signal as a function of the magnetic flux density of the magnetic flux passing through planar side surface 18b and planar side surface 118b, respectively.

While the present invention has been illustrated and described in detail in the drawings and foregoing description, the same is to be considered as illustrative and not restrictive in character, it being understood that the preferred embodiments have been shown and described and that all changes and modifications that come within the spirit of the invention are desired to be protected.